US010192665B2

(12) United States Patent
Breiwa et al.

(10) Patent No.: US 10,192,665 B2
(45) Date of Patent: Jan. 29, 2019

(54) MAGNETIC MOUNT SYSTEM

(71) Applicant: Attachit LLC, Dane, WI (US)

(72) Inventors: George Breiwa, Dane, WI (US);
Benjamin C. Kuehl, Dane, WI (US);
Richard Mews, Bonduel, WI (US)

(73) Assignee: Attachit LLC, Gillett, WI (US)

( * ) Notice: Subject to any disclaimer, the term of this patent is extended or adjusted under 35 U.S.C. 154(b) by 0 days.

(21) Appl. No.: 15/677,721

(22) Filed: Aug. 15, 2017

(65) Prior Publication Data
US 2017/0345536 A1 Nov. 30, 2017

Related U.S. Application Data

(63) Continuation of application No. 15/060,275, filed on Mar. 3, 2016, now Pat. No. 9,773,601.
(Continued)

(51) Int. Cl.
*H01F 7/02* (2006.01)
*H02J 50/10* (2016.01)
*B60R 11/02* (2006.01)
*F16B 1/00* (2006.01)
*F16M 13/02* (2006.01)
*G06F 1/16* (2006.01)
(Continued)

(52) U.S. Cl.
CPC ............ *H01F 7/0252* (2013.01); *B60R 11/00* (2013.01); *B60R 11/02* (2013.01); *F16B 1/00* (2013.01); *F16M 13/022* (2013.01); *G06F 1/1632* (2013.01); *H01F 7/0247* (2013.01); *H01F 38/14* (2013.01); *H02J 7/0042* (2013.01); *H02J 7/025* (2013.01); *H02J 50/10* (2016.02); *H02J 50/90* (2016.02); *B60R 2011/0057* (2013.01); *F16B 2001/0035* (2013.01)

(58) Field of Classification Search
None
See application file for complete search history.

(56) References Cited

U.S. PATENT DOCUMENTS

| | | |
|---|---|---|
| 2,764,716 A | 9/1956 | Minchom et al. |
| 5,861,956 A | 1/1999 | Bridges et al. |

(Continued)

FOREIGN PATENT DOCUMENTS

| | | |
|---|---|---|
| EP | 2775582 A2 | 9/2014 |
| GB | 2518201 A | 3/2015 |

(Continued)

OTHER PUBLICATIONS

"International Search Report and Written Opinion," for International Appln. No. PCT/US2016/020727 dated Jul. 22, 2016.
(Continued)

*Primary Examiner* — Mohamad Musleh
(74) *Attorney, Agent, or Firm* — Boardman & Clark LLP

(57) ABSTRACT

A magnetic mounting system is provided. The system includes a device having a magnetic attachment feature and a magnetic device mount. The magnetic device mount has a mating magnetic attachment feature. The magnetic attachment feature and mating magnetic attachment feature allow specific angular, radial, and/or longitudinal alignment of the device relative to the mount without a mechanical interface. An electronic device holder and charging system with integrated charging and data transfer interface and a self-aligning, magnetic coupling and docking interface with on-demand decoupling feature are also disclosed.

10 Claims, 34 Drawing Sheets

Related U.S. Application Data

(60) Provisional application No. 62/127,556, filed on Mar. 3, 2015, provisional application No. 62/132,633, filed on Mar. 13, 2015, provisional application No. 62/236,718, filed on Oct. 2, 2015, provisional application No. 62/289,550, filed on Feb. 1, 2016.

(51) Int. Cl.
| | |
|---|---|
| *H01F 38/14* | (2006.01) |
| *H02J 7/00* | (2006.01) |
| *H02J 7/02* | (2016.01) |
| *H02J 50/90* | (2016.01) |
| *B60R 11/00* | (2006.01) |

(56) References Cited

U.S. PATENT DOCUMENTS

| | | |
|---|---|---|
| 6,499,851 B1 | 12/2002 | Kelly et al. |
| 6,919,787 B1 | 7/2005 | Macken et al. |
| 7,050,044 B2 | 5/2006 | Liu et al. |
| 7,110,194 B2 | 9/2006 | Hubbs et al. |
| 7,386,325 B2 | 6/2008 | Charlier et al. |
| 7,565,187 B1 | 7/2009 | Dynok et al. |
| 7,612,997 B1 | 11/2009 | Diebel et al. |
| 7,778,023 B1 | 8/2010 | Mohoney et al. |
| 7,855,529 B2 | 12/2010 | Liu et al. |
| 7,925,320 B2 | 4/2011 | Pemble et al. |
| 8,026,693 B2 | 9/2011 | Burley et al. |
| 8,260,199 B2 | 9/2012 | Kowalski et al. |
| 8,395,353 B2 | 3/2013 | Wang et al. |
| 8,485,404 B2 | 7/2013 | Santo et al. |
| 8,604,753 B2 | 12/2013 | Bessa et al. |
| 8,633,616 B2 | 1/2014 | Soar et al. |
| 8,688,037 B2 | 4/2014 | Chatterjee et al. |
| 8,706,175 B2 | 4/2014 | Cho et al. |
| 8,727,290 B1 | 5/2014 | Samhoury et al. |
| 8,774,716 B2 | 7/2014 | Lin et al. |
| 8,798,688 B2 | 8/2014 | August et al. |
| 8,928,276 B2 | 1/2015 | Hall et al. |
| 8,935,438 B1 | 1/2015 | Ivanchenko et al. |
| 8,953,102 B2 | 2/2015 | Lavelle et al. |
| 8,964,364 B2 | 2/2015 | Abdelsamie et al. |
| 8,995,127 B2 | 3/2015 | Richardson et al. |
| 9,007,758 B2 | 4/2015 | Puhalla et al. |
| 9,013,141 B2 | 4/2015 | Sieber et al. |
| 9,019,698 B2 | 4/2015 | Thiers |
| 9,026,187 B2 | 5/2015 | Huang |
| 9,060,416 B2 | 6/2015 | Supran et al. |
| 9,086,847 B2 | 7/2015 | Filipovic et al. |
| 9,103,150 B1 | 8/2015 | Wong |
| 9,107,027 B2 | 8/2015 | Sudak |
| 9,773,601 B2 | 9/2017 | Breiwa et al. |
| 2006/0061326 A1 | 3/2006 | Vine et al. |
| 2007/0099469 A1 | 5/2007 | Sorensen et al. |
| 2007/0167190 A1 | 7/2007 | Moosavi et al. |
| 2008/0269927 A1 | 10/2008 | Szolyga et al. |
| 2009/0302799 A1 | 12/2009 | Marquet et al. |
| 2011/0024470 A1 | 2/2011 | Hajarian et al. |
| 2011/0170244 A1 | 7/2011 | Son et al. |
| 2011/0188197 A1 | 8/2011 | Jackson et al. |
| 2011/0227527 A1 | 9/2011 | Zhu et al. |
| 2012/0013295 A1 | 1/2012 | Yeh et al. |
| 2012/0135681 A1 | 5/2012 | Adams et al. |
| 2012/0252543 A1 | 10/2012 | Cho et al. |
| 2012/0329532 A1 | 12/2012 | Ko et al. |
| 2013/0052871 A1 | 2/2013 | Eklind et al. |
| 2013/0093388 A1 | 4/2013 | Partovi et al. |
| 2013/0164949 A1 | 6/2013 | Riering-Czekalla et al. |
| 2013/0182387 A1 | 7/2013 | Mere et al. |
| 2013/0271070 A1 | 10/2013 | Hirano et al. |
| 2013/0307470 A1 | 11/2013 | Watanabe et al. |
| 2014/0021909 A1 | 1/2014 | Klawon et al. |
| 2014/0028243 A1 | 1/2014 | Rayner et al. |
| 2014/0034531 A1 | 2/2014 | Wang et al. |
| 2014/0035517 A1 | 2/2014 | Dunko et al. |
| 2014/0159657 A1 | 6/2014 | Kim et al. |
| 2014/0170977 A1 | 6/2014 | Ryan et al. |
| 2014/0187295 A1 | 7/2014 | Kumar et al. |
| 2014/0217965 A1 | 8/2014 | Van Wiemeersch et al. |
| 2014/0232328 A1 | 8/2014 | Pegg et al. |
| 2014/0302782 A1 | 10/2014 | Raab et al. |
| 2014/0321048 A1 | 10/2014 | Kupferstein et al. |
| 2014/0333252 A1 | 11/2014 | Raponi |
| 2014/0342668 A1 | 11/2014 | Kyomitsu |
| 2014/0355200 A1 | 12/2014 | Thiers |
| 2015/0002088 A1 | 1/2015 | D'Agostino |
| 2015/0008875 A1 | 1/2015 | Ho et al. |
| 2015/0042268 A1 | 2/2015 | Chen et al. |
| 2015/0048237 A1 | 2/2015 | Turner et al. |
| 2015/0061589 A1 | 3/2015 | Woodrich et al. |
| 2015/0077927 A1 | 3/2015 | Barnett et al. |
| 2015/0080068 A1 | 3/2015 | Bracamontes |
| 2015/0091500 A1 | 4/2015 | Claudepierre |
| 2015/0099462 A1 | 4/2015 | Klassen |
| 2015/0115877 A1 | 4/2015 | Arai et al. |
| 2015/0126248 A1 | 5/2015 | Lachnitt |
| 2015/0146401 A1 | 5/2015 | Su et al. |
| 2015/0148102 A1 | 5/2015 | Samsilova |
| 2015/0156301 A1 | 6/2015 | Crawford et al. |
| 2015/0250065 A1 | 9/2015 | Hornick et al. |
| 2016/0138754 A1 | 5/2016 | Li |

FOREIGN PATENT DOCUMENTS

| | | |
|---|---|---|
| WO | 2012048454 A1 | 4/2012 |
| WO | 2014144608 A1 | 9/2014 |
| WO | 2015054796 A1 | 4/2015 |

OTHER PUBLICATIONS

About the Gear, "KTek Introduces Norbert Filmmaker Kit," Dec. 13, 2010, http://aboutthegear.com/news/k-tek-introduces-norbert%e2%84%a2-filmmaker-kit.

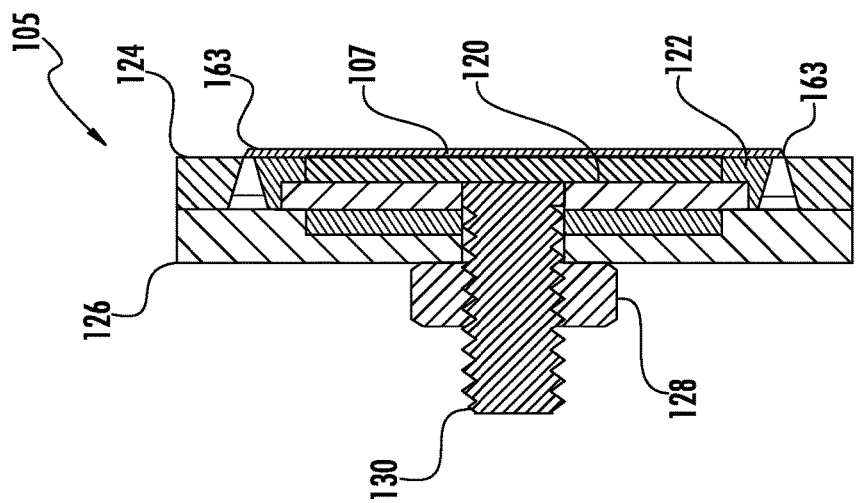
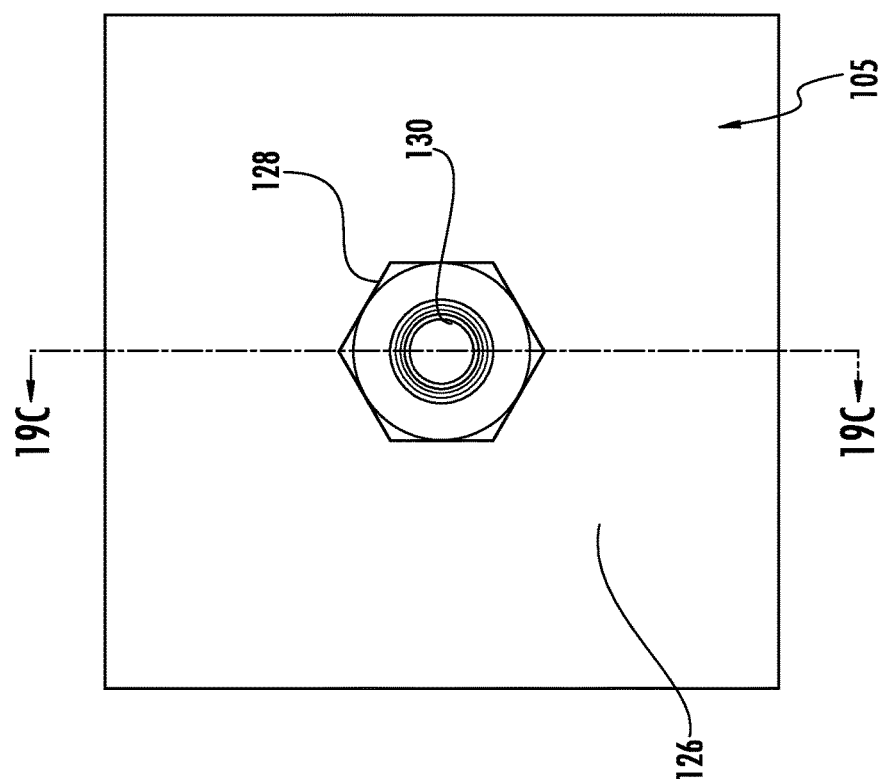
FIG. 19C
FIG. 19B

MAGNETIC MOUNT SYSTEM

CROSS-REFERENCE TO RELATED APPLICATIONS

This application claims priority as a continuation application of U.S. patent application Ser. No. 15/060,275 filed Mar. 3, 2016, entitled MAGNETIC MOUNT SYSTEM, which claims priority to U.S. Provisional Patent Application, Ser. No. 62/127,556, filed Mar. 3, 2015, entitled INDEXING MAGNETIC DEVICE MOUNT; and claims priority to U.S. Provisional Patent Application, Ser. No. 62/132,633, filed Mar. 13, 2015, entitled INTERMEDIARY DEVICE MOUNT ADAPTER; and claims priority to U.S. Provisional Patent Application, Ser. No. 62/236,718, filed Oct. 2, 2015, entitled ELECTRONIC DEVICE HOLDER AND SYSTEM WITH INTEGRATED CHARGING AND DATA TRANSFER INTERFACE; and claims priority to U.S. Provisional Patent Application, Ser. No. 62/289,550, filed Feb. 1, 2016, entitled SELF-ALIGNING, MAGNETIC COUPLING & DOCKING INTERFACE WITH ON-DEMAND DECOUPLING FEATURE, the entire contents of each of which is hereby incorporated herein by reference.

FIELD

The present inventions relate generally to magnetic device mounts, and more specifically to magnetic device mount systems having multiple poles which mate with a corresponding magnetic holder for a device.

BACKGROUND

Magnetic device mounts are generally known. However, such known device mounts rely on mechanical means to assist with positioning when required, such as mechanical detents and motion stops. These mechanical systems have several drawbacks including limited accuracy and clumsiness, along with specific alignment requirements to enable attachment.

In addition, there are currently no known devices designed for supplementary intermediary attachment of devices to a tripod or other similar mounting system. While some devices designed for attachment to a tripod, bipod, or monopod can provide additional features in reference to the mounted device, these existing devices have various drawbacks. These drawbacks include, for example, the manner by which the intermediary attachment devices are mounted, as there is a wide range of device dimensions and no simple way to reliably attach to a broad range of devices. Instead, such systems attach to only a few devices within a narrow range of dimensional and configurational parameters.

As portable consumer electronics have become necessary everyday items, problems have emerged regarding how to safely hold and charge these devices. Various solutions exist for holding smartphones, tablets, and other devices for protection, transportation, and access in a range of situations.

Many device owners purchase cases for their devices to help protect the device from damage, allow for ease of handling, or to enable additional features (for example, a phone case that has a wallet capability). These device cases typically act as a basic shield against dropping or other mishaps, and have pre-positioned holes to allow for interaction with various ports provided on the device—for example, the data port, camera, buttons such as volume control and power, or the headphone jack. These holes offer a simple cut-away or pre-positioned hole for ease of access by the user to allow direct interaction with ports in the device itself.

However, such a device case has various disadvantages. For example, many owners have dropped their devices in a liquid at some point. By having available unprotected ports, liquid is allowed to enter into the device, ruining the device. Some cases have attempted to solve this problem, but many use a simple flip valve, which relies on the use of a dynamic seal and is not capable of sealing the port while the port is in use. These dynamic sealing mechanisms are also subject to damage or malfunction. In addition, if a consumer does not like the position of the port in the device, known device covers do not allow for options for port re-positioning or alternative peripheral components. In addition, in many situations the hole provided to access the device port is not sufficiently sized to allow integration with some cord ends.

These example cases frequently allow for charging by way of a manufacturer's allowed charging mechanism. For example, many devices charge via USB and USB-type data ports. The apertures provided within the known cases allow for charging via the manufacturer-provided port using manufacturer-provided charging accessories. Many devices have charging mechanisms that are unique or proprietary to the device model or manufacturer. Therefore, in households with multiple device types, some chargers and devices are not compatible across multiple devices.

Some portable electronic devices now provide for wireless charging. From a consumer perspective, wireless charging allows for charging a wireless-charging-enabled device by placing the device on a wireless-charging mat, base, or surface. Wireless charging uses the known phenomenon that power can be transferred between two objects between two coils utilizing an alternating electromagnetic field (e.g., the "Tesla Coil"). Known wireless-charging devices include an inductor which transmits a signal using a primary coil to a receiving coil embedded in the electronic device to receive the power-transmission signal. Wireless charging may have various disadvantages, including requiring integration directly into the device, lower power transfer efficiency, heat build up, slower rate of power transmission, and alignment particularities. Alignment particularities arise when the device is not placed in specific alignment with the charging coils provided within the charging base, mat, or surface. In addition, the device and charging base, mat, or surface may take time to recognize each other. That is, a period of time may need to lapse after establishing physical contact between the device and base, mat, or surface before charging begins. It may be only after this period of time that a consumer may realize, typically via a visual indication there are alignment problems between the device and base, mat, and surface. Slight misalignment may still allow power transfer to occur albeit at a slower and less efficient rate with additional heat generation.

A smaller number of device cases allow for integration with wireless charging. Known device cases typically do not expand the functionality of the device they house; most times the device holder is a passive recipient serving only to act as a protective layer and wireless charging receiver.

Some device cases allow for limited permeability of liquids into the case for the purpose of protecting the electronic device. Such known device cases have a number of disadvantages, including requiring additional flaps or case pieces in order to cover apertures provided on the device. In addition, the protective features of the cases may reduce the sound quality perceived or transmitted by the user of the protected device.

Consumers may likewise wish for holders or mounts for their devices, and many exist. For example, consumers may wish for a device holder for driving, reading, or other uses where holding the device directly is not safe, desirable, ergonomic, or feasible, but consumers still wish to have access to the device. Current device mounts may wobble, lose orientation, lose connectivity, and thereby frustrate the purpose of use, or otherwise be difficult to repeatedly place and remove the device from its location.

SUMMARY

Accordingly, a magnetic mounting system is disclosed. The system includes a device having a magnetic attachment feature and a magnetic device mount. The magnetic device mount has a mating magnetic attachment feature. The magnetic attachment feature and mating magnetic attachment feature allow specific angular, radial, and/or longitudinal alignment of the device relative to the mount without a mechanical interface. An electronic device holder and charging system with integrated charging and data transfer interface and a self-aligning, magnetic coupling and docking interface with on-demand decoupling feature are also disclosed.

The disclosed magnetic device mount allows for correct and specific angular, radial, and/or longitudinal alignment of the device relative to the mount without a mechanical interface. The disclosed indexing magnetic device mount allows for easy, rapid, and non-specific alignment for attachment and positioning of the device. This behavior can be advantageous in applications where accurate alignment and/or positioning of a device with its surrounding environment (including other devices) may be critical to correct functioning, or where the device is just easier to use or is more aesthetically pleasing in a particular alignment or position.

This mounting device and system are designed to specifically address the drawbacks and/or lack of existing positioning and/or repositioning mounts for devices. For example, the described mount has the ability to repeatedly and reliably attach, detach, and index radially, axially or longitudinally in a non-mechanical manner the corresponding mating device for accurate positioning with the mount. This configuration results in the ability to select the specific position angularly, radially, and longitudinally the device will magnetically align to when attached or brought within a proximal range without fine-tuning after attachment.

The device may have two or more magnetic sections: the first section may have a device holder; for example, a phone or other device case and/or clamp—which has a first magnetic feature. The first magnetic feature will be specially configured to interact with a second and/or multiple other magnetic features. The second magnetic feature may be designed to fasten to something else—for example, a support structure, a wall or other surface, a gun, a scope, and the like. The magnetic feature may also be designed to fasten to other applications including, but not limited to, vehicles, bicycles, helmets, wheelchairs, etc.

In various embodiments, the second magnetic feature is coupled to a pivotable ball or balls, which in turn is received by a clamp or socket designed to accept the ball(s). The clamp or socket may be attached to a variety of devices, including other balls and sockets. In one embodiment, the attached device may be a scope mount for a gun. In another embodiment, the attached device may be a flashlight or cylinder having a power storage device having a USB port or other charging means to be attached to a gun or gun scope. In other embodiments, the indexing magnetic device mount may also be used to attach and secure a flashlight or other device quickly and accurately to a gun or scope. In that instance, a differing attachment means may be provided between the mounting means to the weapon itself and may include another attachment means. In yet another embodiment, the means may be used to fasten a device to a helmet or a vehicle such as, but not limited to, a bike, car, ATV, boat, snowmobile, and the like.

In summary, an indexing magnetic device mount is disclosed. The mount provides for easy, repeatable, and predictable behavior when a mating device is attached to a corresponding mount.

An intermediary device mount adapter is also disclosed. This adapter is designed to specifically address the drawbacks of, and/or lack of existing adapters for the supplementation of mounted devices. Cameras, spotting scopes, and other devices often contain or use a universal mounting system consisting of a mating threaded insert and locating hole typically in the device and a captured bolt and locating pin attached to a separable mounting plate or fixture. The mount adapter may directly or otherwise attach to the tripod or other suitable mount. On an opposite side, the mount adapter may directly or otherwise attach to a device such as a camera or scope.

The adapter also allows for one or more ancillary and/or supplementary devices. The function of the now mountable additional device(s) can be of a complementary or disparate nature. Once the intermediary adapter is attached to the device, the mount adapter or an additional intermediary adapter is attached to the first intermediary adapter, which may then be attached to the mount(s) thus completing the device mount system.

In this regard, an intermediary device mount adapter is provided which may include, but is not limited to, a first side having an attachment profile surface, a second side having an attachment profile surface, threaded holes for accepting mounting means, a threaded stud for interfacing with device mounting means, and supplemental attachment means for attaching other devices.

An electronic device holder and charging system with integrated charging and data transfer interface is also disclosed. The system provides for easy, repeatable, and predictable behavior when a compatible electronic device is attached to a corresponding mount. The system also allows for the integration of a number of charging options, as well as device peripherals. In various but not all embodiments, the electronic device holder and charging system with integrated charging and data transfer interface comprises several components: an electronic device, device case, device peripheral and an electronic device mount. These may include one or more indexing magnets, a housing, control circuitry, ports, a male device plug/jack(s), and charging mechanism(s). The charging mechanisms may include multiple ports for different charger types, a wireless charging coil, and a cordless contact-charging system. The electronic device mount may include a mating indexing magnet; a claw, strap, suction, or screw-down surface attachment mechanism; and mating charging mechanisms. The mating charging mechanism may include a mating wireless charging coil and/or mating cordless contact chargers; likewise it may allow for a suitable power input port such as a USB or other suitable port. In various embodiments, peripherals may be included for interaction with the device case and or mount such as a power bank or portable charging system, controller, or any other suitable device having the mating cordless contact-charging system.

A self-aligning, magnetic coupling and docking interface with on-demand decoupling feature is also disclosed.

These and other features and advantages of devices, systems, and methods according to this invention are described in, or are apparent from, the following detailed descriptions of various examples of embodiments.

BRIEF DESCRIPTION OF DRAWINGS

Various examples of embodiments of the systems, devices, and methods according to this invention will be described in detail, with reference to the following figures, wherein:

FIG. 19b is a rear plan view of the charger interface or magnetic mount according to one or more examples of embodiments.

FIG. 19c is a cross-sectional view of the charger interface shown in FIG. 19b, taken along line A-A of FIG. 19b.

Figure 1:
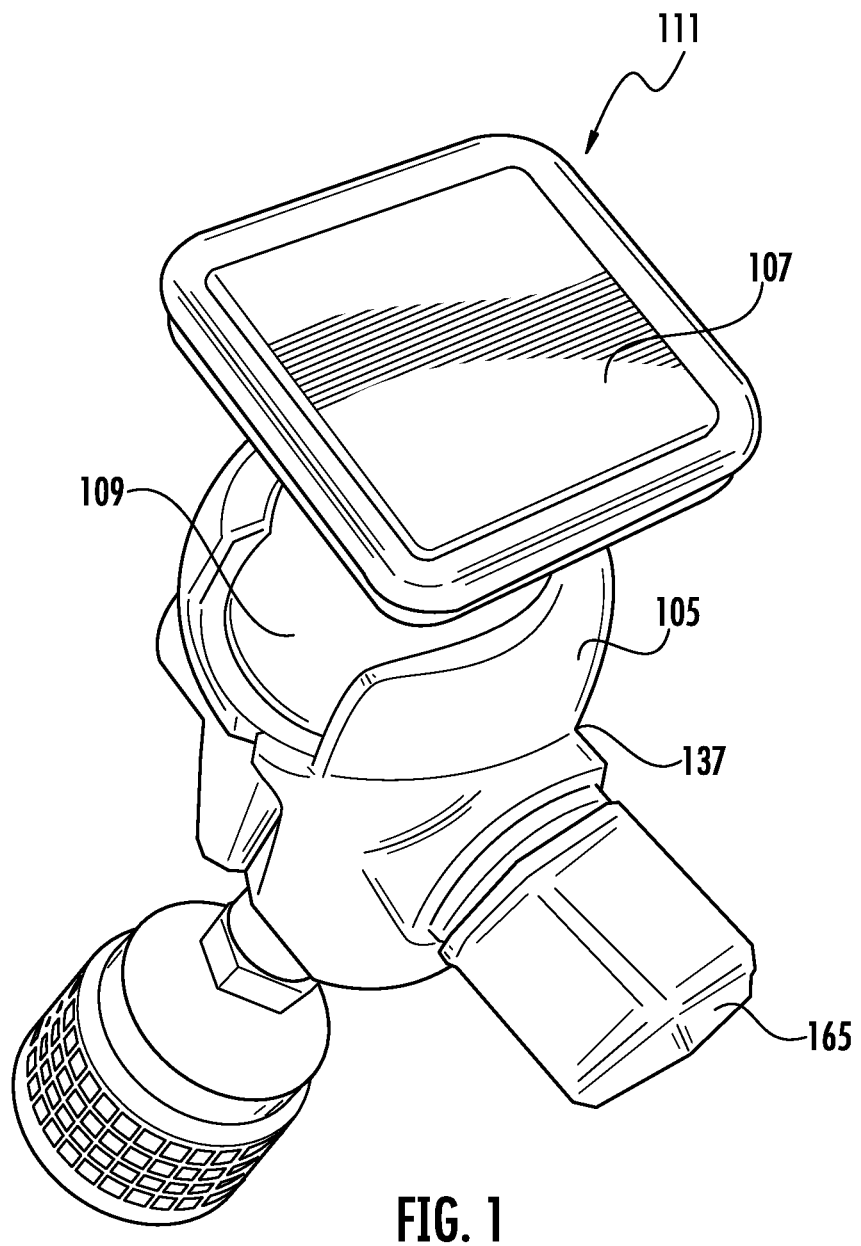
FIG. 1 is a perspective view of a magnetic mount according to one or more examples of embodiments, showing a ball and clamp having a multipole magnetic mount or attachment feature for mating with a device.

It should be understood that the drawings are not necessarily to scale. In certain instances, details that are not necessary to the understanding of the invention or render other details difficult to perceive may have been omitted. It should be understood, of course, that the invention is not necessarily limited to the particular embodiments illustrated herein.

DETAILED DESCRIPTION

Referring to the Figures, a magnetic mounting device and system are disclosed.

Referring in particular to FIGS. 1-8, the magnetic mounting device is primarily comprised of two components: first, a device mount section 101 having a magnetic attachment means 103 which holds or is otherwise connected to a first device, and a second device mount section 105 having a mating magnetic attachment means 107 which is likewise attached to the desired host or second device. The first device mount section 101 may comprise a case or bracket for holding a smart phone, camera, tablet, or other device. The second device mount section 105 may include a surface having a corresponding magnetic attachment means 107, along with means to attach the second section to any number of desired devices. It should be understood that any number of secondary device mount sections can be used with any number of first device mount sections. This is to say any number of mated primary and secondary device mounts may be attached.

Using the mating indexing magnetic attachment means 103, 107, the first device 101 can be easily indexed to additional positions at predictable and programmed intervals. Movement of the device 101 to weaker magnetic force positions may facilitate easy removal of the device from the mount 105. In various embodiments, the magnet 103 or 107 may be fastened to a particular device, and may include adhesively attaching a multipole magnetic feature to a thin piece of metal, which is then attached to the respective device, or other means of fixedly attaching the magnet to the device suitable for the intended purposes. For example, the multipole magnetic features may be attached to a device housing or the mount body by any suitable attachment means including, but not limited to, glue, welding, interference, or other fit means.

In turn, the device mount 105 is pivotably, rotationally, or otherwise coupled using optimized mechanical means to a desired host for proper alignment. In one or more examples of embodiments, the second section 105 may also include force-damping means by way of calculated positioning, damping material, magnetic eddy-current damper, or other force-damping mechanism(s) discussed further herein below.

According to one or more examples of embodiments, and shown in FIGS. 1, 2, 5 & 9, an indexing magnetic device mount 105 is provided including an adjustable (XYZ axis and/or pan, tilt and rotation) angular, spherical, hemispherical and/or ball or multiple point of adjustment fixed mount for angular, rotational, and positional adjustment of the mount relative to the surface or protrusion it is mounted to as well as its corresponding mating device 101. The mount 105 is formed of any suitable material, such as plastic, glass, ceramic, composite or metal. The mount 105 is constructed in a manner to allow for incorporation of the appropriate means of providing the necessary magnetic poles in their respective required relative position or pole pattern for inducing the desired behavior during attachment, while attached, or during removal.

The indexing magnetic device mount 105 may be attached to any surface via any means of fastening whether permanent or temporary. The indexing magnetic device mount 105 incorporates at least one magnet or magnet assembly 107 having multiple polarities ("multipole magnetic features") either on the mount 105 and/or the device 101 to facilitate the corresponding behavior of the mating device relative to the mount when attached or brought into close proximity. For example, when the indexing magnetic device mount 105 is brought within range of its mating device 101, specific behavior (i.e. orientation or alignment) may be induced. The correct number and arrangement of the magnetic poles (e.g., see FIGS. 4 & 8) and their relative position on the mount 105 and/or its mating device 101 may allow for the selection of the desired positioning and/or alignment of the device relative to its mating mount. In contrast, if a user seeks to apply the device to a non-mating mount, the non-mating mount may prevent integration or interfacing of the device onto the non-mating mount. In other words, the correct number and arrangement of magnetic poles creates a mating magnetic lock-and-key system. In the alternative, the magnet of the device may attach to any metallic surface, consistent with the behavior of a traditional magnet, and/or with an enhanced magnetic attraction.

The selection and positioning of the magnetic poles allows for the ability to design into both the device(s) and the mount(s) the specific behavior and/or positioning most desirable for the best functioning of the system when attached, connected or positioned in a proximal location (i.e., the magnet is "programmed" with a specific behavior and/or positioning). A spherical, hemispherical and/or ball mount 109 further incorporates the ability to rotationally and angularly adjust and position the mount 105 in the most desirable configuration and lock it into place. This allows the mount to reliably and repeatedly position the device into the selected spatial, radial, longitudinal, and angular position for optimum functionality. The magnetic pole arrangement may also be optimized for proper removal of the device 101 from the mount 105. The mount 105 may incorporate a variety of means to provide the appropriate combination and relative position of its magnetic poles, including permanent magnets as well as non-permanent, electromagnets, magnetic shielding, magnetic flux ducting, or redirection through appropriately magnetically conductive materials.

The indexing magnetic device mount 105 also may include non-magnetic componentry such as, but not limited to, hinges, clamps, adhesives, and/or holes for fasteners to facilitate the attachment and positioning of moveable and non-moveable components for mounting the device mount as desired to the surface of a device, structure, or vehicle.

As indicated, the indexing magnetic device mount 105 has the ability to selectively align and position a device(s) 101 in three dimensions, (X, Y, Z) as well as angular (A, B, pan, tilt) positioning relative to itself as a response of the interaction of the corresponding magnetic fields including the polarity configuration of the device(s) and the mount. Both the mount 105 and the device 101 may also utilize other magnetic or non-magnetic materials as a secondary means of positioning, such as spacers, standoffs, indexers, detents, and/or friction reducing materials to facilitate more accurate magnetic indexing. The friction-reducing means at the interface may be particularly important when a device is not quite properly aligned in order for the magnetic fields to effectively facilitate correction.

Figure 2:
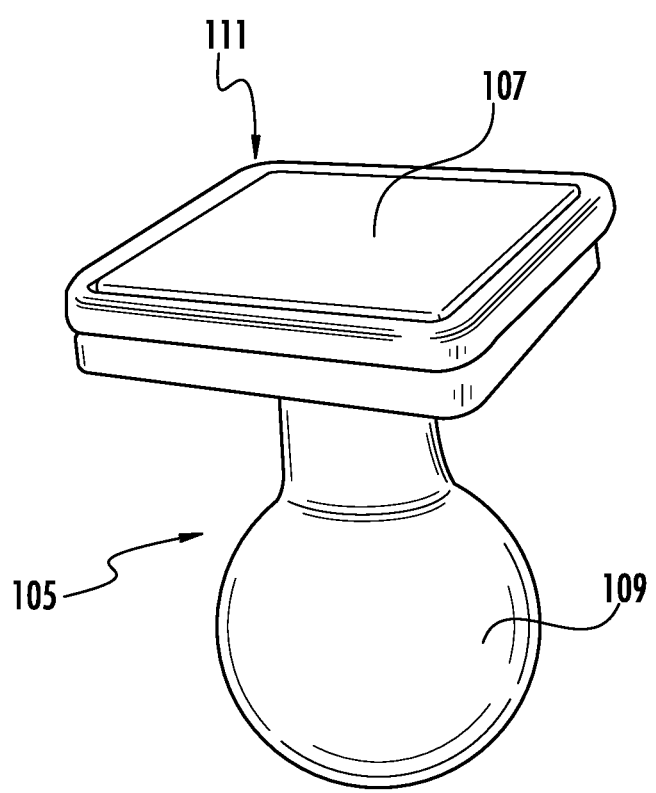
FIG. 2 is a partial perspective view of the magnetic mount of FIG. 1, showing the magnetic mount or attachment feature on a ball joint.
Figure 3:
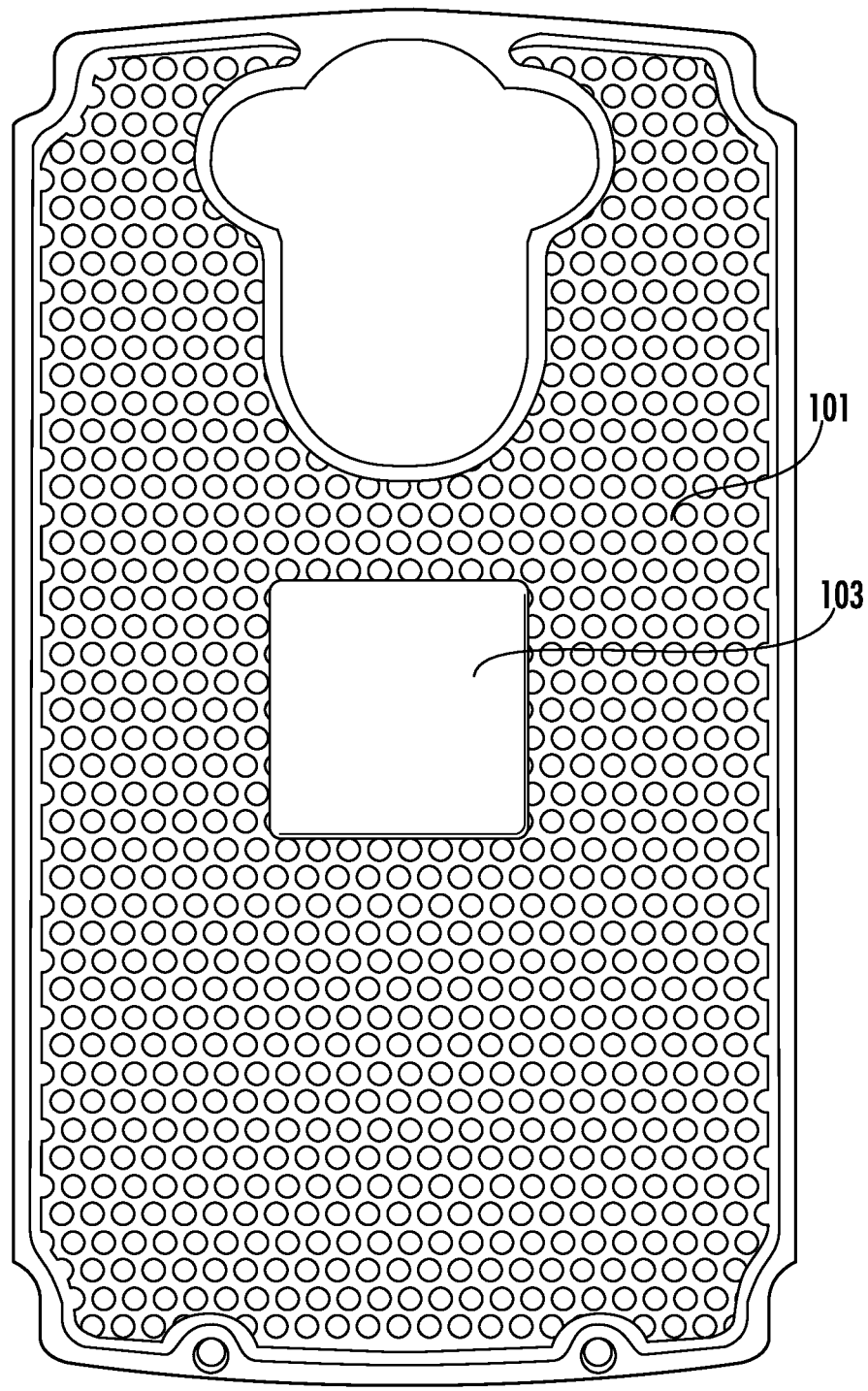
FIG. 3 is a plan view of a case for an electronic device for use with the magnetic mount of FIG. 1, showing a mating indexing magnetic attachment feature for releasably coupling to the mount of FIG. 1.

FIGS. 1-2 display the mounting surface side 111 (as differentiated from the device side) of an indexing device mount 105. This particular example uses a ball an socket fastening means 109 to pivotably couple the indexing device mount to a gun or gun scope 113 (see FIG. 5). FIG. 3 shows an example of a corresponding device or electronic device holder 101. In this embodiment, the device holder 101 is for a smartphone. Looking specifically to FIG. 3, a corresponding multipole magnetic feature 103 is provided within a smartphone case 101. While a gun, gun scope and a smartphone are specifically described for illustrative purposes, one of skill in the art would understand that any device may be suitable for use with and obtain similar or identical interaction of respective devices to which the indexing magnetic device mount components have been attached. For instance, while specifically calling for a smart phone, other devices are contemplated as within the scope of this disclosure, including tablets, cameras, or non-electronic devices that could benefit from being pivotably attached and angularly aligned by way of the means provided herein.

Figure 4:
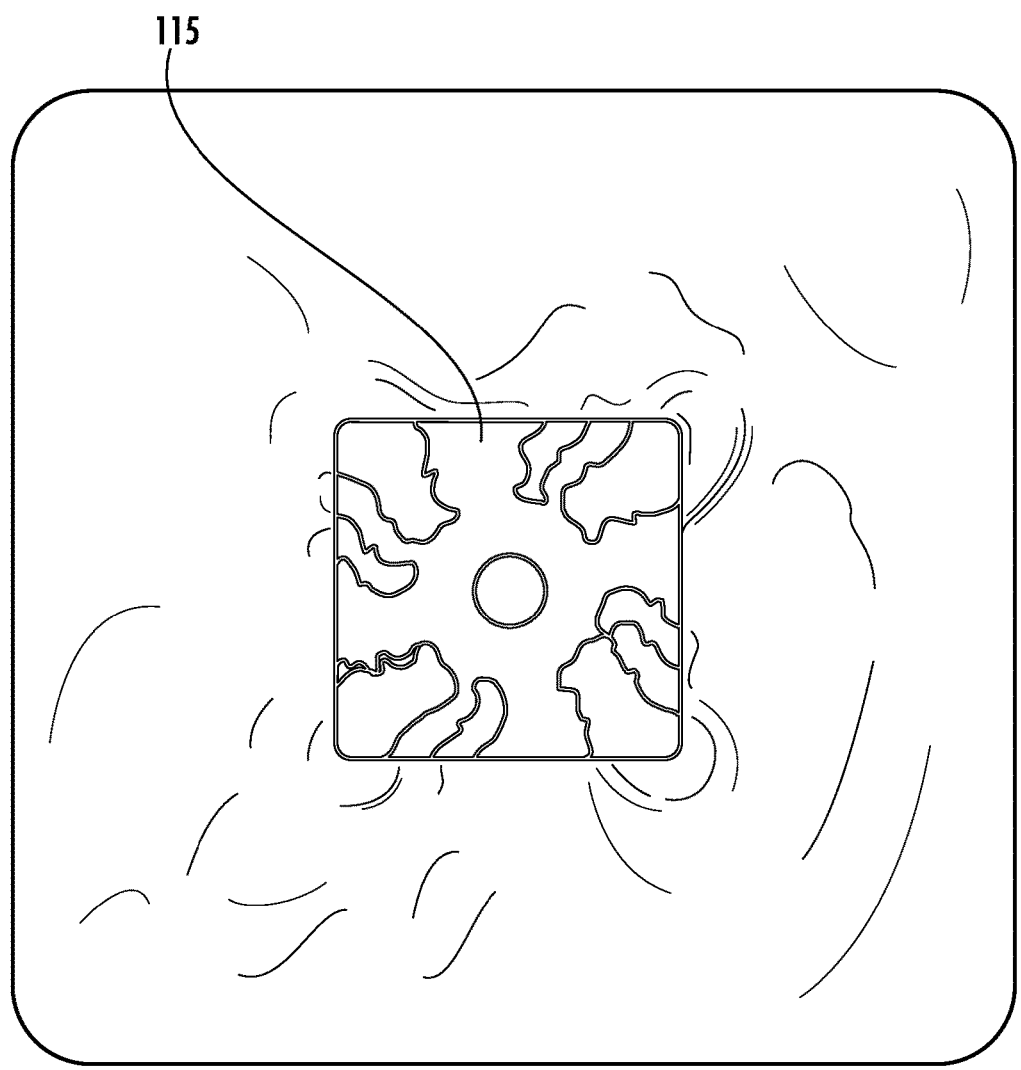
FIG. 4 is a detailed view showing one or more examples of the polarization of the indexing magnetic attachment feature of FIG. 1.

FIG. 4 displays the polarity pattern 115 of the multipole magnetic feature 107 as provided on the mounting surface side 111 of the indexing device mount 105 in one or more examples of embodiments. As shown, the feature has a pinwheel pattern of polarity 115 extending radially from the center of the magnetic attachment means 107. One of the practical effects of this polarity arrangement is the ability to rotationally index a mating patterned polarity device 103 easily and reliably to a desired location and orientation. In various embodiments, this ability is known as centering and rotational detent functionality—allowing for peak attraction at predefined intervals between the two magnetic attachment means having the polarity patterns.

Referring to FIGS. 5-8, attachment means between a scope 113 and flashlight 117 are disclosed. As indicated, while a scope is specifically disclosed for purposes of example, various devices may be used without departing from the overall scope of the present inventions. Specifically looking to FIG. 8, the polarity pattern 119 of the magnetic attachment means 121 is disclosed. In this embodiment, a radial pattern 119 is employed which allows for, among other things, accurate centering of the devices.

Figure 5:
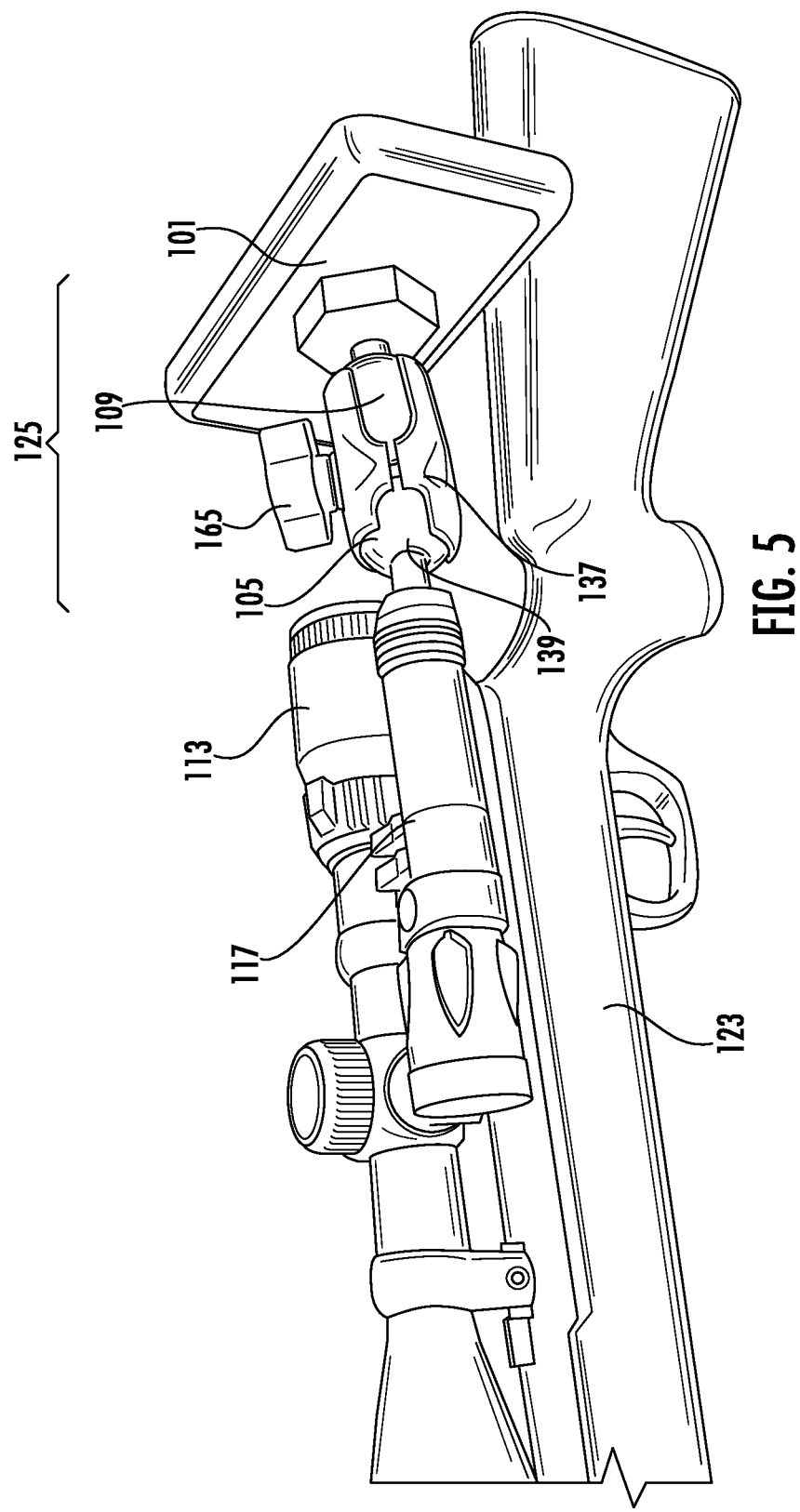
FIG. 5 is a partial perspective view, showing the attachment of the magnetic mount of FIG. 1 to the case and its magnetic attachment feature of FIG. 3, wherein the case is carrying an electronic device, and also showing attachment of the magnetic mount to a support structure, namely a rife, scope, and flashlight according to one or more particular examples of embodiments.
Figure 6:
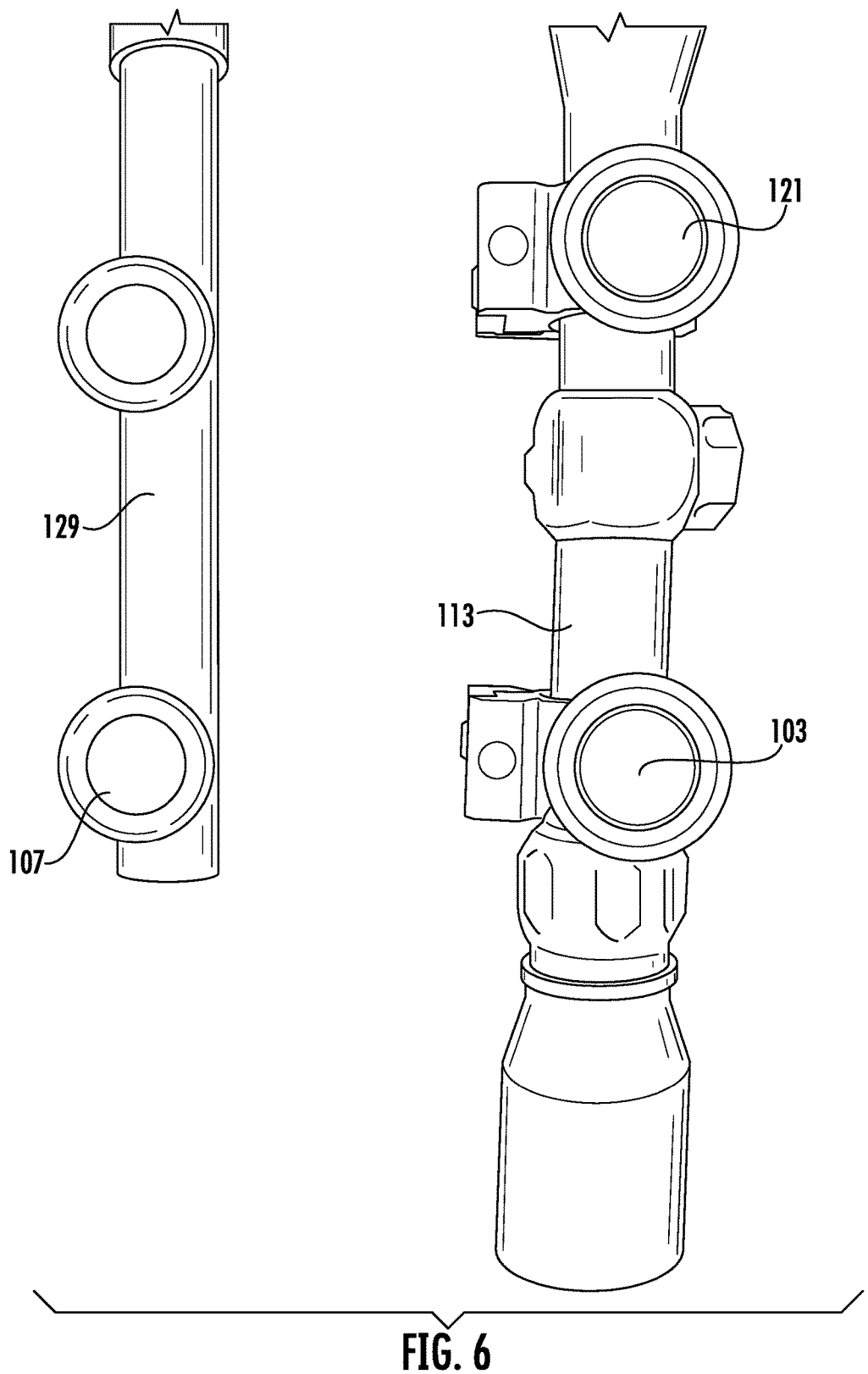
FIG. 6 is a partial elevation view of magnetic attachment features according to one or more alternative examples of embodiments, showing a scope and charger having mating magnetic attachment features.
Figure 7:
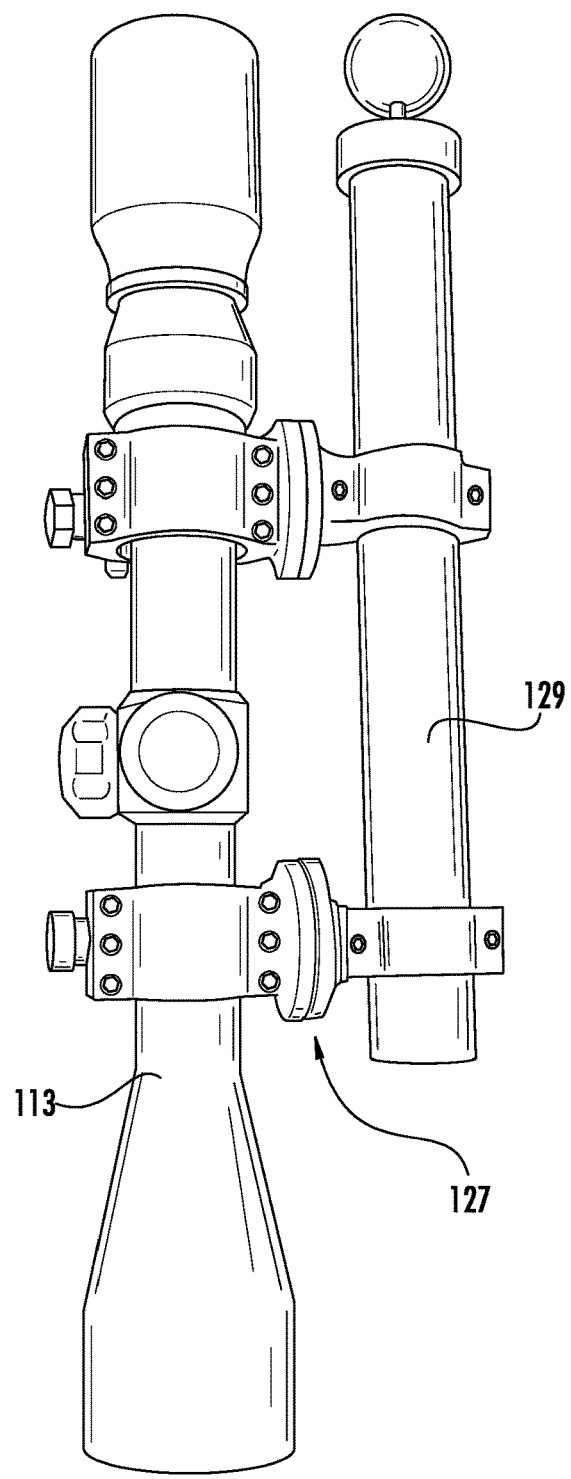
FIG. 7 is an elevation view of the scope and charger of FIG. 6, showing the mating magnetic attachment features joined or attached together.
Figure 8:
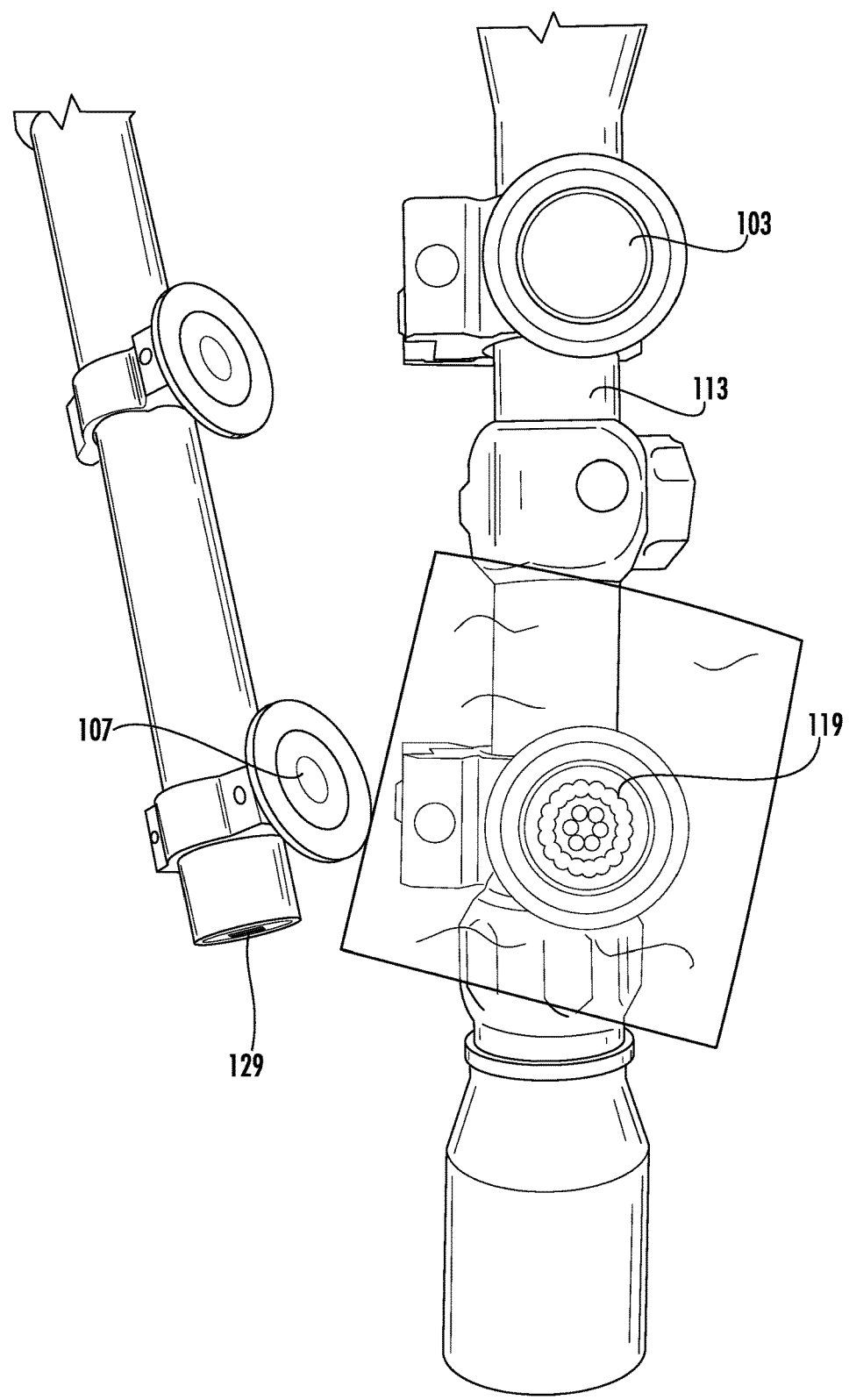
FIG. 8 is a partial detailed view showing one or more alternative examples of polarization of the indexing magnetic attachment feature of FIG. 6.
Figure 9:
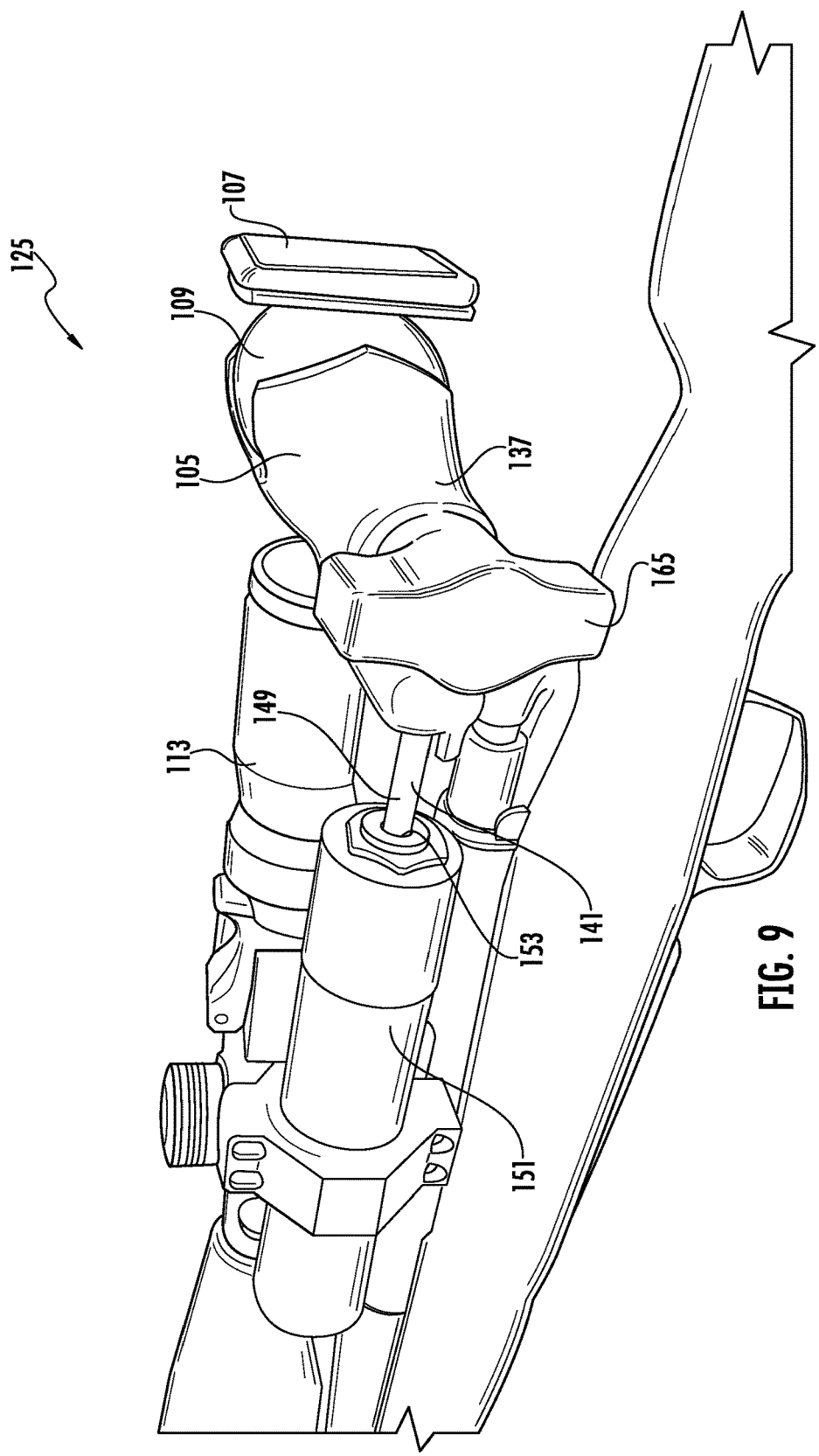
FIG. 9 is a perspective view of a magnetic mounting system including a damping system for use with the mount according to one or more examples of embodiments.

Referring to FIGS. 5 & 9, an example indexing device mount system is illustrated as used in the context of a gun 123 having a flashlight 117 and smartphone scope mount 125. While a gun, flashlight and smartphone scope mount are disclosed, variations thereon may be used without departing from the overall scope of the present inventions. As can be seen, the smartphone mount 125 having indexing magnetic attachment means 127 is mounted to a flashlight 117 using rotational coupling means. In various embodiments, this flashlight 117 may include charging means 129 for the smartphone or other device. Alternatively, the charging means 129 may be provided in place of the flashlight (e.g., FIGS. 6-7). These charging means 129 may include, in various embodiments, a battery cell or other energy storage means having a USB port for coupling with a device. In various other embodiments, the smartphone holder may include warming means (not shown) for improved functioning of the phone in cold conditions, including but not limited to, using a resistance element, flameless combustion means, or chemical means. In various embodiments, a charger, fuel container and/or fuel cell for providing means of heat and/or electrical power may be provided in a tube or cylinder that is not a flashlight.

To use the mating magnetic devices, the corresponding magnetic attachment means must be configured on mating parts of the mount. From the device end, a device holder 101 such as a case or mounting bracket may need to be provided. In various embodiments, the indexing magnetic attachment means 103 may be inserted into the bracket or case 101. In an alternative embodiment, the magnetic attachment means 103 may be provided on top of the bracket or case. In various embodiments, the magnetic attachment means may be attached using a "flux-ducting" damping mechanism, see FIGS. 9-11.

Figure 11:
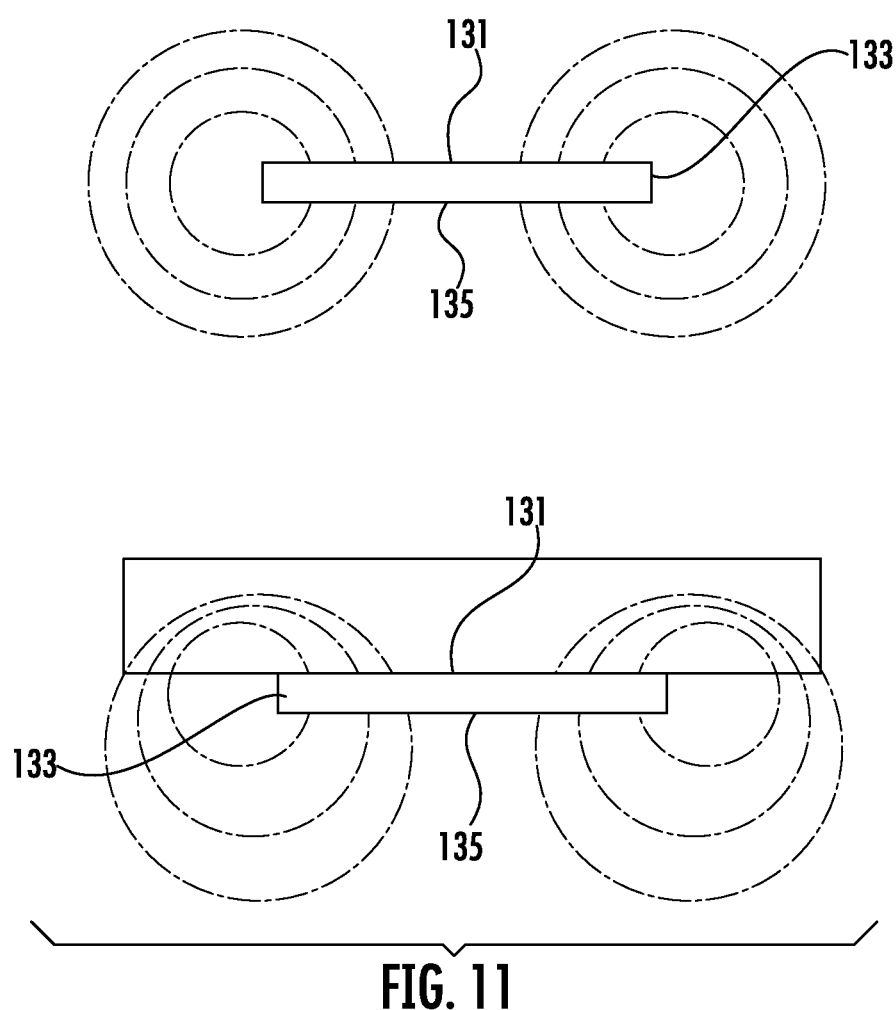
FIG. 11 is an illustration of magnetic flux ducting or concentration resulting from use of the magnetic mounting system in one or more examples of embodiments.

The flux-ducting damping mechanism, in various embodiments, may comprise an aluminum plate attached to a device housing or mount body with an adhesive, which is in turn fastened to the magnetic attachment means using magnetic force and further adhesive. FIG. 11 illustrates one or more examples of how "flux-ducting" intensifies magnetic strength by routing flux via a magnetically suitable material from one side 131 of a magnet 133 to the other side 135 in a shorter path than would be possible without the ducting. This property, when properly used, can facilitate the use of smaller or less powerful magnets. When used with the multipole magnetic features, the accuracy of alignment is improved as well as the strength of the magnetic attraction.

Corresponding indexing magnetic attachment means 107 may also be provided on the surface 111 to which the device is to be mounted. The surface may likewise be pivotably coupled to an adjustment means for pivotable interaction with a desired hosting device. For example, looking to FIGS. 3 & 5, a phone is provided within a case 101 which has an embedded multipole magnetic feature 103. While a phone is specifically illustrated, various alternative devices may be used without departing from the overall scope of the present invention. The indexing magnetic attachment means 103 couple to a mating indexing attachment means 107 provided on a hexagonal metal attachment piece 105. This piece, as shown, has a bulbous end portion 109. This end piece 109, in various embodiments, pivotably couples to a mating clamp-like device or double-socket arm 137, which likewise pivotably couples to a corresponding bulbous end 139 provided on another device, such as but not limited to on a flashlight. The practical effect of this configuration is the ability to provide initial fine-tuning with the pivotable coupling means, then having follow-up ease of attachment, removal, and indexing rotation of the smartphone or device without compromising durability.

It should be understood that while these attachment means are shown specifically with round pivoting means and clamp-like attachment mechanisms, many other attachment means are contemplated as within the scope of this disclosure. In various embodiments, attachment to the device, (e.g., scope) may include a cam-lock or other type of mount or connecting device.

An additional feature enabled by the shape or design of the magnetic mount, as discussed in greater detail herein below, is the ability to more easily utilize wireless and or inductive charging technology in applications or situations where movement or position would otherwise prevent or make charging difficult without additional mechanical constraints. Since the mating magnets function to not only affix the device to the mount, but to also align it in a specific and predictable orientation, both the transmitting and receiving antennae in the device and the charger can be optimized for size, shape, configuration and location. The power supply for a charging device of any kind may be provided from any suitable source including, but not limited to, internal and or external batteries, line voltage from the grid, generators and alternators, solar PV cells or thermal generators. As a specific but non-limiting example, the charging means include integration of known "touch-charging" mechanisms and potential variants. This feature is useful to many applications of the device, including, but not limited to, a car dash mount and a home charging dock.

In various embodiments, the magnetic attachment means 103, 107 may require a friction-reducing coating, material, and/or feature provided on its surface. The friction-reducing coating, material, and/or surface feature may assist with proper alignment of the poles and ease of indexing without creating mechanical detents. Such means may also facilitate twist-removal of the magnetic attachment means. By twisting the device out of alignment, the magnetic pull is lessened and removal is facilitated. The friction-reducing material will ideally be thin. By keeping the friction-reducing material thin, the interfacing magnetic fields will maintain optimal attractive force at predetermined proximities. This proximity/attraction force ratio is optimized for the device attachment mechanism by the selected magnetic pole arrangement.

Referring again to FIGS. 9-11, force damping means are also disclosed. Non-mechanical magnetic device attachment means can be sensitive to dislodging forces. For example, when a gun fires, a kick or recoil force is exerted on the device and its mount. In another example, a backward momentum force is exerted on an occupant or vehicle when a car, bike, or other means of transportation encounters or exhibits a change in angular velocity. As such, a mounted device may need to be configured to damp these forces. Therefore, means for dampening recoil or change in angular velocity are provided.

Figure 10:
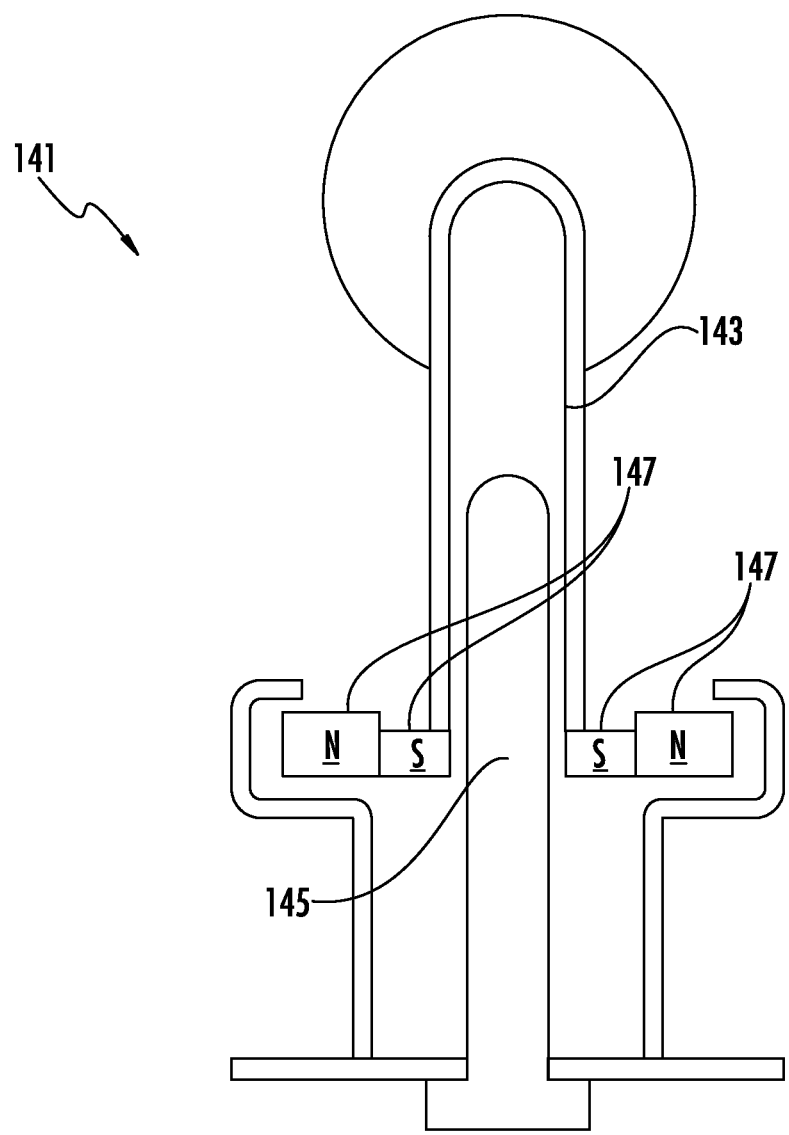
FIG. 10 is an illustration of an alternative damping system for use with the mount according to one or more examples of embodiments.

One or more examples of a dampening mechanism 141 are shown in FIG. 10. In particular, an example of a potential magnetic damping shock absorption system 141 is disclosed. For instance, a magnetic eddy current damper is provided. The dampener induces an electric current on the surface of the metal. The amount of damping or resistive force is provided relative to the velocity of the magnetic field across the conductive surface.

In one embodiment, the eddy current damper is a magnet 147 or tube 143 movably and slide-ably affixed to a centering shaft 145 to allow for centering alignment with minimal contact within an electrically conductive and or magnetic tube. When force is applied, the magnet 147 or tube 143 is moved within the magnetic flux. The motion of the magnet's flux relative to the tube 143 thereby induces a current, creating a resistive and/or damping electromagnetic counter-force. The magnets 147 and corresponding tubes 143 may also be compounded in concentric, serial, and/or parallel configurations. The configuration may be selected to increase damping force, distance of movement and maintenance of alignment throughout the damping cycle. Additional magnets or magnetic elements may also be incorporated into the damper to facilitate certain predictable and repeatable non-mechanical contact induced behaviors such as, but not limited to, additional resistance areas of travel and/or magnetic springs.

In another embodiment of a damper 141, a piston 149 and cylinder 151 are assembled with a means of reducing the propensity of the shaft 153 attached to the piston 149 to rotate relative to its cylinder. This is important for some applications to maintain alignment during a shock-absorbing event. In an arrangement such as this, the flow of a fluid or gas acts in conjunction with the friction of the piston in the cylinder, as well as the friction of the shaft in its corresponding bushing, function as the means or energy dissipation. Springs, compressed gas, or a vacuum may be utilized as a means of returning the damper to the desired position.

This configuration results in the advantageous effect of increasing resistance and damping the faster the device changes velocity. The damping system 141 may also be provided with additional damping means, such as using an elastomer ball mount. By changing the mount materials, shock may also be diminished.

FIG. 9 shows the device mount having another alternative damping means 141. In this particular example, the damping means includes a pneumatic actuator. The actuator is a double aperture actuator that takes in air, causing retraction and in turn a vacuum to aid in vacuum-assisted return. In various embodiments, an obstruction is provided in the port that makes the actuator extend, creating a vacuum at an opposite end so that when force is relieved, the device is recharged for the next round.

These force damping mechanisms 141 may also include means for maintaining angular alignment of the device relative to the mount, such as a square or other non-round shaft incorporated into a similarly shaped bearing and/or bushing to provide anti-rotation, and which may slidably move in either direction to attenuate shock emanating from either direction of travel relative to the position of the mount and the slidable shaft.

It should be understood that other damping configurations may be used, including gas fluid absorption components, springs, or other shock abatement means. Problems with recoil may also be abated using proper positioning, including, but not limited to, calculations regarding center of mass as customized to the mounted device itself.

In addition to the foregoing describe magnetic mount device, the present inventions also relate generally to an adapter for devices to integrate with a tripod or other mount, and more specifically to an adapter allowing attachment and integration of additional devices to the mount. These devices may be utilized in various positions relative to the adapter.

An intermediary device mount adapter 100 is provided including a fixed mount(s) to contain the components with the correct attachment provisions to facilitate mounting additional devices and mounts using the universal camera mount type mount. Referring now in detail to FIGS. 12-15, various non-limiting embodiments of the intermediary device mount adapter constructed according to the present disclosure are disclosed. An intermediary device mount adapter 100 is provided, having a first side 102 and second side 104.

Figure 12:
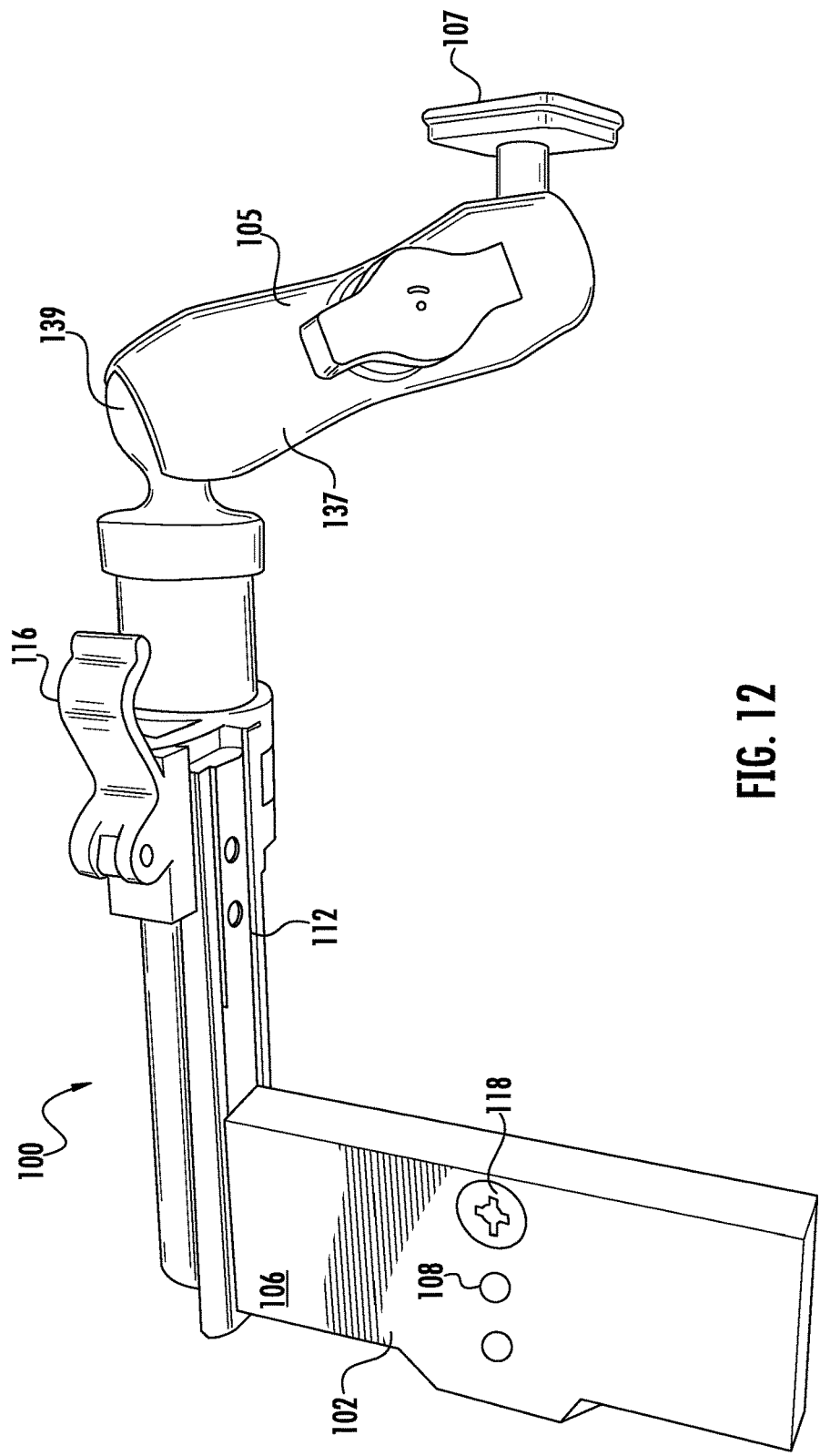
FIG. 12 is a perspective view of one or more examples of embodiments of an intermediate device mount adapter for use with the magnetic mounting system.

FIG. 12 illustrates the intermediary device mount adapter 100 having a first side 102. The first side 102 has an attachment profile or surface 106. Atop the attachment profile surface 106 are threaded holes 108 and a screw tightening attachment piece 118. In addition, provided on the side of the adapter 100 is a side attachment means 112. As can be seen by the present embodiment, the side attachment means 112 may take the form of a rail having grooves. In addition, the side attachment means 112 may include a mechanism for quick release 116. As shown in FIG. 12, a cylindrical device attachment may couple to this attachment means. The first side 102 of the intermediary device mount adapter 100 may be adapted to attach to a particular mount, such as, but not limited to, a tripod mount.

Figure 13:
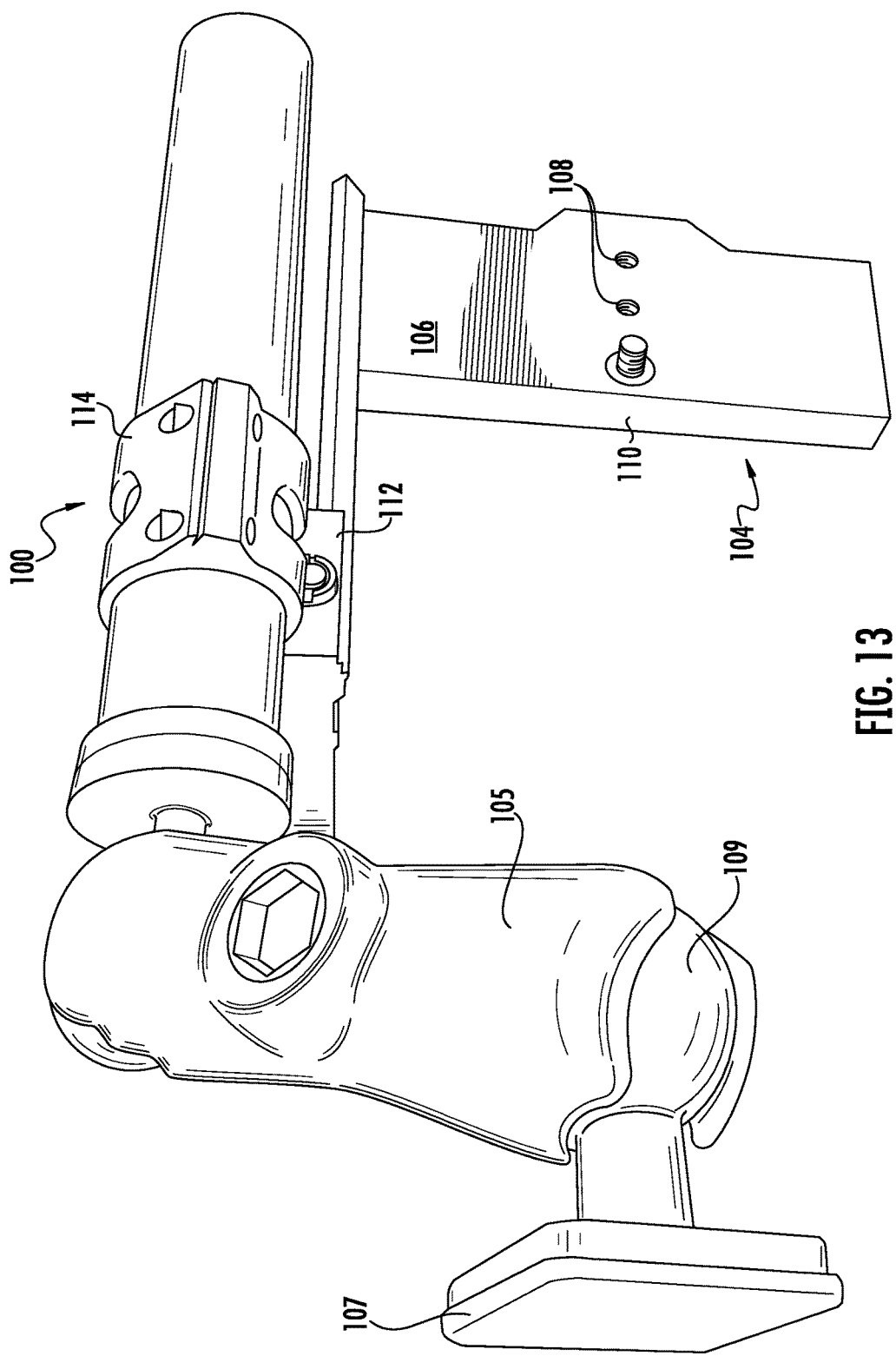
FIG. 13 is an alternative perspective view of the intermediate device mount adapter of FIG. 12.

FIG. 13 shows a second side 104 of the intermediary device mount adapter 100. As can be seen, the second side 104 shows a threaded attachment means 110, as well as mounting alignment holes 108. The second side also has an attachment surface 106 and a second view of the side attachment means 112 is provided in FIG. 13. As can be seen from the second sides 104 shown in FIG. 13, the side attachment means 112 may include a clamp or other suitable attachment apparatus 114. The second side 104 of the intermediary device mount adapter 100 may be attached to a suitable device or mount such as, but not limited to, a scope or camera. The side attachment means 112 may be used to attach to a suitable device or mount such as, but not limited to, a charger, flashlight, or cell phone mount.

Figure 14:
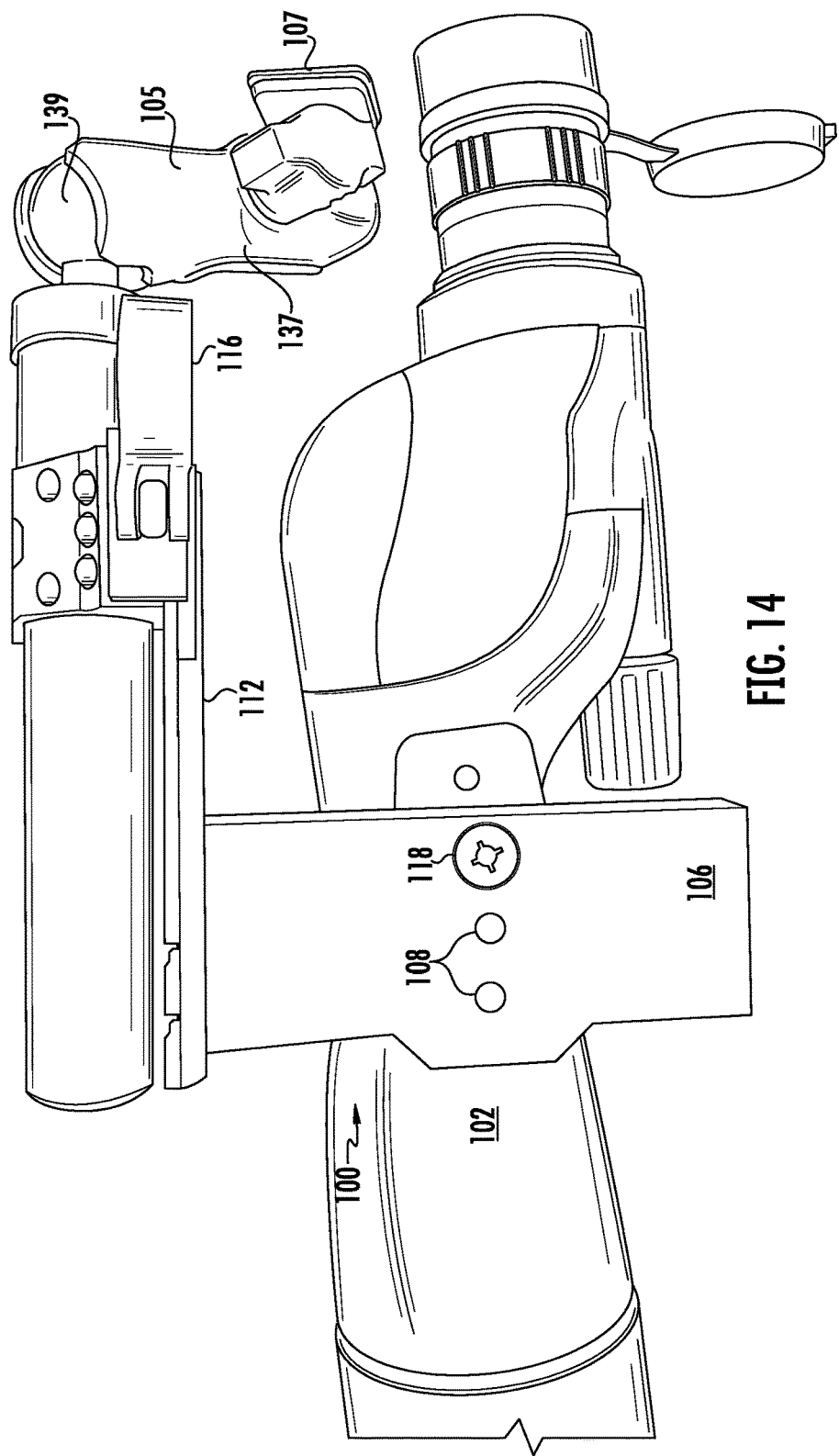
FIG. 14 is a bottom plan view of the intermediate device mount adapter of FIG. 12, showing the adapter attached to a scope.
Figure 15:
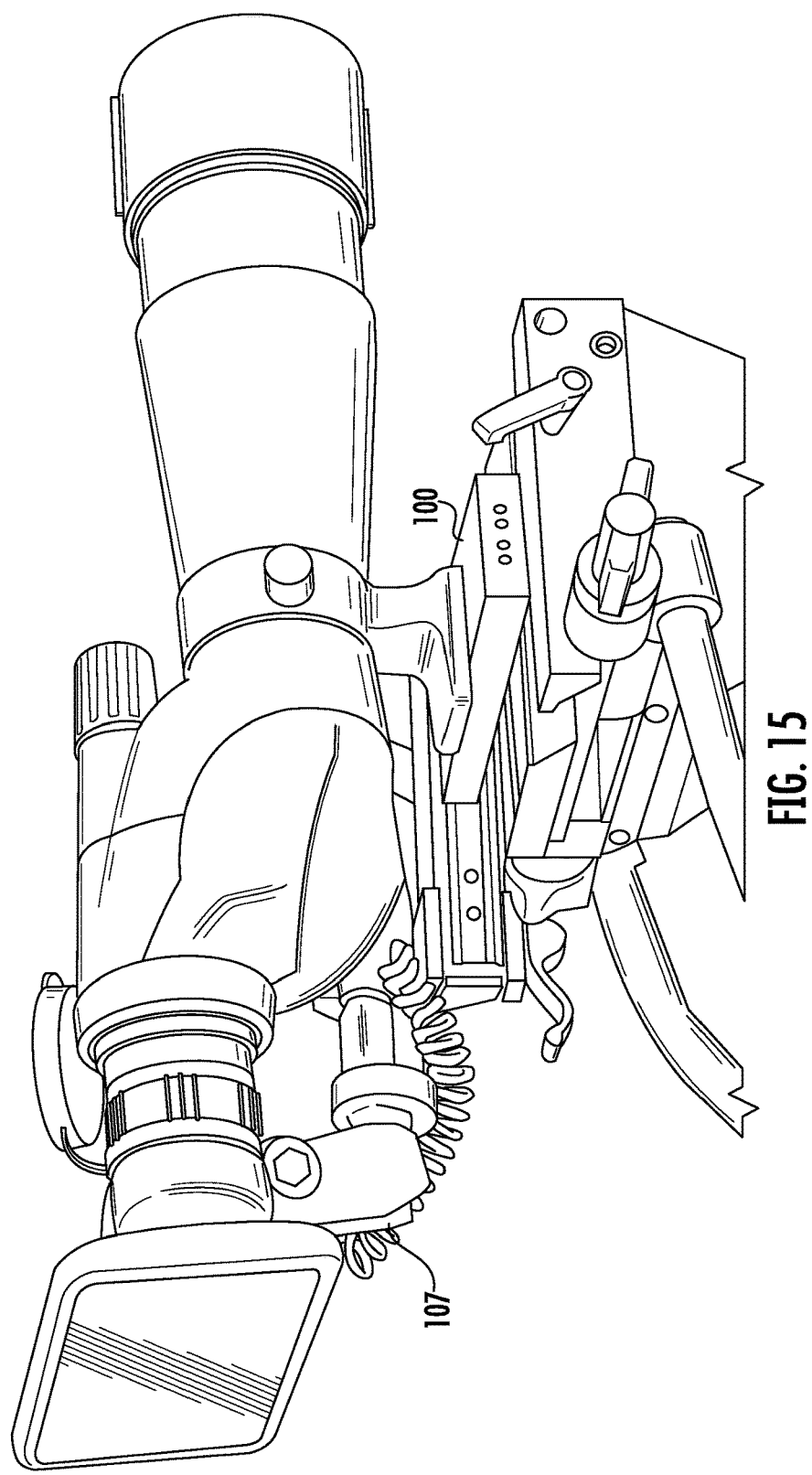
FIG. 15 is a perspective view showing the intermediate device mount adapter of FIG. 12 in use with a magnetic attachment system, showing an electronic device attached to the magnetic mount and aligned with a scope.

FIG. 14 shows the intermediary device mount adapter 100 connected to two devices, namely a USB charger and a scope. As previously indicated, while a USB charger and scope are specifically provided for purposes of example, it will be understood by one of skill in the art that the intermediary device mount adapter may be used with various components. As can be readily ascertained in FIG. 14, though the first side 102 is shown, the second side 104 is connected to the scope using the attachment means provided on the second side 104 of the adapter 100. The side attachment mechanism 112 is connected to a charging device, which can be released by the quick-release and attachment mechanism 116. The tightening means 118 are accessible, as are the holes 108 for mounting onto another device, such as, but not limited to, a tripod.

Figure 16:
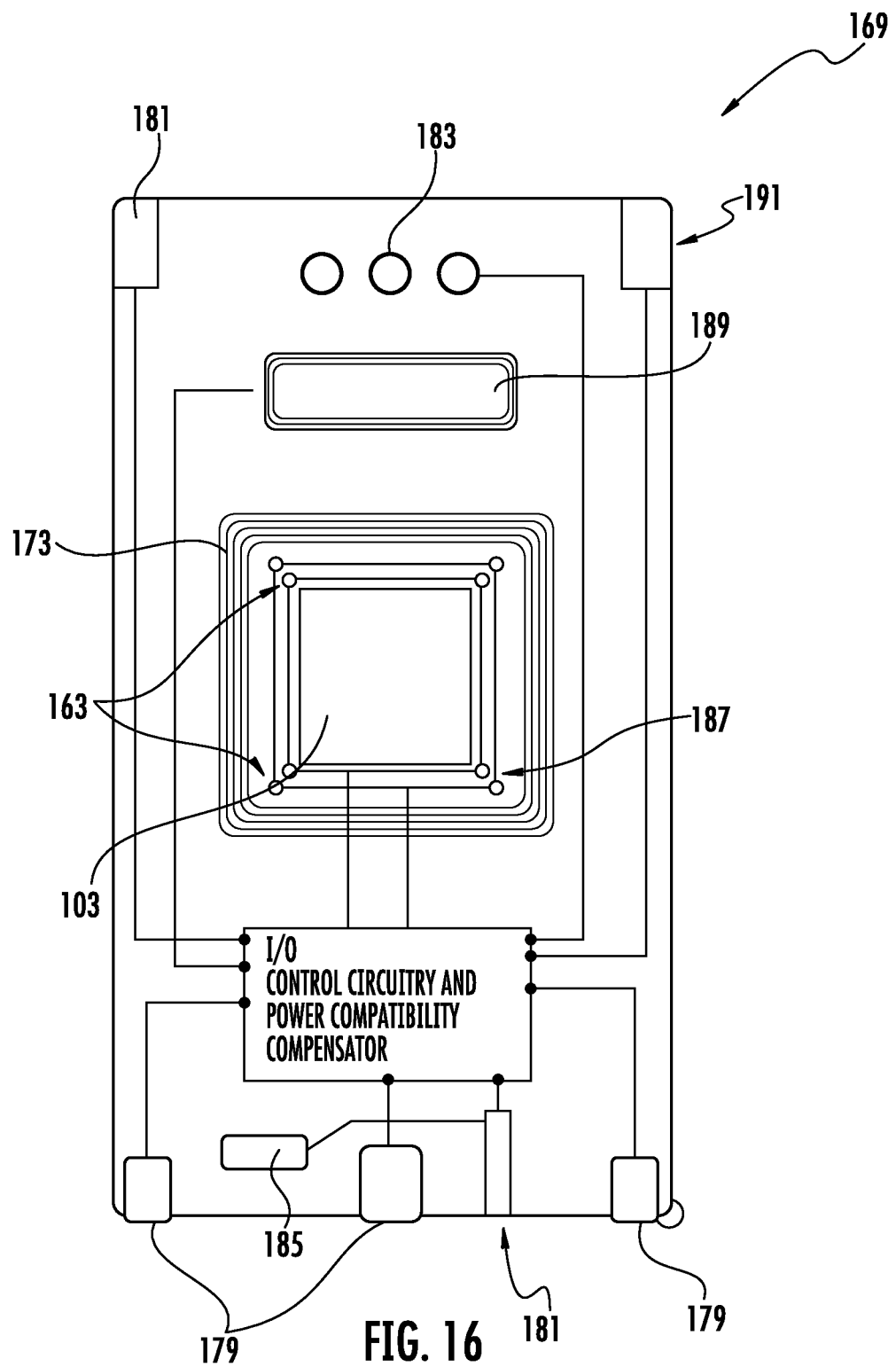
FIG. 16 is a partial plan view of an interior of a device case for use with the magnetic mounting system according to various examples of embodiments.

FIG. 16 shows an example of use of the intermediary device mount adapter. In FIG. 16, the intermediary device mount adapter 100 is shown, in a particular illustrative example, in conjunction with a scope, smart phone mount/charger, and tripod. The first side 102 is attached to a tripod using the threaded-hole means previously described. The second side 104 is attached to the scope using the threaded attachment means 110. The cell phone mount and charger are attached using the side attachment means 112, quick release/attachment mechanism 116, and clamping device 114.

As can be readily ascertained by FIG. 16, the intermediary device mount adapter 100 allows for differing devices having attachment means to all interact together. As one example, a user may attach a scope to the intermediary device mount adapter 100 using the threaded attachment means. Next the user could attach the side attachment mechanism 112 to a secondary device such as a smartphone holder or charger using the quick release/attachment mechanism 116 and clamping device 114. Finally, a user could attach a tripod to the first side 102 using the threaded holes 108. For instance, if a bird-watcher wishes to use a scope to view birds, the device mount adapter allows for use of a tripod of choice with the scope, accompanied by a smartphone holder for taking pictures of the observed birds through the scope with the smartphone, along with means for charging the phone.

The intermediary device mount adapter 100 is formed of any suitable material, such as plastic, glass, ceramic, composite, or metal, among others, and is constructed in a manner to allow for incorporation of the appropriate means of providing the necessary attachment of any number of additional devices and or mounts, such as threaded screw holes, screws, clamps, rails, or other useful features. These features can be provided through known means such as adhesive, welding, interference fit, or other suitable attachment mechanisms.

It should be understood the intermediary device mount adapter 100 may incorporate a variety of quick release mechanisms such as, but not limited to, the mechanism provided at 116 in the Figures. A variety of profiles and/or designs including but not limited to cam locks, spring latches, and/or magnetic couplings may likewise be incorporated. In addition, an angular profile may be provided to enable off-axis attachment. Specifically, ramps may be provided at an angle on the side of the intermediate device mount adapter. Holes may optionally be provided in the ramps, which in turn allows for devices to be mounted at an angle relative to the surface of the intermediate device mount adapter.

By duplicating the securing features (threaded stud, holes, etc.) in a stackable manner, new mounting surfaces and or protrusions can be created upon which a variety of other devices and/or fixtures may be attached. In various embodiments, the devices or fixtures may be attached in an indexable manner. Installing the intermediary device mount adapter 100 creates a new and usable mounting surface in a central location relative to a device and its corresponding mount. It should be understood the mounting surface of the adapter can be outfitted with a variety of mounting options, surfaces, surface profiles, holes both threaded and not, magnets, hook and loop systems etc. to facilitate the attachment of additional devices and/or mounts.

According to one or more examples of embodiments, the minimum componentry which may be required for the proper functioning of the intermediary device mount adapter 100 includes a plate of sufficient thickness to allow for clearance of the protrusions of the intermediary device mount adapter 100 with the device mount and its adapter, as well as enough relief to allow the attachment captured bolt head of the mount's adapter to clear the top surface of the mount's adapter.

As referenced above, the magnetic mounting systems also relate generally to the field of electronic device holders and more specifically to electronic device holders having integrated charging mechanisms. In this regard, and referring to FIGS. 16-28, the system may, in various but not all embodiments, be comprised of two components: first, a device mount section 105 having a magnetic attachment mechanism 107 and possible charging mechanism, and second, an electronic device holder or case 101 which likewise comprises a magnetic attachment mechanism 103, optional charging mechanism, ports, and other features disclosed herein. In addition, compatible peripheral devices may be part of the system. For example, the system may include a mating charger or power bank, peripheral data transfer or storage devices, other peripherals, and other additional devices, which may, in various embodiments, be designed to interact with the device mount and device holder(s). The mount, holder, charger, and/or any combination of peripherals can all be connected, in various embodiments, by using an appropriate or compatible indexing magnetic attachment feature for achieving a variety of functionalities. The electronic device holder or case 101 may comprise a case for holding a smart phone, camera, tablet, or other device. The electronic device holder 101 may have suitable sizing and other features for proper interaction with the relevant device type. The device mount section 105 may include a clamp, screw-down mount, strap (for example, for a wearable application such as a wrist strap), or suction cup for attachment to a suitable surface, appendage or protrusion. It should be understood that any number of electronic device holders, mounts, or peripherals could be used with any number of other device holders, mounts, or peripherals. This is to say any number of mated primary and secondary device mounts may be attached. For purposes of this disclosure, it should be understood the magnets may be present on both the device holder and the device mount or any other mating accessory for facilitating, in various embodiments, a relatively simple and secure attachment. Alternatively, in various embodiments, only one magnetic feature may be used, for example but not limited to, in conjunction with a suitable surface to achieve functionality disclosed herein. This application may refer to such a magnetic attachment mechanism or indexing magnet as a magnetic attachment feature. References to a magnetic feature should be understood to encompass, among other things, an indexing magnetic attachment mechanism such as is described above.

It should also be understood the magnet(s) may be modified for alteration of magnetic intensity and/or relative proximal polarization based on the designed or intended application. In other words, if a user were to prefer an implementation for a night stand versus a motorcycle mount, a thinner magnet or weaker-strength magnetic pair may be used for the night stand while a stronger or thicker higher pull strength magnet may be used for the motorcycle mount. In addition, the magnet may include a thin plastic ring or other suitable standoff or buffer between the magnets to create a small buffer space between the device holder and device mount. In other words, features are provided to reduce the friction between the magnets for ease of use and reduction of damage. This may allow for improved attachment, alignment, and minimal scratches or dents occurring to the magnets themselves as well as any other magnetic or non-magnetic surface the device holder, mount, or peripheral may come into contact with. In an alternative embodiment, the magnets may be provided with a film or other suitable material for accomplishing these friction-reducing purposes. As can be seen in FIGS. 16-19, the indexing magnet or mating magnet 103 may be provided in the device case 101 (FIG. 16, 18), peripheral such as a charging base unit 157 (FIG. 17), and/or the device mount 105 (FIG. 19) for suitable secure attachment of the components.

Various embodiments of device mounts are contemplated within the scope of this invention. The device mounts may have similar adjustment mechanisms as is disclosed above. Referring to FIG. 19, the device mount 105 may comprise an assembly having an attachment mechanism 159 (in FIG. 19, a suction-cup attachment) for connection with a surface, one or more ball-and-socket joints 109, 137, 139 for pivotal adjustment of the mount, and a top mount 161, which may, among other features, include a magnetic attachment feature 107 and direct connect mechanism 163.

The device mount base 159 may include a claw, suction cup, or screw-down fastening mechanism, strap, or other device such as a pocketable card with an integrated magnet to allow for secure attachment to a surface or incorporation into an object such as a jacket, handbag or a wide variety of other objects which would benefit from a magnetic mounting system for various practical applications to allow for secure attachment to a surface. In another example of embodiments, the device mount 105 may comprise a strap having, a magnetic attachment mechanism, power, direct connect, or other feature for attachment to a device holder. The strap mount may be used, for example, for mounting a trail camera or for wearing on a wrist or appendage while exercising. While a specific example of a base 159 is shown, various bases including clamps, suction cups, weighted structures, and the like could be used for proper attachment of the mount to a surface. Likewise, bases may be placed upon, adhesively attached, and/or may be directly fastened to a surface using screws, bolts, or other suitable mechanical fasteners. As indicated, adhesive, VELCRO, or other fixing mechanisms could also be used, in various embodiments. In various other embodiments, such as FIG. 19, a suction cup may be used to attach the mount 105 to various surfaces including flat, smooth surfaces. In other embodiments, a claw mount may be used. The claw may be understood as a c-shaped clasping mechanism, which may be adjusted to grip a particular object more or less firmly. This mount could be used, for example, on a vehicle handlebar, including, but not limited to in industrial equipment. These example embodiments are non-limiting and various other attachment mechanisms should be understood as within the scope of this disclosure.

Figure 19A:
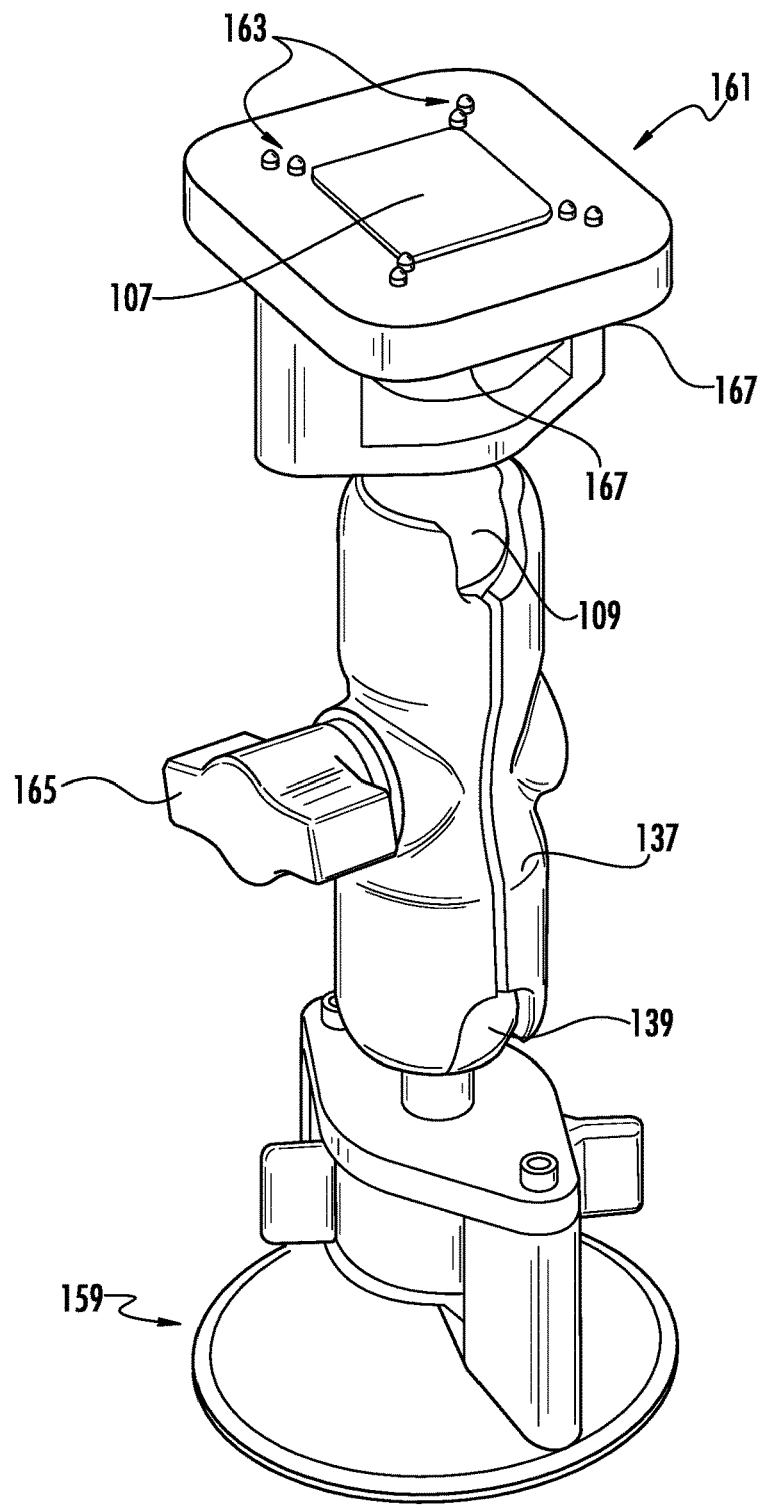
FIG. 19a is a perspective view of a magnetic mount according to one or more examples of embodiments, showing a mount for use with the case of FIG. 18, including a direct connect system, ball and clamp adjustment mechanism, and suction cup base, according to various examples of embodiments.
Figure 19D:
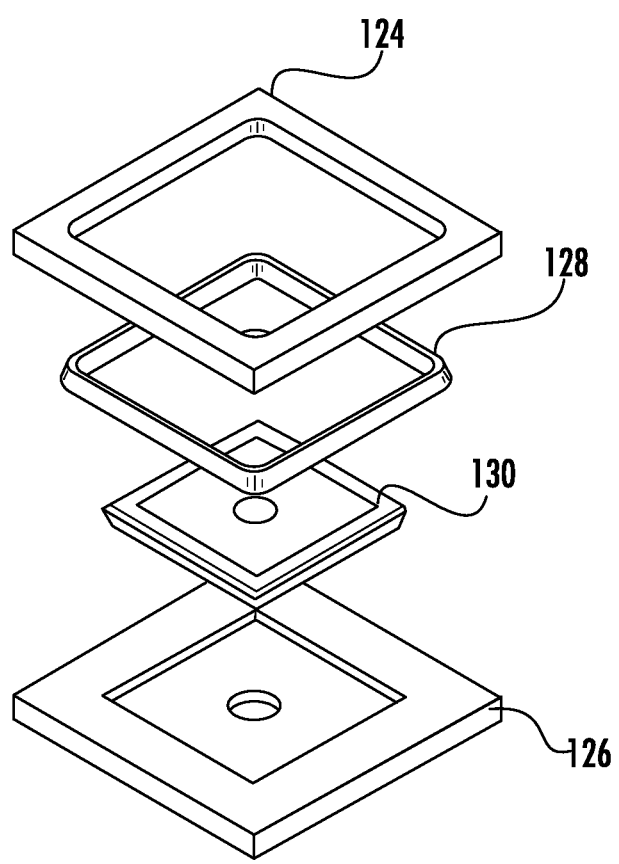
FIG. 19d is an exploded view of the charger interface shown in FIGS. 19b-c.
Figure 20:
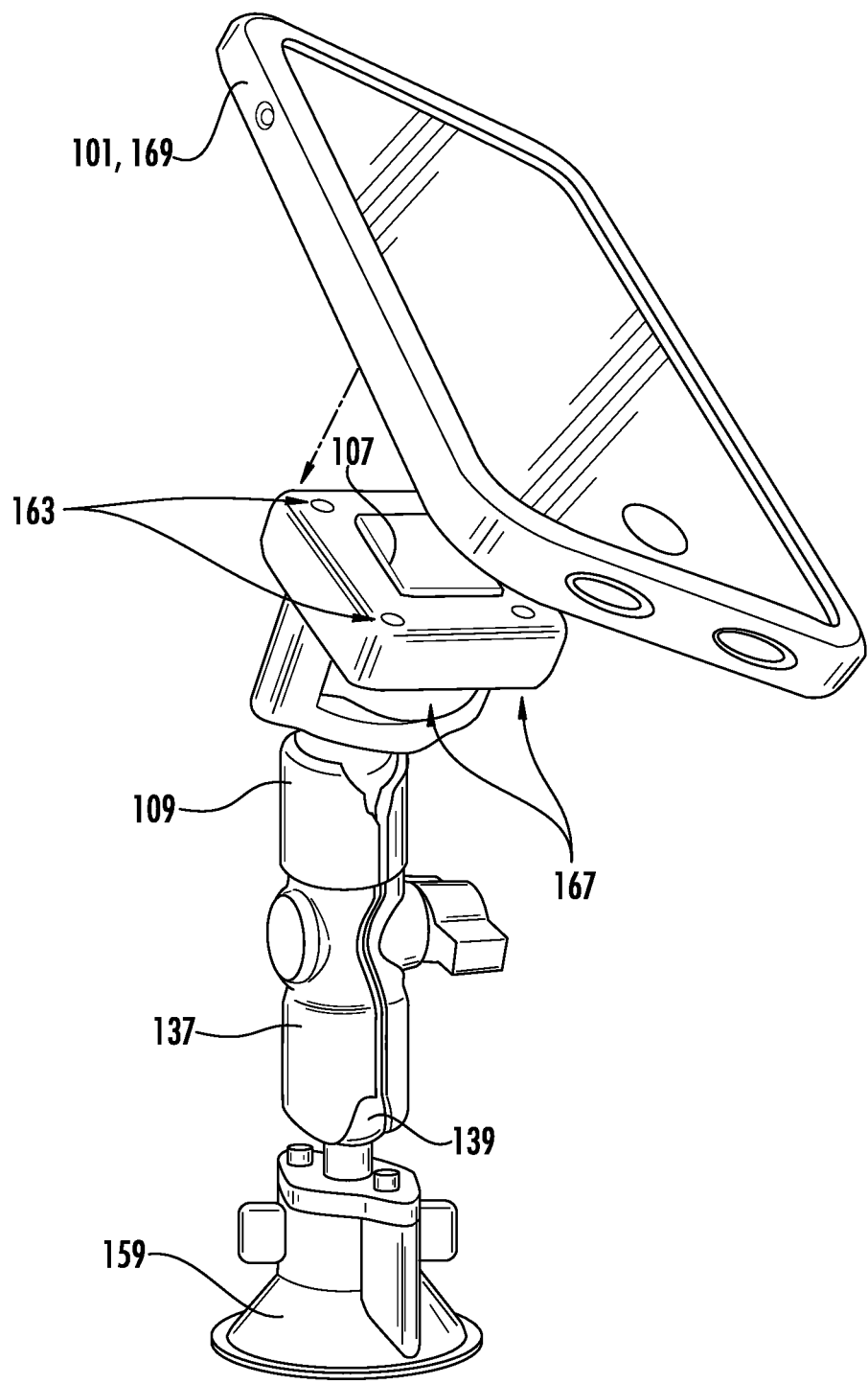
FIG. 20 shows a perspective view of the interaction of the device mount of FIG. 19 and case with magnetic attachment features of FIG. 18, according to various examples of embodiments.
Figure 21:
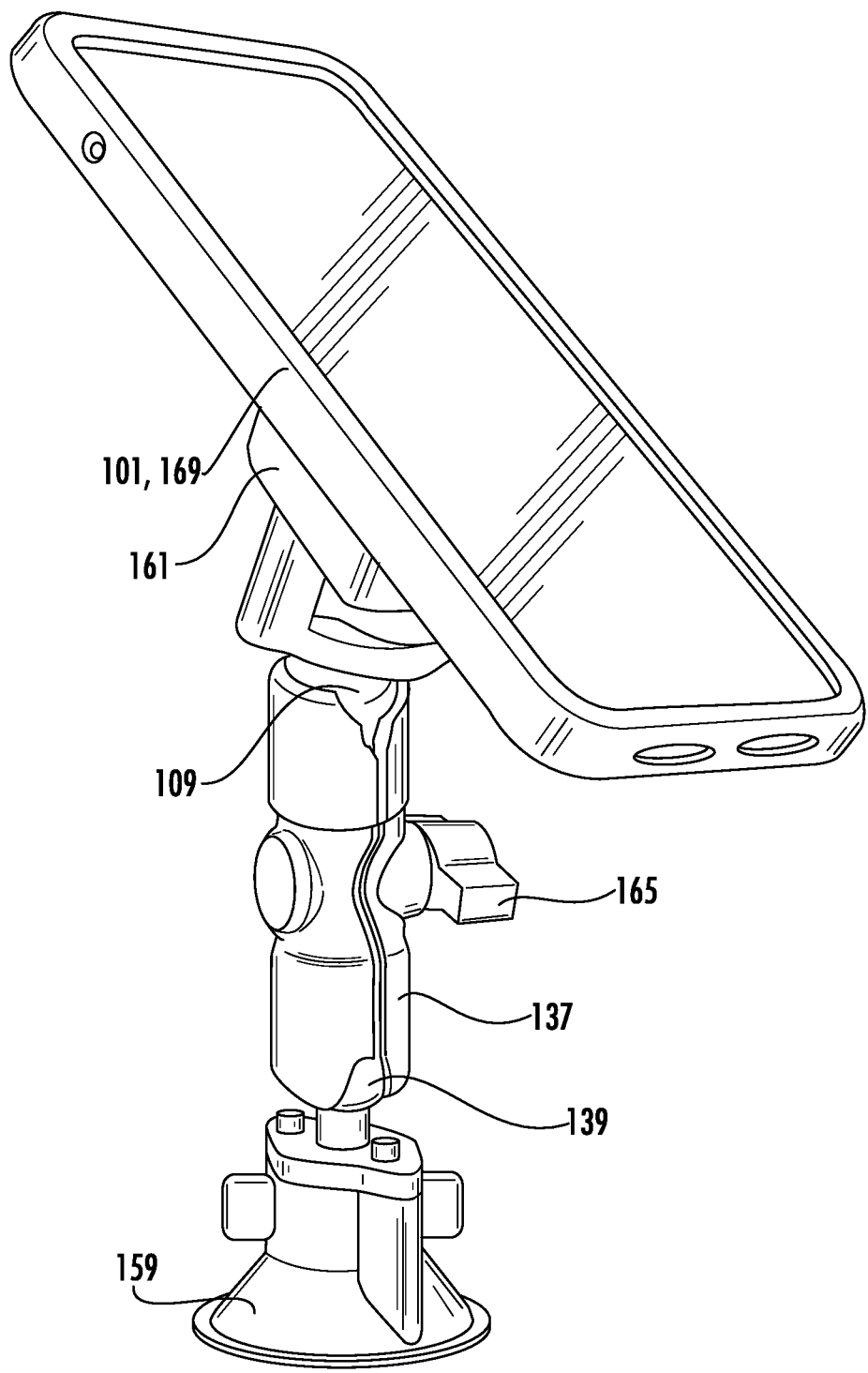
FIG. 21 shows a perspective view of the device mount and case shown in FIG. 20 attached together, according to various examples of embodiments.

As shown in FIGS. 20-21 and previously described, the mount 105 may include one or more ball bearings 109, 139 or pivot points (similar to that shown in FIGS. 1-2) to adjust the angle of display for the device. The magnetic attachment piece or top mount structure 161, which may also incorporate charging and/or data transfer features 163 and be understood as the mount "head," (see, e.g., FIG. 19, 20) may be attached to a ball 109 allowing for its pivotable coupling to the body of the device mount to allow for further adjustment of the display or position of the device. One or more screws 165 may be provided on the mount to allow for tightening or releasing of the configured ball positioning for fine-tuning. This may allow for the ability to fine-tune the best angle to view the device, tighten the adjustment screws, and have the mount remain in the same position for repeated removal and attachment of the device holder, case, or peripheral. This may be facilitated by the relative ease of removal using the magnetic attachment features described above. The base may incorporate an appropriate mating and aligning magnet eliminating the need for extraneous mechanical constraint(s) and or other alignment mechanism(s) such as a cradle or other feature to attach and align compatible devices.

As illustrated further in FIG. 19a-d, provided within the device mount may be a data or power transfer mechanism and one or more data or power receiving ports 167. These data and/or power transfer means, such as spring loaded and/or non-movable contacts, may be incorporated into the mount, as well as be the magnet(s) themselves. As shown in FIG. 19d, contained between a top cover 124 and a lower cover 126, a base magnet 128 and conductive bezel 130 may be provided. The conductive bezel 130 may be electrically isolated from the magnet(s) for providing a secondary, tertiary or any number of conductive path(s), which may only have electrical conductivity upon correct and proper alignment of the interfacing components. This methodology provides for a simplistic means of creating an electrical circuit including the switching of the conductive paths without the need for a printed circuit board and its associated componentry to determine conductive path routing or other logic functions. Looking to FIG. 19a, the ports 167 may be seen as an aperture on the back of the base 161 face. In addition, the connector pins or contacts 163, in various embodiments such as shown in FIG. 19a as a number of protrusions provided externally to the magnetic attachment feature 107.

As shown in FIG. 19a, the device mount 105 can provide for or be provided with a charging mechanism, such as but not limited to a wireless charging device or contact-based cordless or direct connect charging device. The device mount 105 may accept power from an external source, for example, an electrical outlet. The cord may then be plugged into the device mount to provide charge to the wireless or cordless charging mechanism. Multiple ports 167 may be included to allow for acceptance of a user's device-specific charger. By plugging the charger into a standard wall outlet or other suitable power supply and plugging the male end of the USB or other suitable charger into the mount, the mount is then provided with the power to facilitate charging through the device holder when it is enabled.

As can be seen in reference to FIGS. 19b-c, the device mount or charger interface 105 may include a magnet or magnetic interface 107 connected to a magnetic shield 120. An insulator 122 (e.g., a plastic insulator) may surround at least a portion of the magnet 107. Conductor contacts 163 are provided on one or more lateral sides of the magnet 107. An upper cover 124 is also provided on the device mount 105, coupled to a lower cover 126. A retainer 128 and stud 130 (which may be threaded) may be used to secure the device mount 105 into a corresponding support (not shown in FIGS. 19b-c).

The device 101 and/or device mount 105 may also be provided with a cord management mechanism. The cord management mechanism may allow for ease of attachment and routing of the power using the cord to the appropriate port on the device. In various embodiments, the power may be provided perpendicularly to the magnetic attachment surface on the head of the device mount. That is, one or more power input ports 167 (female USB port, lightning, or other suitable port) may be provided, in various embodiments, on the opposite side (back) of the head 161 of the mount from the magnetic attachment mechanism (front).

In various embodiments, the head 161 of the mount 105 may also include control circuitry for allowing or disallowing power to the face of the mount, whether it is equipped with wireless charging, direct connect, or other power or data transmission mechanism. As shown in FIG. 20, these ports 167, magnetic attachment features 107, and direct connect circuit contacts 163 may be designed to interact with a device having a device case 169, or any other suitably configured peripheral.

In another embodiment, the control may be entirely mechanical in nature. This may be achieved by the correct and accurate alignment of the interfacing magnets and their corresponding surrounding surfaces, which may incorporate features to determine appropriate conductive paths, as well as switching means without the need for control circuitry.

Figure 22:
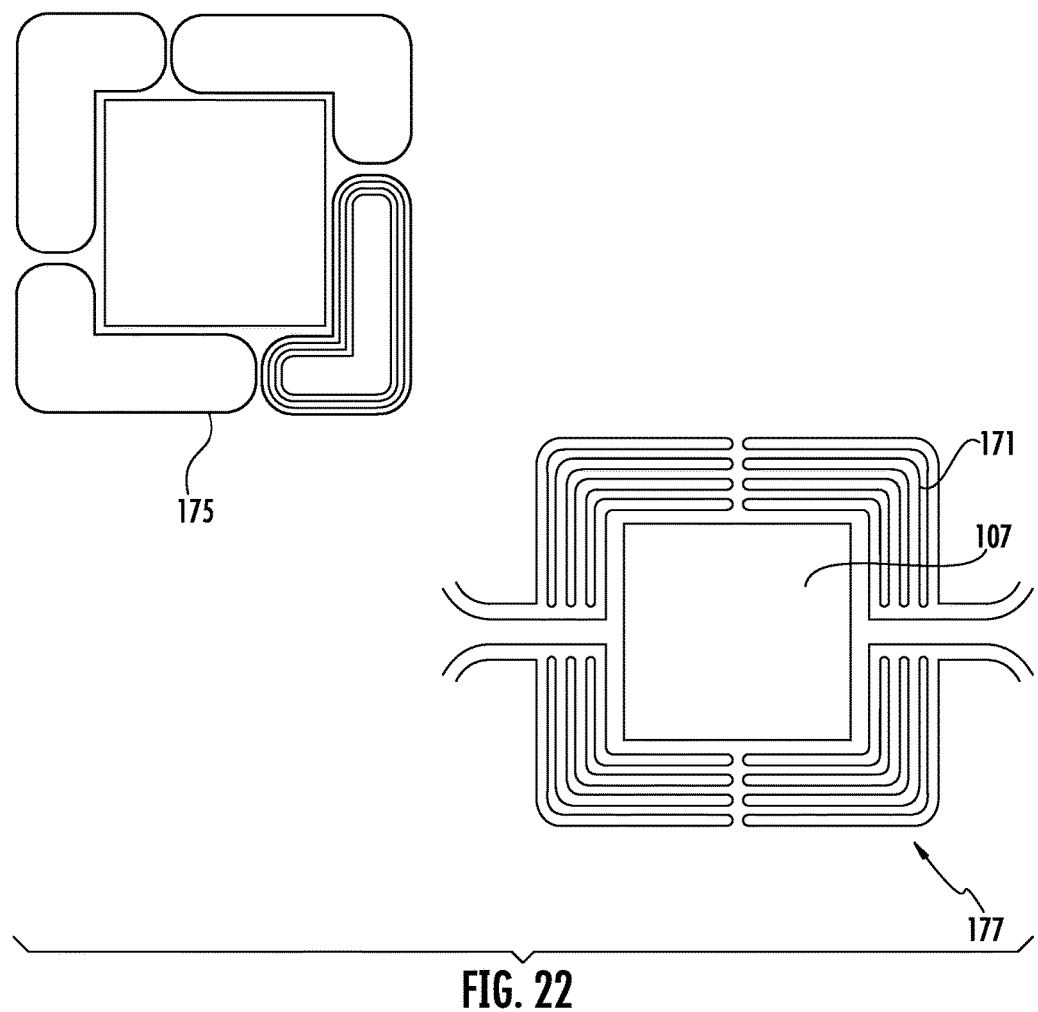
FIG. 22 shows one or more examples of a wireless charging coil for use with the magnetic attachment mechanism and direct connect system, according to various examples of embodiments.
Figure 23:
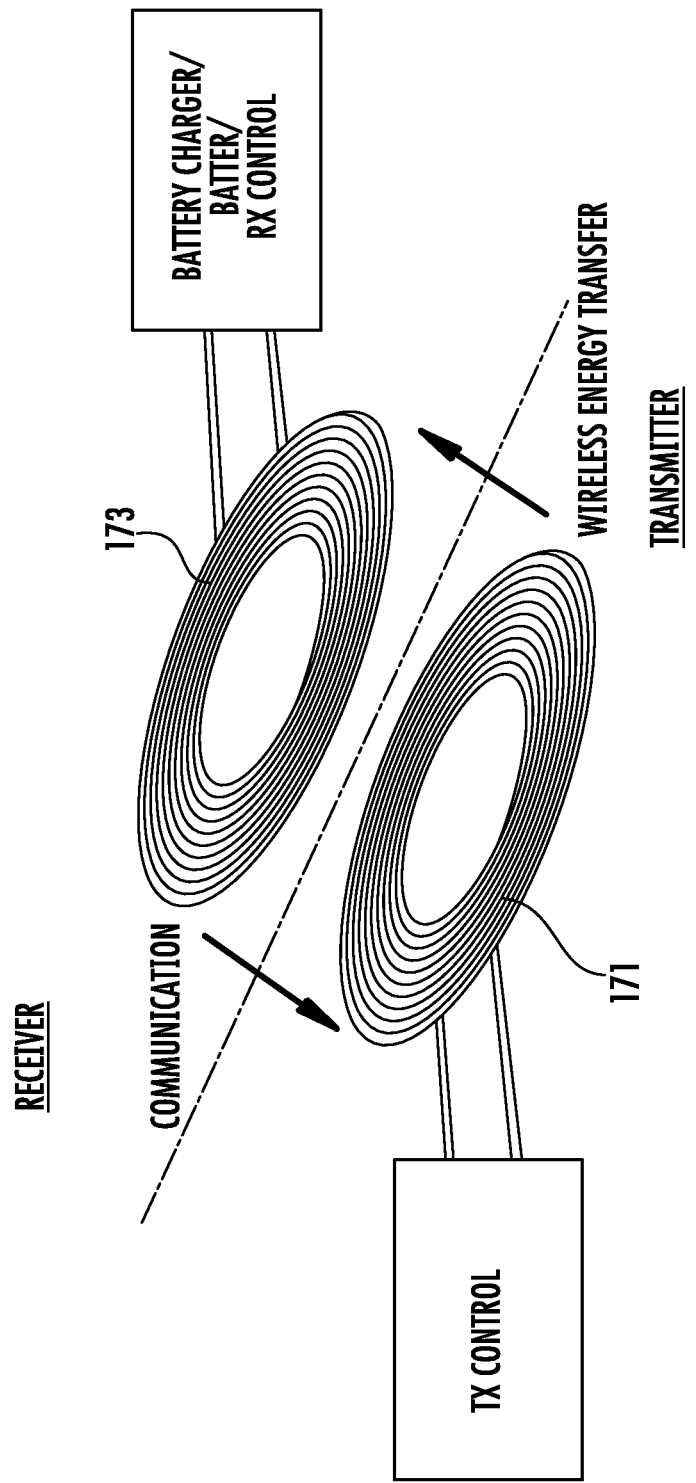
FIG. 23 shows one or more examples of a wireless energy transfer protocol for use with the system described herein, according to various examples of embodiments.

As indicated, wireless charging functionality may be provided. The device mount 105, in various embodiments, may be provided with a coil 171 for transmittal of power from the power input port 167 to a suitably equipped device 169. In various embodiments, the coil 171 is produced by wrapping or coiling wire around the outside or inside of the indexing magnet 107 or magnetic attachment device. In various embodiments, the magnet 107 or magnetic attachment device may be a relatively thin, square-shaped magnet having multiple polarities as described herein above. However, other suitable configurations may be used, such as, but not limited to, providing the coil inside a magnet perimeter. This could, in various embodiments, take the form of an indexing magnet having an open central area housing one or more coils. FIG. 16 shows this coil 173 configuration as provided within a device case 169. In various embodiments, the device mount and device case coils 171, 173 may be identical. In other words, the coils may have a similar positioning and wrapping. Alternate shapes, sizes, and positions of magnetic and coil components are contemplated as within the scope of this disclosure. FIG. 22 shows alternative example coils 175, 177 for inductive or wireless charging.

Inductive or wireless charging is a known technology wherein an alternating electromagnetic field is produced in a first transmitting coil 175 which is emitted to a second coil 177, inducing a voltage in the second coil. Here, the first coil may be device mount coil 175, with a second coil 177 provided in the device or device case. It should be understood that while the system presented herein is described as interacting with particular components, the second coil could potentially be provided in the device itself. The coils can be made of a suitable metal or other material for inducing a current, for example, copper.

It should be understood the indexing magnetic device mechanism may allow for the advantageous and accurate alignment of the first and second coil to produce improved efficacy of transmission of wireless power from the power source to the device. The multi-polarity configuration facilitated by the magnetic mounting device may allow for superior immediate alignment of the coils. In known wireless charging devices, alignment issues may arise—the device may not charge or charge inefficiently if positioned improperly on the charging transmitter. In addition, initiating wireless charging traditionally involves a delay between placing the device on a power transmitter before charging begins. Placing the device or device holder 169 on the disclosed mount 105 may allow for a kinesthetic or tactile feedback. In other words, by attaching in an aligned position to the base, the user knows the charging may begin without waiting for feedback to verify charging or initiate positioning adjustment. The accuracy of the magnetic alignment and coupling system also enables the usage and implementation of RF shielding components to minimize interference potentially caused by inducted power transfer.

In addition, the wireless charging features may be configured to allow for the additional feature of allowing for near field communication, or NFC, which allows the establishment of radio communication between entities over a small distance. The coil configuration may allow for communication over a radio band between the two coil-enabled devices (e.g. holder, peripheral, and case or device).

The wireless coil/magnet combination may provide for a high level of RF shielding. In various embodiments, the coils may be shielded by a cup-shaped structure, allowing for enclosure or containment of RF signals. In various embodiments, the cup may include a lip or protruding feature, which allows for complete enclosure of the coils when suitable device cases, bases, and/or peripherals are mated. The corresponding polarity and shielding, as well as use of closely and tightly coupled receiving coils, may allow for the minimization of undesirable interference and superior transfer of certain radio-based or other wireless signals. The RF feature may maintain a functional level for NFC communication. A supplemental antennae, transmitter, or receiving coil may also be incorporated within the device holder, mount, peripheral, or the like to facilitate NFC or other RF transceiver functionality.

Figure 17:
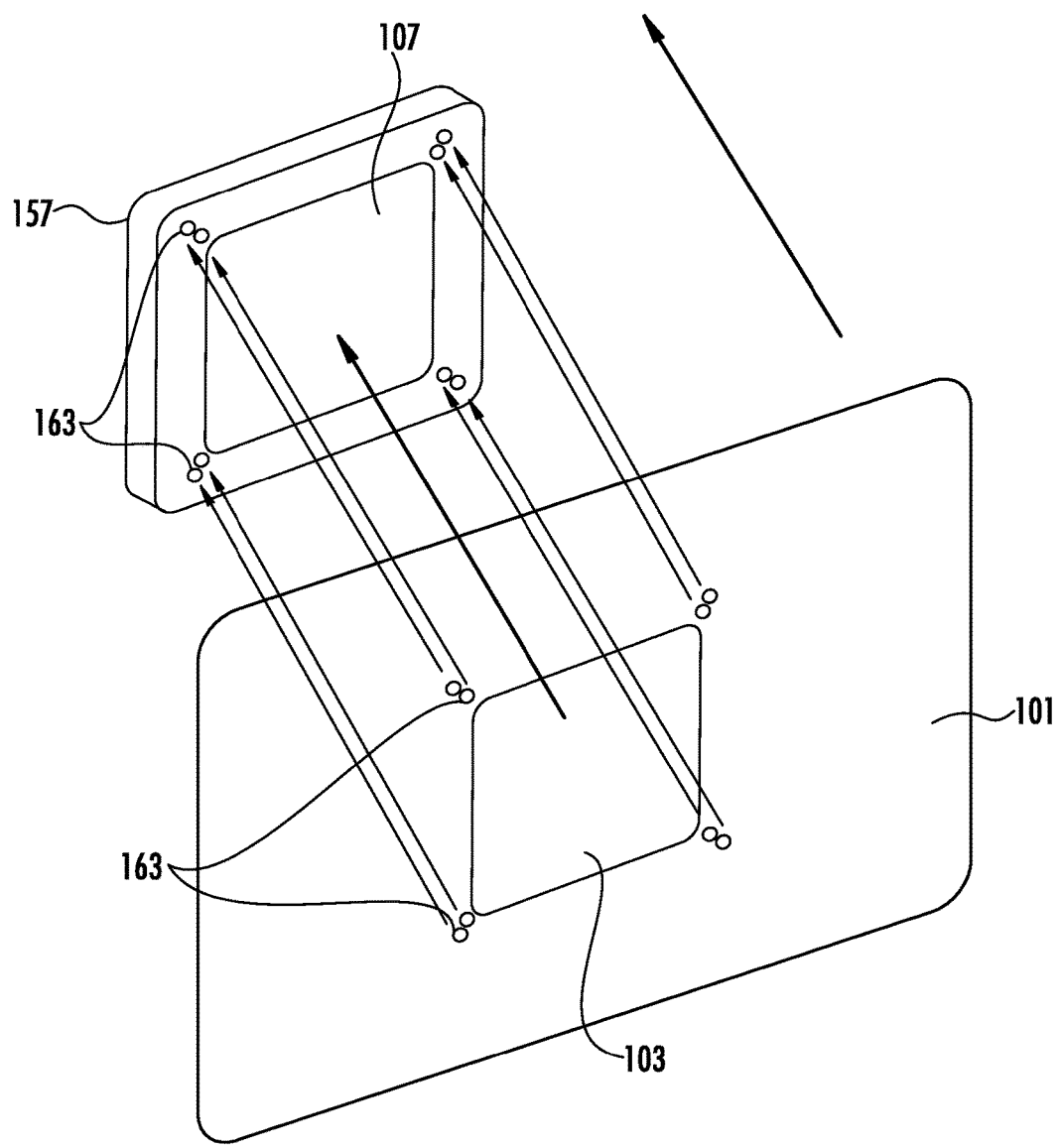
FIG. 17 is a partial perspective view of the device case of FIG. 16, showing the interaction of a charging base unit and device case using the magnetic attachment and direct connect system according to various examples of embodiments.
Figure 25:
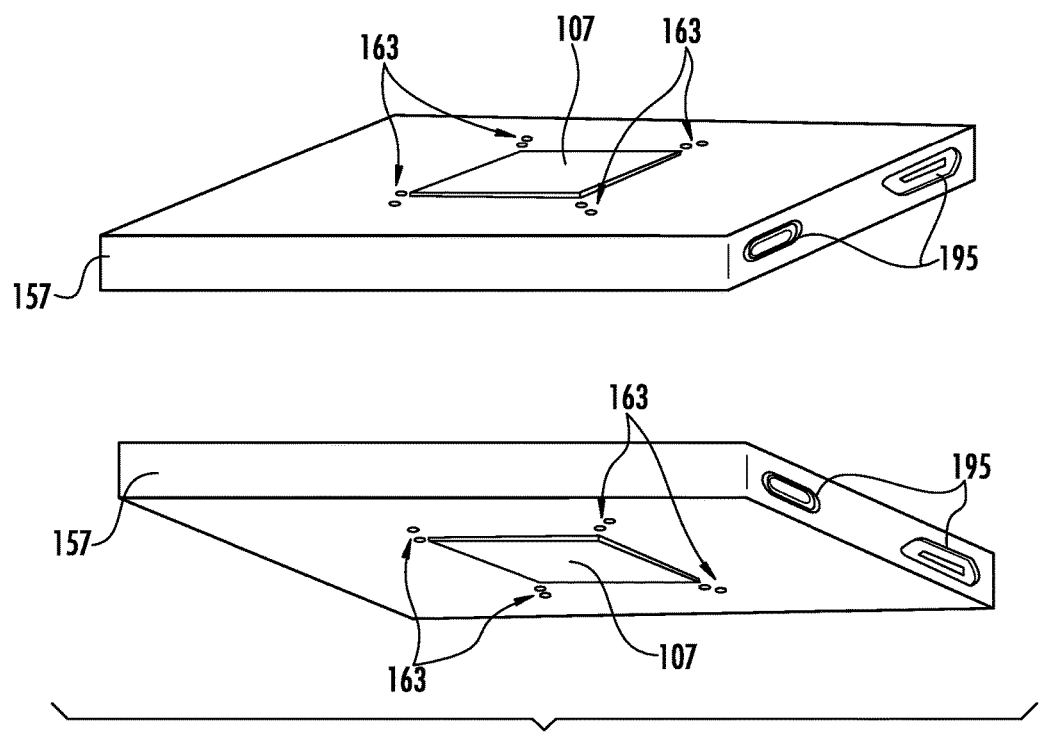
FIG. 25 shows a top perspective view and a bottom perspective view of a power bank or charging device having the direct connect and magnetic attachment features, according to various examples of embodiments.

The device mount 105 may also be provided with cordless/direct contact charging and data transmission functionality. The USB or other connector 167 may allow for communication of power and signal through an array of pins, spring-loaded buttons, or other suitable physical connecting transmitting feature 163. These pins or contacts 163 may allow for a variety of information to be passed to a recipient device, e.g., device 169. As shown in FIG. 17, the pins and contact points 163 may be provided in conjunction with the magnetic attachment feature 107. The pins 163 may allow for direct contact for charging and information transmission purposes, which may allow for faster yet still cords-free functionality over known wireless charging technology. In one example of embodiments, the pins 163 may be pogo pins. In another example of embodiments, the pins 163 may be depressible buttons (e.g., conductive snap buttons). The pins 163, in various embodiments, may be arranged in a radial or a spaced apart structure for integration with the mating magnetic alignment features 103, 107. The pins 163 may be suitable in number to comply with port configurations and pin numbers in commonly-utilized data transfer connectors and protocols. The pins 163 may be arranged in an appropriate spatial configuration both within and surrounding the magnet(s) 103, 107 for connecting with compatible mating devices 161, 169 and their contacts. For example, the pins 163 may be arranged for compatibility between the holder 105 (with 161) and case 169, a charger and case, or the like. These pins, conductors and contacts 163 may also be arranged around the periphery of the magnet(s) 103, 107 as well as integrated into holes, channels, recesses or other features in the magnet(s) surfaces. In various embodiments, a power pack/bank peripheral 157 (such as is shown in FIG. 25) may actually use, for example, two pins 163 for the transfer of power though it, or may be provided with more pins. These contacts 163 allow for and facilitate the transfer of power, data and other signals from the device to the mount or compatible accessory and/or peripheral(s). As indicated, while pogo pins and snap buttons are referenced, any suitable mechanism may be a "pin" and used for facilitating the connection, including magnetic pins and the like, such as magnetically actuated, spring loaded and or other means of establishing electrical continuity between devices held within close proximity. While pins may be described as accomplishing the connection, suitable mechanical or non-mechanical contact points may be provided to complete the circuit for appropriate functionality as described herein.

The pin 163 configuration may allow for data and/or power transfer at the indexing angular positions provided by the magnetic polarization of the magnetic attachment feature 103, 107. FIG. 17 shows how data and power may be transmitted through the attachment mechanism for communication between device accessory or peripheral (power bank 157) and device holder 169. It should be understood the spatial relationship of the pins 163 and magnet(s) 103, 107 configuration may be used as a new power and data transmission interface. The spatial arrangement of the pins 163 in relation to the polarization pattern of the magnetic attachment mechanism allows for the alignment and direct connection of the data and power transfer contacts without the need for or use of further mechanical constraints. This new interface allows for a freedom of design and structure while maintaining a simple connectivity interface without the need for mechanical interfacing mechanisms. Furthermore, this arrangement enables the connection a multitude of disparate devices using, in various embodiments, a relatively simple and easy attachment route regardless of size, shape, configuration, or material composition. In other words, not only does the pin configuration function to transmit data and power from the device mount, but also between any compatible accessories, device cases, chargers, or any other item having a mating pin configuration and magnetic attachment interface feature. The connection mechanism may be configured to detect and connect voltage, and the pin/button/direct connection features may or may not be provided equidistant from the center of the magnetic attachment feature.

It should be understood the device mount may include wiring and logic for re-indexing the pin configuration. In various embodiments, the device mount 105, 161 may accept the pin configuration 163 using the female USB, lightning, or other ports 167. The signal from the input pins may then be routed to the output pins, which may, in various embodiments, be provided on the surface 111 of the device mount. In various embodiments, the device mount may also incorporate appropriate logic for determining compatible signal and/or power transfer routes relative to the indexing of the device or peripheral using the mount. The routing logic may also allow for compatibility of devices requiring different pin configurations or connections, or any suitable power or other transmission devices. This is to say, the logic may allow for interaction of devices and/or charging features requiring any number of pins.

The direct connect 163 charging and data transfer may be facilitated using, as previously stated, pogo pins, snap buttons, or other suitable contact structure. The alignment characteristics of the contacts 163 may be facilitated with the use of the magnetic alignment attributes imparted by the magnetic attachment feature 103, 107. The contact structure may have a minimal protrusion from the surface of the mount, device case, or peripheral, as the configuration may require. In various embodiments, the contact structure 163 (such as pogo pins or other suitable structure(s)) and may have little to no apparent protrusion, being as small as 0.001 inches, or whatever minimal size is required to sufficiently create electrical connectivity, but may protrude 1-2 mm and have a beveled appearance to allow ease of alignment and contact. The pins may, in various embodiments, be suitably wired and or placed for each pin to have multiple-functionality contacts to facilitate orientation-agnostic pin configurations. This may be facilitated by integrated logic features, along with routing or re-routing of data signal or power transmission.

The direct connect or cordless contact data transfer and charging feature 163 has various advantages, including charging at the same speed as a wired connection because of a higher energy transfer efficiency over inductive/wireless charging. The direct connect 163 also allows for data transfer in conjunction with charging, both of which may be enabled at the same speed as a direct wired connection through the device's integrated data port. As detailed herein below, a power pack 157 may also be integrated to allow for magnetic attachment, alignment of contacts, and connection for transfer of additional power or data. In various embodiments, the pins may be retractable. The pins may appear after verification of the alignment or integration of a compatible device. This may require a minimum level of integrated logic. For example, the device case may be able to determine the number of connected pins before allowing power from the pins to enter the device, or to allow power or signal to be pulled from the device for transmission. Further details regarding the control circuitry provided in the device case is discussed in the description of the device case.

As referenced herein, a device case 169 may be provided for holding an electronic device, such as, but not limited to, smartphones, tablets, and the like. The device case 169 may have a magnetic attachment feature 103, which facilitates interaction and alignment with the device mount or peripheral devices. Inside the device case 169, an electronic device may be provided. The device case 169 may be designed, in various embodiments, to facilitate easy interaction with the device mount, peripherals, or other accessories having the magnetic attachment mechanism and pin/contact (direct connect) features.

As shown in FIG. 16, the case 169, in various embodiments, may contain, among other things: multiple male and/or female ports 179, charging features, one or more smart buttons, smart lanyard, headphone jack(s) 181, speakers 183, microphones 185, amplifiers, wireless charging interface, communication LED's, direct-contact charging and data transmittal interface(s) 187 (containing direct connect features or signal contacts 163), NFC or other wireless communication components 189, data storage and transfer components 191, and magnetic attachment or coupling features 103. The case may have several other advantageous features, including hermetically isolated apertures to ensure superior protection of the electronic device from liquids or other hazards such as dust.

The device case, in various embodiments, may be resistant to liquids and other environmental hazards. In other words, it may isolate the housed electronic device from hazards to functionality such as, but not limited to, water and dust. It may in part accomplish this through hermetically isolated input, charging, and output ports. In other words, the device may provide ports that are physically separated from the electronic device port. The device case 169 may be shaped specifically for a particular device. In addition, the device case 169 may, in various embodiments, be provided with a model-specific case having a model-specific male port, camera apertures, and male headphone jacks in specific positions.

Referring to FIGS. 16-18, the device case 169 may be provided with several features. The form of the device case 169 is suitably shaped to surround, encompass, or otherwise fit an electronic device. The case may be comprised of any suitable material, including various plastics, metals, ceramics and composite materials. The held device may have a screen, which is visible from the front side of the case, whereas the backside may be provided with features for external connectivity. For example, the back may, in various embodiments, feature (but not limited to) a mating indexing magnetic feature 103, a mating set of circuit pin contacts 163 for direct connection charging and data transfer, and/or a receiving wireless charging coil 173. As shown in FIG. 20, these components may align with mating components provided on a device mount and in particular, head 161, or in FIG. 17, a device peripheral 157. As indicated, inside the case, various components may be included such as, but not limited to, a male data port, one or more female ports, control circuitry, peripheral circuitry, headphone jack, accessory port, waterproof speakers and microphones, an NFC receiver, and other components. While a back and inside are described it should be understood these components may be featured in any particular orientation with respect to the device holder. In various embodiments, the device case and system achieves a universal configuration of ports and functionality. In other words, charging and data transfer connections as device-specific may be eliminated. Various features will be described in turn.

Figure 18A:
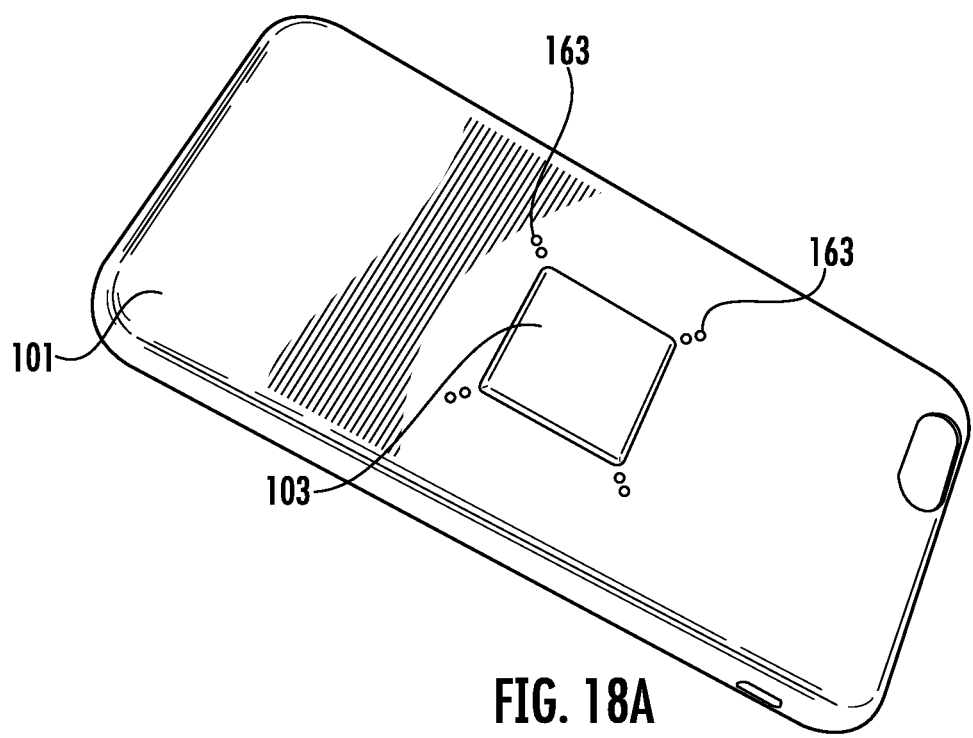
FIG. 18a is a perspective view of the back of a device case, showing the case for an electronic device having a magnetic attachment mechanism and direct connect system according to various examples of embodiments.

In various embodiments, the case 169 may be equipped with a mating indexing magnetic feature 103 as previously described herein, allowing for secure attachment and alignment for connection to the mount or accessory. As shown in FIGS. 16 and 18a, the magnetic feature 103 may be provided in the center of mass of the case/electronic device 169. The magnetic feature, in various embodiments, may allow for a responsive connection at certain pre-determined angles. In other words, suitable connection may be achieved at certain angular orientations of the device/case combination relative to the mount or other object having the mated magnetic feature, but not other orientations.

Figure 18B:
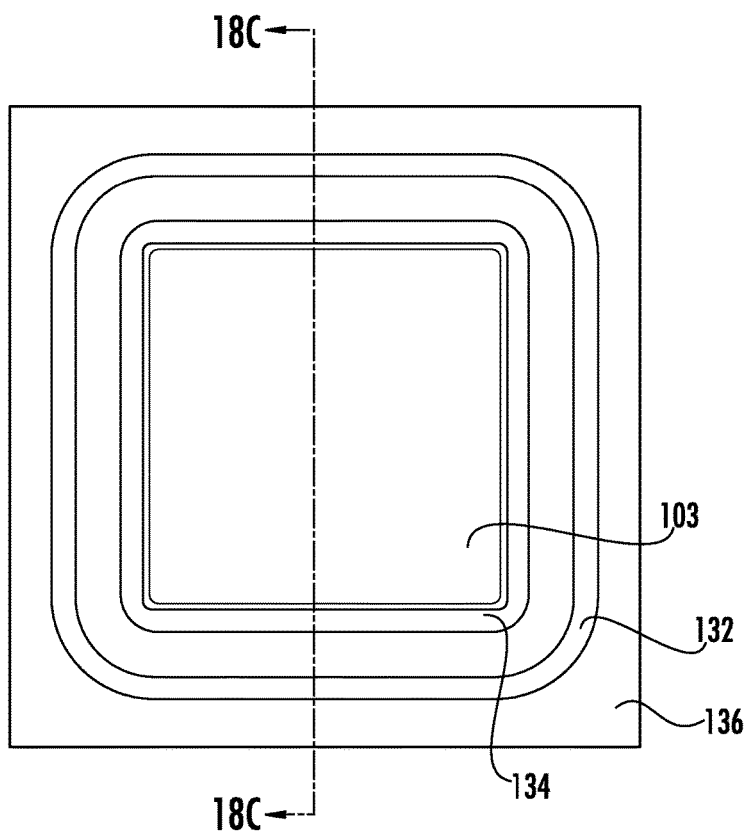
FIG. 18b is a top plan view of the device or phone interface according to one or more examples of embodiments.
Figure 18C:
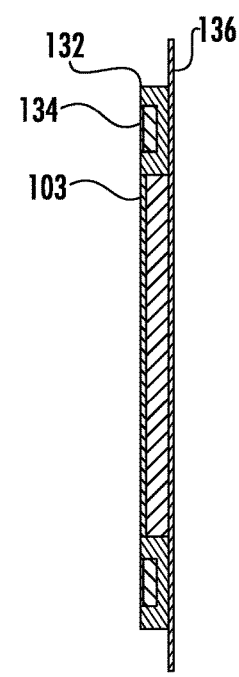
FIG. 18c is a cross-sectional view of the device or phone interface of FIG. 18b, taken along line A-A of FIG. 18b.
Figure 18D:
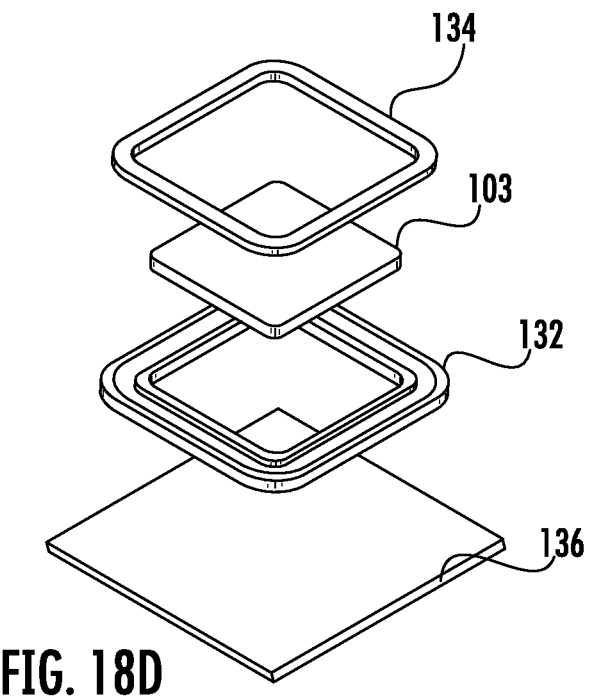
FIG. 18d is an exploded view of the charger interface shown in FIGS. 18b-c.

Referring to FIGS. 18b-d, the interface for use with the phone case includes a magnetic interface 103 surrounded, in part, by a plastic insulator 132. A contact ring 134 (comparable to contacts 163) is provided embedded in the plastic insulator adjacent to the magnet 103. A metal plate or insulator 136 may also be provided, attached to the magnet and insulator. A coating or surface may also be provided on the magnet 103. As shown in FIG. 18d, the magnetic shield plate 136 carries the contact and magnetic separator 132, as well as the magnet 103 and contact 134.

The device case 169 may be equipped with a mating wireless power receiving antenna, coil, rectenna, transducer 173 or other suitable receiving device or equipment. In various embodiments, the coil 173 or receiving equipment may be provided around the outside of the magnetic feature 103 such as in FIG. 16. Alternatively, the magnetic feature 103 may be provided around the outside of the coil. It should be understood the wireless power receiving antenna and or other equipment may be configured, in various embodiments, to provide power through the data input port on the electronic device contained within the device holder. FIG. 16 provides further views of these components according to various examples of embodiments. Logic, power transfer, rectification and the like may be handled through the device case's onboard logic component and/or the device itself. The wireless power connection system may have similar logic components to the direct-connect 163 option described herein. In various embodiments, the coil 173 may allow for a check on the connection by way of the magnetic attachment or physical connection prior to transfer. Wireless charging is high-amplitude wireless communication. A check could be performed over other wireless communication such as Bluetooth or other protocol described herein. In various embodiments, the transmitting coil may be designed with the receiving coil in mind—in other words, in various embodiments, the coil and magnet configuration may be mirrored or otherwise substantially similar as provided on the device case and mount or other accessories. Integration into the device case rather than onboard the device may impart various advantages, including closer coil proximity for higher transfer efficiency, lower heat transfer through the coil into the device as the coil is being provided externally, diminishing unnecessary heat accumulation in the device itself. In other words, improved thermal management may be provided in the case/device holder. Various dissipation mechanisms can be used, including air and thermally conductive plates and heat pipes.

It should be understood an RF antenna and or transmitter like feature may likewise be included or integrated into the case for enhanced wireless functionality. The RF antenna or like feature may enable functionality such as allowing a device to act as a garage door opener, remote control, or any like device using such technology.

In various embodiments, and as indicated in FIG. 16, the electronic device to be housed in the device holder 169 is provided with a data port 179 suitable for the electronic device—for example (but not limited to), a lightning port for Apple devices or a micro USB port for Android devices. The device case may be provided with multiple data ports 179 for accepting connections from sources configured to interact with particular device models. The device case 169 may be specially configured to interact with the data port of the particular device type. In various embodiments, the device case 169 may be provided with a compatible male port to connect to the device data port. Such a configuration may have various advantages, including use of a mount with a standard device charger (e.g., one provided with the device at the time of purchase) or any other suitable charger on hand. The data port therefore allows for elimination of the need for integrating the phone or suitably equipped device physically with the cord.

The case 169 may also contain a number of mating pins/direct connect attachment signal contacts 163 which may, in various embodiments, be substantially identical to those described in conjunction with the device mount. FIG. 17 shows an embodiment of a mating direct-connection attachment. In various embodiments, the pins 163 may correspond to pins provided within a charging device, e.g., head 161. For example, a USB or lightning connector may have multiple connection pins, each which send a different type of signal. Depending on the connecting device, a different number of pins may be used for communication. In other words, if a device requires data transmission and charging to be made over eight pins, eight pins may receive those various signals to ensure acceptable transmission to the device. By using the pin connection system disclosed herein, the universal adapter allows for a device-acceptable data and power transmission signal to be transferred from the device mount or other source to the device within the device case without the need for the coupling of a cord to the device. The opposite may also be enabled; in other words, data communication from the device may be made to a peripheral or receiving device by way of the device provided in the device case using the signal contacts. In various embodiments, the contacts/pins/buttons may be provided in a substantially male/female connection configuration. In various embodiments, the magnetic attachment feature may facilitate the connection of the contacts.

The direct connect pin connectors 163 may correlate contact pins with each pin in the USB, lightning, micro USB, or other data transfer mechanism suitable to the device. The device mount 105 may have contacts wired from the female USB/micro USB/lightning or other port to the pins. On the device mount 105, if multiple ports are provided, similarly functioning contacts may be wired in parallel to allow for transmission over the same pin. In various embodiments, any number of pins may be provided to actuate the functionality. The pins may be disposed of radially, and may be re-routable. The pins or other contact means may be integrated by various means into the magnet(s). Onboard control circuitry may allow for re-indexing of the pins for minimization of contacts. Therefore, while the pins may be correlated with each pin in the connector, they also may otherwise be indexable for re-routing based on device orientation for ease of use.

The pins or other suitable connection mechanism 163 may be distributed in a radial pattern, in various embodiments, to interact with the magnetic attachment feature. In various embodiments, a minimum level of control logic may be provided to route or re-route signal, enable interaction with device-specific transfer protocols, enable/disable charge provisions, and the like.

The control logic may also incorporate voltage or current regulating circuitry to compensate for different device requirements.

Figure 24:
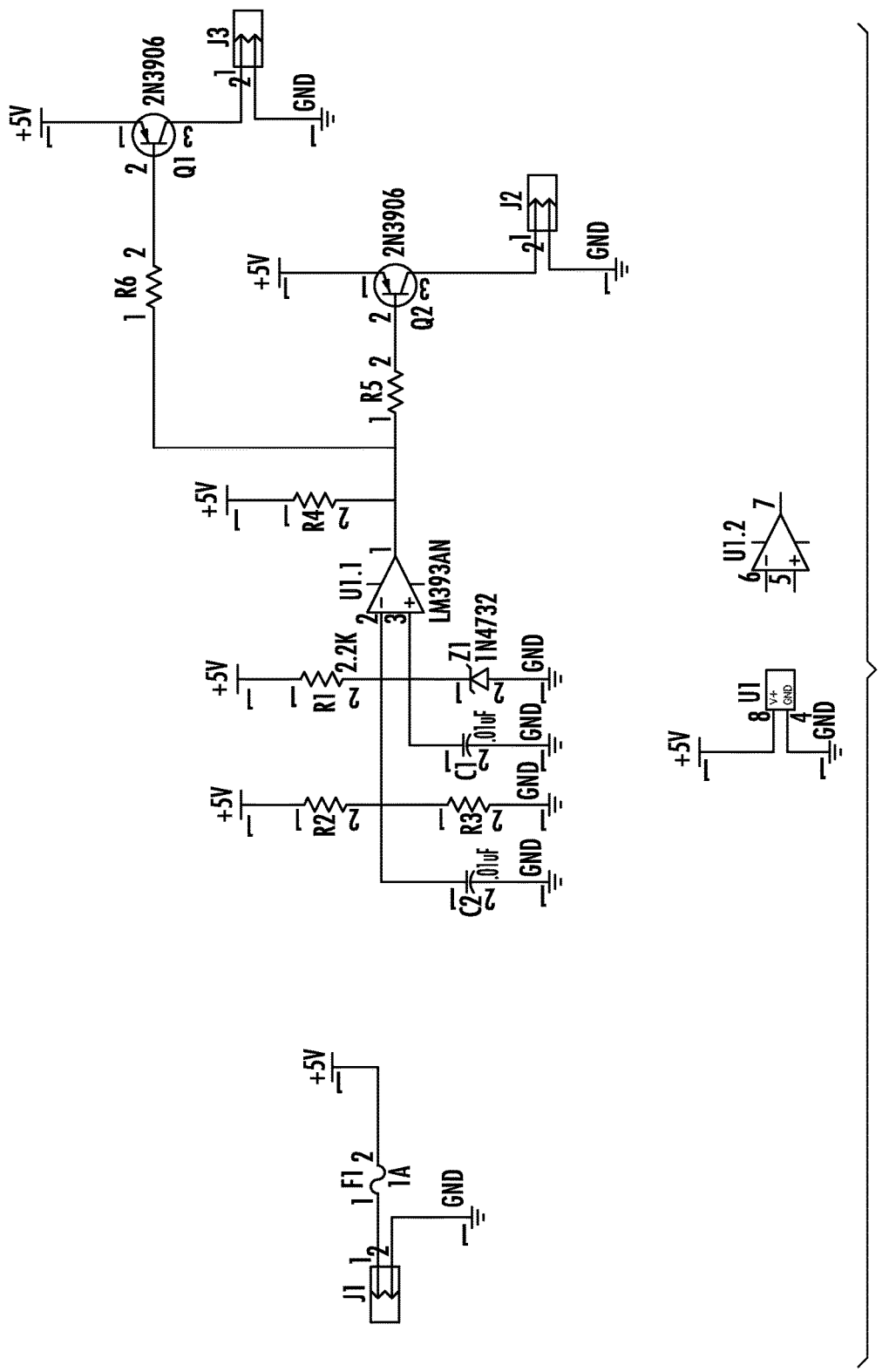
FIG. 24 shows one or more examples of a control circuit for power and/or data transfer control in the device case, mount, and/or peripherals, according to various examples of embodiments.

In various embodiments, the close proximity of the devices (e.g., electronic device with case, and mount) may allow for an improved wireless communication protocol, which is verifiable through direct access. In various embodiments, the proximity may facilitate wireless data transfer. Known suitable wireless data transfer protocols may be used, including Bluetooth, RFID, NFC, Wi-Fi, and the like. A "normally open" logic state may be provided on the device mount, holder, charger, or other accessory to protect against unwanted power discharge or transfer. FIG. 24 shows, in various embodiments, a potential logic circuit, which could be used to implement the "normally open" logic state described herein. The logic circuit may be provided, in various embodiments, within the case or at any junction between the power and or data transfer mechanism and object. For example, it may be provided between the male port and power delivery and data transfer features in the device case as shown in FIG. 16.

A handshake protocol may be initiated to change the "normally open" logic state to allow power and or data transfer. The handshake protocol may allow for verification of device type to enable safe transfer of power and/or data. This process may be described, in various embodiments, in connection with FIG. 26 discussed further below. It should be understood any suitable device may be enabled to take part in this handshake protocol. Peripherals, chargers, mounts, and any other object having the disclosed pin data and power transfer protocol system may be used.

Figure 27:
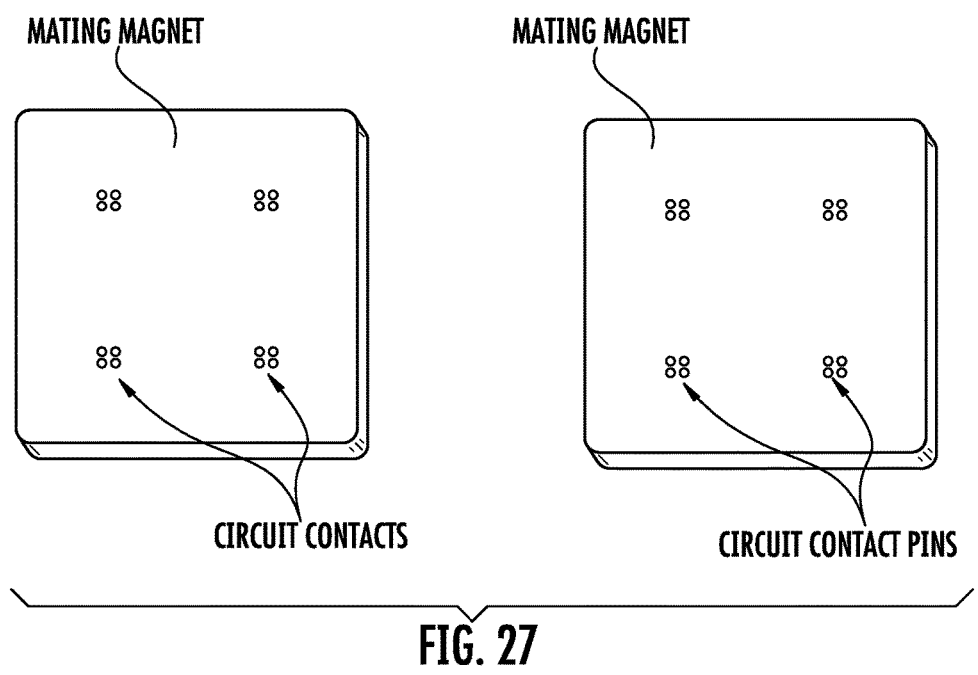
FIG. 27 illustrates one or more perspective views of an alternative configuration of a magnetic attachment mechanism having integrated circuit contacts, according to various examples of embodiments.
Figure 28:
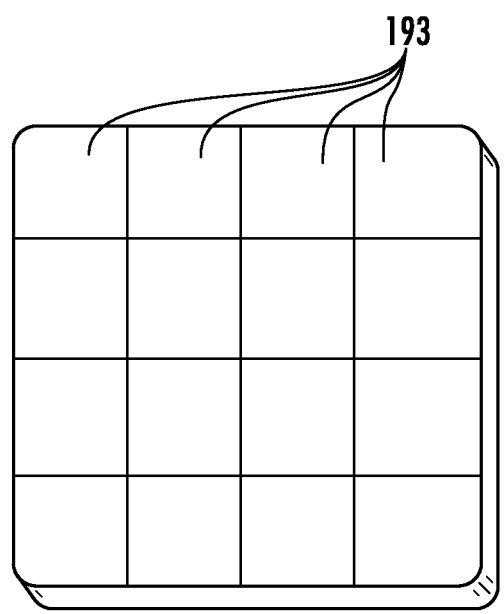
FIG. 28 illustrates a perspective view of another alternative configuration of a magnetic attachment mechanism, showing circuit contacts integrated into the magnets themselves, according to various examples of embodiments.
Figure 29:
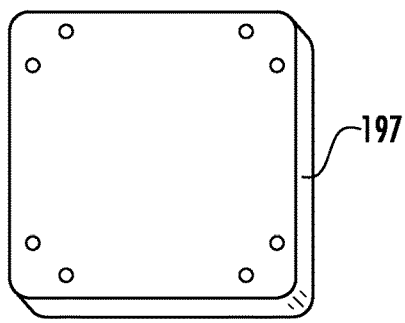
FIG. 29 is a perspective view of a magnetic interface according to one or more examples of embodiments for use with the system described herein.
Figure 30:
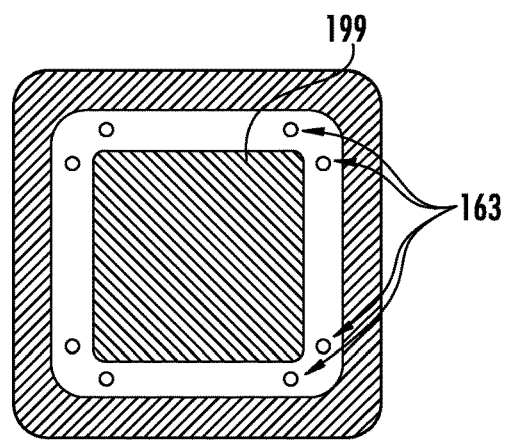
FIG. 30 is a plan view of one or more examples of a polymagnet, showing an electromagnetic coupling/decoupling coil and/or residual magnetic coupler/decoupler or receiver and electrical contacts as further described herein.
Figure 31:
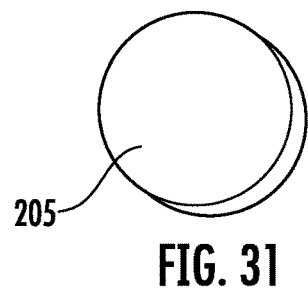
FIG. 31 is a perspective view of one or more examples of an off-axis decoupler as further described herein.

FIGS. 27-28 illustrate additional mating magnets 103, 107 and pin/contact 163 arrangements. FIG. 27 shows the contact connections could be provided on the indexing magnetic attachment mechanism itself. This may, in various embodiments, contribute to consistent alignment, compact size for the system elements, and visual interest. These pins, conductors, and/or contacts may be arranged around the periphery of the magnet(s) as well as integrated into holes, channels, recesses, or other features in the magnet(s) surfaces.

FIG. 28 shows an alternative configuration for the magnetic attachment mechanism and direct connect contacts system. FIG. 28 shows, in various embodiments, sixteen magnets 193 separated by an electrical nonconductive or electrically isolating material, such as plastic, ceramic or air. The magnets 193 may then be attached on a back side to some manner of allowing for a small degree of motion, such as a spring, to facilitate magnetic actuation and coupling. The magnets 193 may be arranged in any pattern of magnetic polarization suitable for magnetic coupling and alignment purposes. The magnets 193 may also be electrically conductive, the power and signal lines may be transferred through the magnetic plating for transfer of data and/or power, for example, in much the same manner as the pogo pins/contacts described above. In other words, the grid disclosed in FIG. 28 and its equivalents may be used for magnetic attachment and/or electrical transmission for data connection and power transfer purposes.

Figure 26:
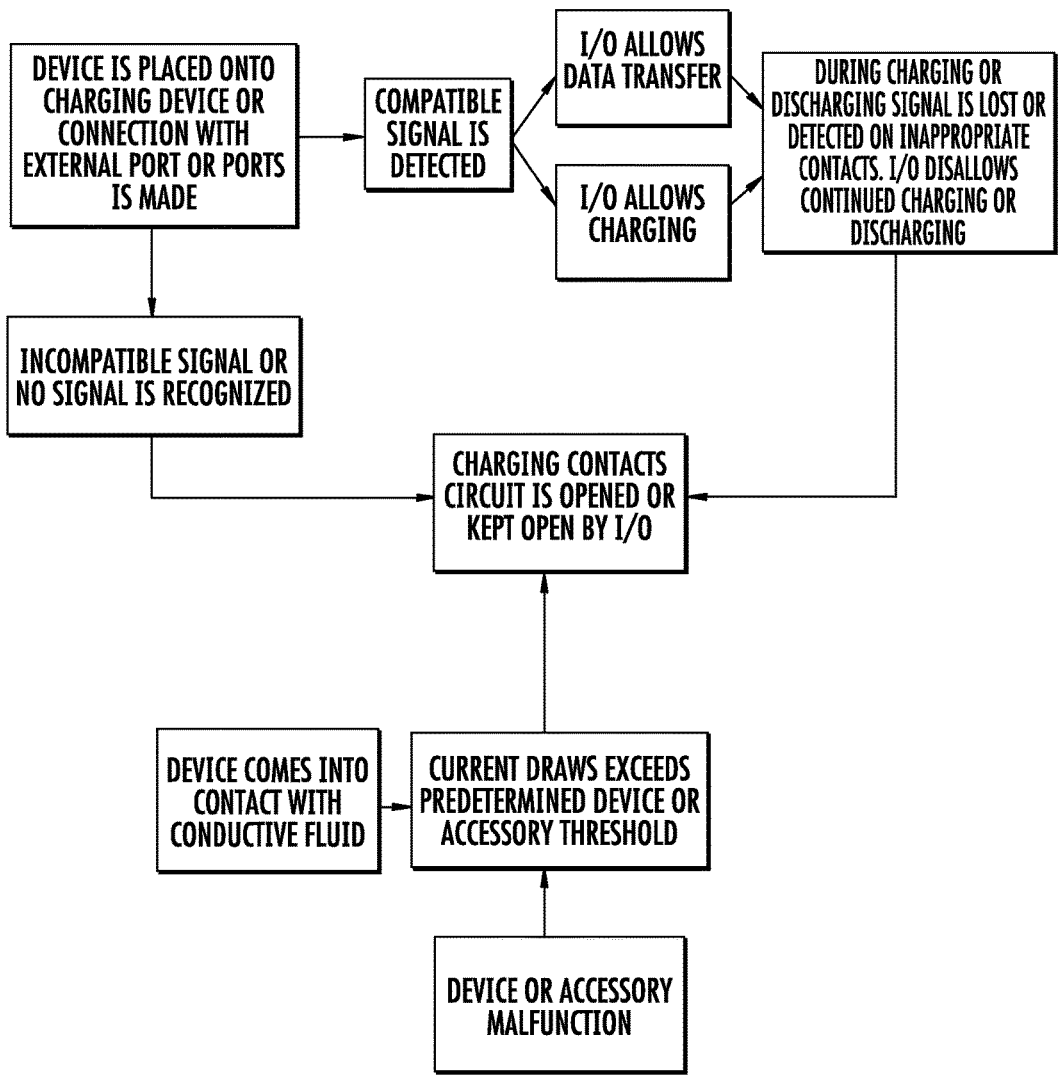
FIG. 26 shows a logical flow diagram for the attachment of a device having the device case to a device mount, peripheral, or other suitably-equipped object, according to various examples of embodiments.

FIG. 26 provides a logical flow for connection logic, showing when a device provided in the device holder contacts with a peripheral, mount, or other suitably equipped objects having the direct connect features described herein. In various embodiments, an integrated logic unit having a normally open or closed system may be used to implement the steps of FIG. 26. In various embodiments, the circuit operating this logic may comprise, in part or whole, the circuit of FIG. 24. In various embodiments, the device contained within the device holder is placed onto a mount or otherwise attached to a peripheral; an evaluation of the compatibility of the connection may be performed. If the signal is compatible, data transfer and/or charging may be allowed. Various protocols may be allowed in the event of an interrupt or short circuit condition. In various embodiments, the circuit may revert to a "normally open" state to protect the device. In various embodiments, the device in the device case or other suitably equipped object may come into contact with a fluid or otherwise a malfunction occurs with a device or accessory. In various embodiments, the circuit may evaluate whether the draw exceeds a threshold or otherwise does not fit within a certain draw range. In this case the charging contacts circuit remains in a "normally open" state or otherwise becomes open.

In one or more examples of embodiments, one or more ports of the device case may be isolated. A physical separation of the input and output ports integral to the device and the exterior and or accessible portion of the case may be provided. This separation may be, in various embodiments, accomplished via electrically conductive wires and or conduits which are hermetically sealed into the case by incorporation into the case material during manufacture or by utilizing some sort of static and or dynamic sealing mechanism which could be inserted or installed. The device case may not need a dynamic sealing device and/or mechanisms to isolate the interior of the device case from its potentially hazardous environment because no direct through case access ports into the device are necessary. No hatches or doors may be necessary for maintenance of watertight integrity as is required by traditional devices and device cases. It is by incorporating externally accessible, hermetically isolated ports, which can be interfaced with the encased device and or other devices that the high level of watertight integrity is accomplished. These externally accessible ports may no longer need any means of preventing water and or dust ingression, other than for the maintenance of functionality as there is no longer a path for external contaminants to reach the interior or protected device compartment. The use of logic features in the device case may facilitate the isolation of ports. By allowing for any power entering or exiting the device to require passage through a suitability determination circuit, which is "normally open," the case's I/O control may prevent shorts or other electrical failures and or data corruption, which may commonly damage or break electronic devices. In various embodiments, the ports and pins may allow for discharge of power from the device to peripherals and other attached devices both with and without their own power supplies. The handshake may allow for transfer of power in both directions, from device or to device. In various embodiments, depending on the attached accessory such as a charger, data storage device or mount, the handshake or power transfer protocol may enable a pop-up on the device asking "would you like to initiate charging or data transfer?" or other messages including solicitations from vendors when coupled to a public or commercial interface. In various embodiments, a smart button (described further herein) may be provided to initiate the charging verification process or other user programmable or otherwise determinable functions both on the attached device and or peripheral.

In various embodiments, the pin 163 configuration allows for the case 169 to facilitate power and data transfer in an orientation-agnostic manner. In other words, connection at various orientations may allow data and power transfer.

The device case 169 may be provided with internal circuitry and logic to enable the functionality of the features described herein. Looking to FIG. 16, the device case 169 may receive power or signal through the signal contacts from a directly-attached device mount 161 (and 105) or peripheral 157. The signal contacts may transmit the compatibility verification signal through the pin configuration to the control circuitry. If the control circuitry is satisfied the connection is a proper data transfer and/or charging request, the control circuitry may then allow the power and/or data to be transmitted into/out of the electronic device. In various embodiments, the control circuitry would alter its normally open state as described above. This change, in various embodiments, may occur upon the evaluation of a certain trait, such as the transmission of data or power over a certain number of pins. In various embodiments, the transfer may be bi-directional, that is, power and data may flow both to and from the device based on the connections. Once interpreted by the control circuitry, the signal may be passed to the integrated male port for transmission into and out of the device.

A data and/or charging connection may likewise be made directly into the case by way of the female ports 179, which may be lighting/USB/micro USB or the like. In this case, a user may directly plug in a charging or data transfer cable into the device case. These ports may, in various embodiments, be wired in series and/or parallel with connecting pins or contacts in the case. In the alternative, the signal may be sent directly to the control circuitry. Once a signal is received through the female port, and sent to the control circuitry, the control circuitry may similarly change its normally open status in response to a parameter as described above. In turn, the data and power would be transmitted to the device, again, by way of the integrated male port.

In various embodiments, the logic feature may be integrated with the male port. While the control logic may or may not be device specific, the male port may be required to be device specific. In various embodiments, the logic may remain the same though the pinout for the male port or connector may change.

In various embodiments, these features may be enabled with minimal communication within the device itself. In other words, the device case may be supplied with sufficient logical capability to enable the features disclosed herein. In various embodiments, the device case may have multiple logic circuits. In various embodiments one may allow or disallow power and data transfer through the male port. In various embodiments, the headphone jack 181 may allow for power and data transfer over the same or a second logic circuit. Therefore, ports for both headphone and male data port may be provided within the device case as requiring insertion into the device itself. In various embodiments, the control logic may be relatively simple, allowing for if/then logic for connection and peripheral activity. A normally open gate may be provided as part of the logic preventing unwanted power or data transfer in the circuitry.

In various embodiments, the pin adaptor may be connected to an accessory. The device case's onboard logic may allow for per-cycle determination if a device is attached correctly. In various embodiments, the accessory may be a video game controller wherein the device may send power to the accessory, eliminating the need for additional batteries to be contained in the accessory. Data transfer may be made through direct connection and/or suitable wireless connection, such as but not limited to Bluetooth or other protocols described herein.

The device case wiring and direct connect/pin features allow for various advantages, including but not limited to high speed communication and minimized communication lag between device and peripherals, the elimination of cores, universal data connection, and universal power protocol.

In various embodiments, a user may insert the device into the device case by connecting the male port, male headphone port, or both and positioning the device case shell around the device. These male ports may communicate with the control circuitry provided in the device case to allow for communication with the device. Once connected with the device, the case may attach to an array of suitable mounts, accessories, or charging cables.

In various embodiments, an SD card or other suitable memory expansion slot 191 may be provided within the device case 169. The SD card slot may be, in various embodiments, provided inside and/or outside of the device case. The card may provide for two-way communication, allowing for data to be written to the card from the device and vice versa. By utilizing either a direct wired through the I/O control circuit or wireless connection powered by the device's power source or another power source, additional memory interfaces may be created. These may be of the SD format or any other suitable format. By integrating these additional ports into the device's case, multiple benefits are realized, including but not limited to easy access to removable media without the need to remove the device form the case, as well as an easy means of expanding the device's available memory. The SD card may also interact with a small microcontroller for the transmission of data using an onboard Wi-Fi, again, from device to SD card and vice versa.

The memory expansion may make use of failsafe circuitry for data and power transfer. This circuitry may be part of the case components.

Referring again to FIG. 16, in various embodiments, the case may be provided with additional peripherals or accessories built into the case. In various embodiments, an accessory port may be provided. In various embodiments, the case may include a flashlight, laser, microSD chip, or other suitably sized object which may be, but is not required to be powered by an electronic device. The accessory may then receive power from the device. Similarly, water proof amplified speakers and microphones may be integrated into the case for improved sound quality. A female headphone jack may also be provided in the case, allowing for the re-location or ease of access of a headphone jack to a suitable location in the device.

The signals to and from these peripheral objects may route through the control circuitry. Again, the control circuitry may route the signal if necessary to the device. In various embodiments, the peripherals may not require data communication with the electronic device.

To further the hermetic nature of the case, the device may be programmed (application) to drive and monitor an external waterproof speaker 183 and microphone 185 through the male charging and data plug and or the headphone jack while disengaging the onboard sound collection and transmitting hardware.

In addition, a smart lanyard feature may be supplied. This lanyard may exhibit behaviors not typical of standard lanyards, such as automatic opening or closing of the loop. This lanyard may facilitate physical tethering of the device in a failsafe manner to many compatible magnetic coupling mounts or other appendages. The lanyard may incorporate a nitinol alloy core to provide for electromotive and thermoset super elastic mechanical behaviors not possible in a standard filament lanyard. Non-limited examples of these behaviors are:

Automatic opening of a lasso feature upon extraction from an integrated receiving enclosure.

Opening and or closing of the lasso feature upon application of an electric current and/or application of spring tension.

Extension and/or retraction of the lanyard into or out of its receiving enclosure.

The case and mating device mount may also alternatively incorporate spatially specific magnetically actuated retractable power and or data transmitting electrodes. By utilizing retractable electrodes, a high level of electrical and device safety may be ensured as only the correct spatial alignment and contact of the magnetically actuated electrodes may allow exposure of the conductive surfaces. This ensures the conductive surfaces are only exposed appropriately to their corresponding mating electrode. By utilizing full contact conductive electrodes, very high power transfer efficiency is obtained. The devices onboard electronics including the I/O may also utilize a means to wirelessly communicate with and recognize the charging device. This may be utilized to ensure compliance and compatibility of a device with the corresponding mount, as well as allow for a wide variety of software and hardware programmable behaviors. Examples include but are not limited to:

Sleep mode when a device is placed upon and magnetically coupled onto a charging or non-charging compatible mount.

Driving mode when a device is placed upon and magnetically coupled onto a charging or non-charging compatible mount.

Music mode when a device is placed upon and magnetically coupled onto a charging or non-charging compatible mount.

GPS mode when a device is placed upon and magnetically coupled onto a charging or non-charging compatible mount.

The headphone jack 181, when applicable, may also be hermetically separated from the device. This allows for optimal placement of the alternate jack and/or implementation of a different communication methodology such as, but not limited to Bluetooth and/or a low profile retractable and/or magnetically actuated contacts.

In another example of embodiments, the system may include a device charging dock or case including an integrated peltier junction and/or heat pipes for supplemental dissipation of heat. In yet another example of embodiments, the system may further include an accessory game controller in communication with the case by using the pin connection, accepting power from the device, and communicating, in various embodiments through the connection or over a wireless connection such as Bluetooth, Wi-Fi, or other suitable protocol.

It should be understood the system described herein may provide the power and processing capability of the electronic device to peripherals and/or accessories by way of the disclosed interface/power and data transfer mechanisms. In other words, the system described herein may allow for "dumb" devices or devices without power or logic capabilities, to become "smart." This can lead to a variety of applications, including, but not limited to: security applications such as integrating a device for use with a gun safe, payment solutions such as purchasing from a soda machine, ATM's or other retail environment. In various embodiments, payment using the disclosed system may be more secure than known wireless (NFC, RFID, other radio, Wi-Fi, etc.) payment systems, as a direct connection may be required between the device and recipient peripheral. Further, the peripherals, devices, etc. may be stacked, much like a number of Legos, by attaching the contacts front-to-back, similar to that shown in FIG. 17, but continuing with further peripherals and/or other system components.

This methodology is furthered by the integration of the power and/or data transfer port (pin port, or device adapter) into the watertight compartment and/or interior of the device case. The power and/or data transfer port which may be configured or communicate with a male port specifically designed to integrate into a specified device's charging and/or data port, allows for simple and unencumbered external access to the protected device's power supply for recharging or discharging applications and/or peripherals, as well as the devices other internal componentry such as but not limited to data processor(s) and memory via the magnetically aligned and spatially relevant pins and or contacts. Additional otherwise unachievable device protections can be achieved through this methodology such as complete dust protection without the need for or reliance upon any type of air and/or sound filtration devices, membranes or mechanisms, High level radiation and/or Electromagnetic Field (EMF) protection, as well as outstanding thermal management and protection. Device functionality is maintained or even improved upon through the use of and/or integration of better quality and/or more environmentally or task suitable components, which would otherwise be obstructed, interfered and/or rendered less useable by the device case. These may include water resistant speakers, microphones and other human or peripheral hardware interfacing devices such as radio frequency antennae, infrared transmitting LED's, input controls and or surfaces and illumination or indicating components.

The device case 169 may, in various embodiments, be constructed from any suitable components and or materials acceptable for use in the designed environment. These may include injection-molded plastic and elastomeric polymers as well as composite materials such as but not limited to fiberglass, carbon fiber, aramid fiber and other fiber reinforced resin systems. Integration of additional optional materials into the composition, interior and or exterior surfaces of the case for additional desirable characteristics such as rubber bumpers or radiation shielding additionally enhance the capabilities of the device case. These may include dispersion or suspension of radiation absorbing and or reflecting materials such as but not limited to barium sulfate into the resin or other materials of a multi-component composite material, materials applied to the interior and/or exterior surfaces, as well as thermally active shields or heat absorbing or dissipating materials and devices.

The above-described hermetic isolation of the device's connectivity ports from the exterior of the case substantially improves the protection level of the device over current protective cases with direct device access ports requiring dynamic sealing mechanisms to maintain the protective integrity of the interior of the case in isolation from the hazardous environment. Without the need for reliance upon dynamic seals as well as the need to ensure these seals are intact and in place before exposure to environmental hazards, the contamination of and/or damage to the access port seals and the device they are intended to protect becomes a non-issue. The device case may also incorporate active and or passive circuitry and/or connection means or mechanisms to electrically isolate the external ports and integrated power and data transfer contacts and pins from the device and it's data structure. This capability ensures power transfer operations can only ensue under proper connectivity conditions. The control circuitry is designed to maintain a fail-safe mode of operation until the correct and proper connectivity protocol is established. This mode may not allow for power or data transfer to occur unless the appropriate compatible device signal is sensed and maintained. Loss of this signal may trigger the control circuitry to revert to the fail-safe mode preventing short circuits and or corruption of the data.

The base and/or accessory may also incorporate hermetically isolated means or mechanisms to facilitate connectivity to the device, such as elastomeric or spring energized thin metal contacts.

The case can integrate with the device through the use of appropriately selected and or device specific male port(s) to mate with the device's female port(s) intended for charging, and/or data transfer as well as signal output such as headphones. Physically and electronically integrating and interfacing the case with the device may realize the following capabilities.

A wide variety of adapters, including but not limited to male and female USB ports, and audio signal jacks, and proprietary connector ports compatible with many of the most common mobile devices in current production. These ports may be integrated into the case to allow for easy adaptation and connection to a disparate array and variety of cables and connectors utilized for data, signal and/or power transfer.

Access to the device's processing capabilities and power supply is also provided. This is particularly useful for the operation of peripheral devices, which may or may not be mechanically integrated into the case or accessible to or through the case via a variety of connection means including the magnetically aligned contacts. These devices may include, but are not limited to valuable safes, laser pointers, LEDs and remote headphone jacks located in an alternative orientation and position relative to the jacks on the parent device. The above-described ports may also be hermetically isolated from the interior of the case allowing for a completely waterproof case without the need for access doors and panels or any other means of directly accessing the parent device.

The rerouting of power and or signals from internal device components such as speakers and microphones to external and or other internal to the case, peripherals and or components is facilitated. These devices may include near field communication antennas, wireless charging receiving/transmitting and/or power transfer antennae and/or physical contact electrical connectors such as, but not limited to pogo pins or contact pins for use with data transfer and/or power transfer from the device case to the device when it is mounted in the correct orientation to a base or peripheral device equipped with compatible directly connecting spatially indexed signal and or power transfer contacts.

The implementation of external to the device but integral to the case speakers and/or microphones to allow for improved sound pickup without sound transfer provisions in/through the case, as well as powered and/or amplified external to the device speakers.

A smart button or user programmable accessory switch may be a mechanically operable switch and/or a capacitive switch and/or any other suitable switching mechanism either solid state or mechanical or otherwise. The user programmable accessory switch may be located on any point of the case for the device. The switch(es) is (are) intended to be integrated with the internal componentry including the processor and is (are) therefore capable of initiating a wide variety of user programmable and/or selectable behaviors, including but not limited to turning on the flashlight or the LEDs used for illumination during image capture, initiating a voice recorder, beginning playback of a music playing application, locking and or unlocking the device, and may also be utilized in some capacity or combination relative to the other input switches and/or surfaces of the device for locking and/or unlocking access to the device or a program within the device. The smart switches may also directly control non-device integrated components or peripherals.

There may be any combination of switches both mechanical and capacitive touch and/or touch sensitive in some manner on the device case. The switches may likely, but not necessarily be located in ergonomically correct positions for ease-of-use and access.

As shown in FIG. 25, a power bank charger 157 may be provided which is configured to interact with the system disclosed herein. The power bank 157 may be provided with suitable magnetic attachment features 107 on the front and back of the device, as well as connection pins 163 suitable for function with the direct connection protocol described herein. The power bank charger 157 may also be provided with multiple data ports 195 such as lightning and USB or other suitable port type. The ports 195 and direct connection protocol features 163 may be used, in various embodiments, for power and/or data storage and/or transfer. The device may contain a suitable battery cell and/or capacitor type for storage and transfer of charge as necessary.

With the standardization of the spatial relationship of the direct connect signal, data and/or power transfer contacts, such as but not limited to pogo pins or contacts relative to the indexing magnet (the interface), additional power, signal and data transfer facilitating and/or modifying devices may be designed, adapted and integrated to the device and/or the device case. This arrangement of standardization allows for a wide range of supplemental and standalone devices with the compatible mating indexing magnet and corresponding direct connect transfer contacts to be integrated with the device, its case and/or its mount. For example, referring to FIGS. 17 and 25, a power pack 157 for transferring power and/or pure data from example devices may include but are not limited to supplemental batteries, flashlights, infrared or thermal cameras, and audio systems. Some devices, especially power banks, may also incorporate an accessory magnet on one side and a device magnet on the other side, as well as the appropriate pass through electrical and/or signal pins or connectors. The pass through contacts may or may not also incorporate the necessary fail-safe isolation circuitry similar to the circuitry found in the device case. This arrangement facilitates charging the phone and the battery bank simultaneously from the charging base without the need for, or use of a cord to connect either the charger or battery bank to the device or the charger.

To further elaborate on the magnetically aligned wireless power transmission receivers and antennae, the receiver, its device category specific coupling magnet and housing (the device) upon nearing a suitable mount is first magnetically drawn into a very near proximal position by the specified transmitting antenna and its compatible coupling magnet assembly. Upon physical contact between the device and the transmitter, the coupling magnets further refine the physical alignment and position relative to their magnetic key signature polarization. It is this propensity of the interacting magnetic fields to align in a specific and predictable orientation that allows for the use of transmitting and receiving antennae optimized for high power transfer efficiency only when in precise alignment in one or more axis. Other than the surfaces at the point of physical interface, the paired coupling magnets are the primary means for orientation and alignment. This allows the surfaces at the physical interface to be flat and smooth and makes physical or mechanical alignment and retention features unnecessary.

A magnetically aligned wireless power transmission device is integrated into a case or enclosure for another device to facilitate magnetically aligned and coupled transmitting and receiving antennae.

The case 169 incorporates the above self-aligning coupling magnets 103 to facilitate optimal positioning of the receiver's antenna with the transmitter's antenna. The case also incorporates surface features surrounding the coupling magnet to reduce the likelihood of contact with other surfaces. This (these) feature(s) may likely be a type of added and/or integral shape formed of the parent or other material. Elastomeric features are preferred but not required as a means to reduce damage to surfaces to which the case and/or its magnet may be brought into contact. It is primarily the magnet, which is most desirable to prevent from contacting other surfaces since the magnet(s) tends to have features of hardness sufficient to damage or scratch these surfaces. The features, such as standoffs on the case, need to be of sufficient height to keep the magnet from contacting reasonably flat magnetic surfaces, as these may create an additional force of attraction possibly deflecting or conforming the case to the magnetic surface.

As described above and in the Figures, the case 169 or base 161 may contain both a female micro USB and a female lightning connector, as well as other potential power and/or data transfer ports wired either directly or indirectly to one another in series and/or parallel and connected to the interfacing male plug appropriate for the device contained within. There may also be signal processing and power transfer regulating circuitry integrated into the case as well as peripheral devices 157 to facilitate activation and/or deactivation of any potentially exposed signal and/or power transfer electrical contacts. The device specific male charging and/or data plug connecting the device electronically to the case may allow for a hermetic separation of the other ports facilitating the creation of a case with outstanding water-tight, dust resistant and abuse tolerant capabilities including easily accessible ports which are not reliant upon dynamic seals.

As indicated, the present inventions relate generally to the field of magnetic device mounts and electronic device holders. Referring to FIGS. 29-36 the present inventions may also be used for on-demand coupling and decoupling of magnetic device mounts and electronic device holders.

To this end, the above described systems may be combined with a mechanism to automatically and/or autonomously initiate coupling and decoupling or separation. In particular, referring to the Figures, the present inventions combine an on-demand decoupling of an indexing magnetic device mount 105 and electronic device holder 101.

By combining an on-demand decoupling feature with an indexing magnetic device mount 105 and electronic device holder 103 with integrated charging and data transfer interface 197 (FIG. 29), the described interface becomes suitable for automatic and autonomously coupling and decoupling.

This new interface 197 is useable with, among other things, UAVs (Unmanned Autonomous Vehicles). In particular, the interface 197 permits the UAV to automatically dock and/or couple with one or more mounts, as well as other vehicles. Moreover, the interface 197 further permits the "un-docking" or separation of the UAV from the mount on-demand, such as for example, following a transfer of data, power, liquids, fuel, gasses, and/or cargo not limited to packages, but inclusive of anything transferable from a vehicle or dock or mount, to another vehicle, dock or mount.

More specifically, the described interface 197 or mount described above utilizes magnets of a predetermined specific size, shape and pattern polarization (i.e., multi-pole magnets, polymagnets or programmed magnets in conjunction with magnetic materials, electrical contacts, electromagnets, non-mechanical constraints and/or releases, and mechanical constraints and/or releases to releasably—and on-demand—uncouple and/or couple the device (e.g., UAV) to the mount.

One of the properties of the indexing magnetic device mount 197 used in this system is the ability of the programmed magnet or polymagnet 199 (see FIG. 30) (i.e., a magnet having a plurality of poles arranged in a specific pattern) to enable specific behaviors, such as but not limited to a substantially reduced magnetic coupling strength upon angular misalignment. The degree of magnetic coupling intensity, and consequential reduction of attractive force upon rotation or misalignment of one magnet mating surface relative to the surface of the other mating magnet, may be adjusted by increasing or decreasing the thickness of the parent magnetic material, the constituent composition, as well as the specific pattern of polarization of the magnets at the mating surfaces. Non-magnetic spacers and/or stand offs may also be used to reduce the coupling strength. These devices 197 may be attached to either or both sides (e.g., the A-side 201 and/or B-side 203) of the mount and may also include a means of ensuring electrical continuity across the interface 197 to provide for direct contact charging and communication. In one or more examples of embodiments, it is the accuracy and selective non-mechanical alignment of the magnetic interface that enables the type of self-aligning and coupling of the mating faces of the interface described herein.

As with the indexing magnetic device mount described above, any number of contacts 163 may be used to facilitate the transfer of data and/or power in the magnetic interface (FIG. 29) described herein. In addition to these transfer capabilities, the interface 197 is also capable of and may include a mechanism for coupling to enable both the transfer of fluid(s) and/or gas(ses) from one side of the interface to the other. In fact, the interface may provide for multiple transfers, such as, but not limited to, the conveyance of a coolant from one side through a heat exchanger or heat source on the other side and then returning through another discrete fluid path on the same interface. Powders (or solids) may also be conveyed across the interface, for example, through the use of compressed air. While specific examples are provided, one of skill in the art would understand that variations thereon may be made without departing from the overall scope of the present invention.

Figure 33:
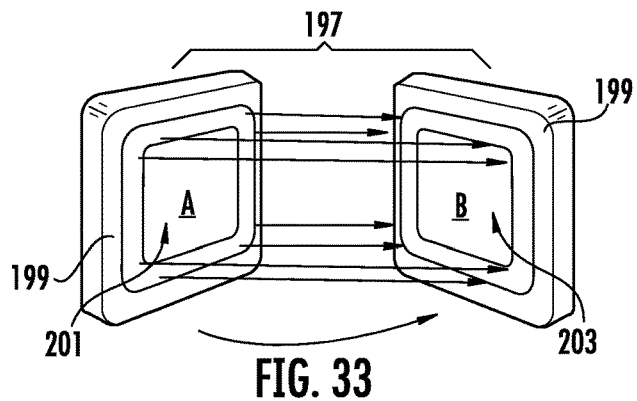
FIG. 33 is a perspective view illustrating A and B sides or faces of respective polymagnets of the magnetic interface described herein, and showing electromagnet coupling/decoupling of the coil or receiver.

In one or more examples of embodiments, it is desirable to use permanent magnets in the system to automatically align the components of the "A-side" 201 of the interface with the "B-side" 203 (e.g., wherein the A-side mates with the corresponding B-side). FIG. 33 illustrates one example of the interaction of the polymagnets A and B sides 201, 203.

Figure 34:
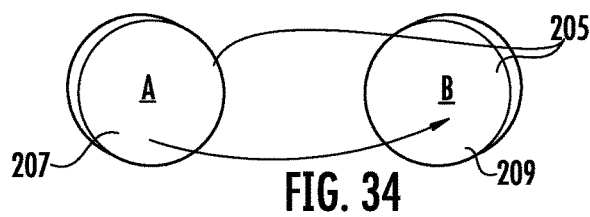
FIG. 34 is a perspective view illustrating A and B sides or faces of respective off-axis decouplers as further described herein, which may be magnetically attracted.
Figure 35:
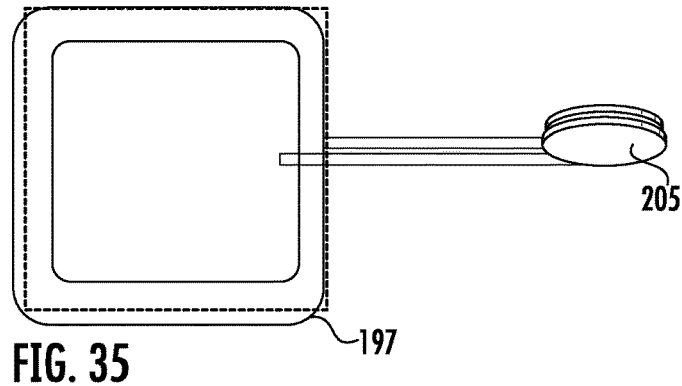
FIG. 35 illustrates an aligned magnetic interface with linked off-axis decouplers according to one or more examples of embodiments described herein.
Figure 36:
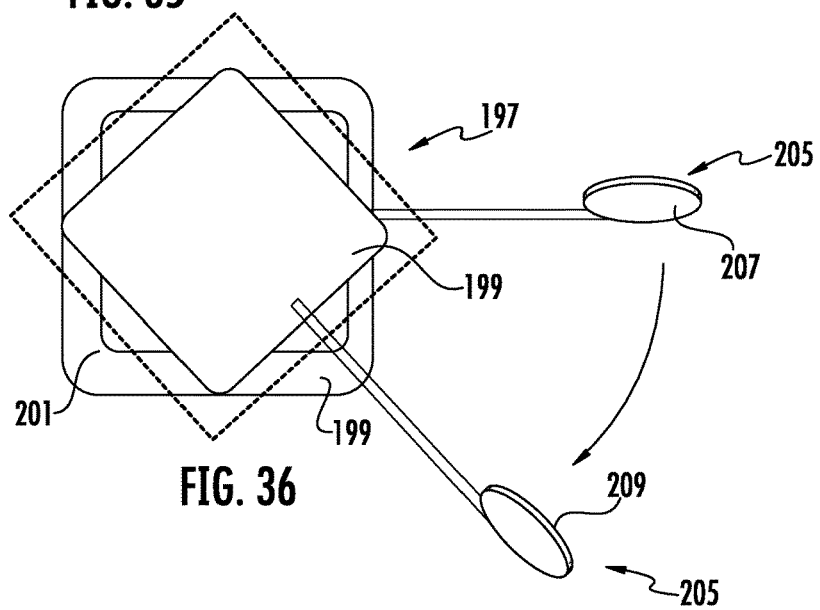
FIG. 36 illustrates the magnetic interface with linked off-axis decouplers of FIG. 35, showing the rotation and separation of the off-axis decouplers relative to one another, and the resulting rotation of one of the polymagnets of the magnetic interface thereby providing a misalignment of the respective polymagnets of the interface for separation as described in one or more examples of embodiments.

The decoupling means may be electromagnetic or non-mechanical in nature, as well as a hybrid system incorporating a mechanical release or spring-loaded launch, as well as a movable permanent magnet (e.g., see FIGS. 34-36).

The use of certain types of non-magnetic electromagnetic decoupling mechanisms may reduce the propensity of these means from interfering with the magnetic alignment of the mating sides 201, 203 of the interface 197. Examples of non-interfering electromagnetic coupling and/or decoupling components include, but are not limited to, non-magnetic conductive materials intended for the conduction, creation and/or induction of electric currents and/or their corresponding attractive and/or repulsive magnetic fields. These components may be the creator of the initiating field, such as a copper or other conducting coil, or the recipient of the induced repulsing field, such as copper, aluminum, magnesium, carbon, or other conductive material suitable for conveying the induced current and corresponding repulsive magnetic field. These components may also be utilized in reverse fashion as a supplemental means of guiding and or assisting the coupling of the mating surfaces of the interface.

This decoupling and/or launching may be achieved through the use of a mechanical actuator by itself, or in combination with a spring, or in a non-mechanical manner through the use of an induced repulsive electromagnetic field, and the like. To this end, in one or more examples of embodiments, it may be desirable to use a non-mechanical means of separating and/or launching the device attached to the mobile side of the interface 197. In the case of an induced repulsive field, the induced repulsive magnetic field needs only be strong enough to decouple the interface to sufficient distance and/or alignment to prevent inadvertent recoupling, but may also be substantially more powerful as to facilitate a launching function to rapidly propel the device attached to one side of the interface away from the other. Through the use of this non-mechanical electromagnetic decoupling, it is possible to tune and/or adjust the strength of the decoupling force relative to the mass of the coupled device, and the desired launching force allowing a wide range of decoupling forces as well as varied strength permanent magnets on either side of the interface. Non-mechanical decoupling also allows for a very compact and highly reliable system, allowing for a durable interface.

Release of the device from the mount 105 may also be achieved through any number of mechanical or non-mechanical actions, which may be initiated by either the mount and/or the device. These actions may be singly, or a combination of actions, such as but not limited to electromagnetic fields, both attractive and repulsive, mechanical and/or spring loaded actuators, as well as rotation of the device relative to the mount. In one example, the rotation of the device relative to the mount may be created by the device using propulsion means to push against the air or another means to cause the device to rotate relative to the mount. Alternatively or in addition, the mount may also have its own rotational means intended to cause an angular misalignment of the mating magnetic interface surfaces by rapidly rotating with sufficient velocity to utilize the mated device's own inertia to resist the angular acceleration thereby causing or assisting the angular misalignment.

Solid-state variable attenuation magnetic shielding may also be used as a means, or as an assistant to the coupling and/or decoupling means, or a means of joining or separating the faces of interface 197. This material may selectively shield magnetic fields based upon the intensity of an external stimulus. By increasing the attenuation of the magnetic shielding in selective areas of the interface or across the entire interface, a less intense separation force is required for decoupling and/or launching.

Another means of assisting the decoupling of the mated magnets 199 may be or include use of a hydraulic or pneumatic actuator or bladder system. Either, or both, sides (e.g., A-side 201 and/or B-side 203) of the interface 197 may employ provisions for powering or actuating this mechanism.

In one or more alternative examples of embodiments, another means of decoupling the interface is an off-axis decoupler 205 (FIGS. 31, 34-36). The off-axis decoupler 205 selectively creates an off-axis force to initiate the decoupling of the interface 197. This decoupler 205 is provided at a distance from the interface 199 and imparts a specific amount of mechanical or electromagnetic force to tilt, rotate or otherwise weaken, or even completely separate, the interface, thereby allowing decoupling of the respective components or sides of the interface. In the illustrated example, the off-axis decoupler 205 may be aligned (and may be magnetically attracted by joining the A & B sides 207, 209) when the linked magnetic interface is aligned. As shown by a comparison of FIGS. 35 and 36, by separation of the decoupler's A and B faces 207, 209 and rotation of the linked off-axis decoupler 205, the polymagnets 199 of the magnetic interface 197 are rotated out of alignment, thereby 'breaking' the magnetic force holding them in alignment and allowing separation of the respective A and B sides or faces of the interface.

Either side of the interface 197 may also be mounted upon a tether or other flexible fixture. Having either interface able to move independent of the device or the mount allows for a larger degree of self alignment ability as the interfacing components may more easily self align in space due to the interaction of the magnetic fields before contact.

The electrical contacts on the interface also serve to communicate correct and or incorrect alignment between the mating interfaces.

Figure 32:
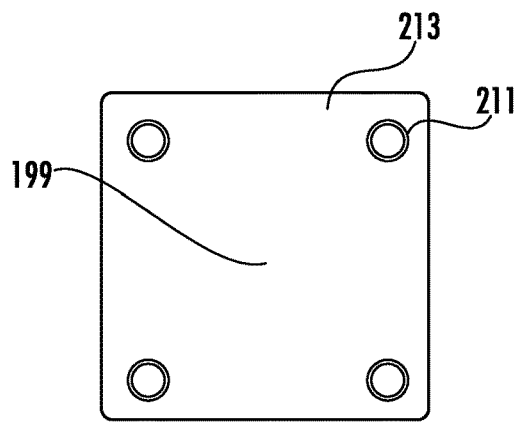
FIG. 32 is a plan view of one or more examples of a magnet having O-ring seals as further described herein.

When the interface 197 is designed for usage including fluid or gas (or even powder or solids) conveyance and/or transfer, it may include or incorporate a means of creating a seal at the interface to prevent leakage and/or cross contamination of multiple fluid paths. For example, one embodiment is the use of an O-ring 211 on one or both sides of the mating surfaces 213 of the interface (FIG. 32). In another example, a multiport gasket across the entire mating surface may be used. Another further embodiment may be to use the clamping force provided by the magnets on either side of the interface to draw and hold precision-machined surfaces into intimate contact with one another (e.g., such as ceramic valves used in typical water faucets), thereby alleviating the need for elastomeric sealing components. Hydrophobic and/or oleophobic coatings or treatments across the mating surfaces may also assist in the reduction or prevention of debris accumulation. The interfaces may also include a means of heating the mating surfaces to address ice buildup in environments where this may be an issue.

To further elaborate on one of the above-described use of the self-aligning non-mechanical magnetic interface, a UAV may dock with the interface 197 and initiate a data transfer of acquired information through direct connect contacts 163, as well as through wireless means. At the same time, the UAV may receive an electrical charging voltage through direct contact, or inductive charging, or other power transfer means. In addition, the UAV may also receive fuel and/or coolant from a closed loop cooling system, allowing for a substantially accelerated charge acceptance rate due to the improved ability for the receiving device to dissipate the resultant heat associated with the high rate of charge delivery. This feature allows for a new level of design flexibility and compaction of internal components as the previous impediment of thermal loading of componentry during charging or recharging operations can more easily be dissipated.

In addition to the foregoing described system, the inventions described herein provide an ability to selectively magnetize and demagnetize mating surfaces of devices and their correspond mounts resulting in the creation of a residual magnetic field which does not require sustained power input in order to maintain the integrity of the coupling magnetic field. This ability provides coupled components a stronger combined coupling force than is achieved by the self-aligning magnets, without the need for continuous power to maintain coupling even under adverse or challenging environmental conditions.

In one or more examples of embodiments, it is important to be able to create and then selectively dissipate a secondary magnetic coupling. For example, in the instance of a drone or UAV mount, initiating the described secondary coupling upon contact and alignment of the programmed magnetic surfaces and the selectively magnetizable components, magnetization of the selective interfacing surfaces and/or the creation of the above described residual magnetic fields provides for a more secure docking and improved retention of the device with the mount without the need for mechanical constraints or continuous application of power such as the case in an actuated solenoid.

This combination of elements may also be used to enable a non-mechanical device security system, such as may be useful for mobile electronics. For example, a tablet or smartphone may have an accessory side of a mating self-aligning magnetic interface 107 with a selectively magnetizable security provision incorporating the residual magnetic field, as well as direct connect contacts 163 for charging and communication. When the device, which is desired to be charged and/or secured, is placed upon the mount 101, 161, the indexing magnets 103, 107 draw the mating surfaces 201, 203 together and align them. If security or "anti-theft mode" is desired, selective magnetization of the residual magnetic field components may be activated or engaged and will magnetize the selective surface(s) or components, providing a determinable level of additional magnetic attraction "locking" the device to the mount. In one or more examples of embodiments, the selective magnetization can be instituted and then dissipated in less than 1 second, although variations thereon would not depart from the overall scope of the present invention.

In one or more further examples of embodiments, the system described herein may be used for a non-mechanical pneumatic and or hydraulic coupling in lieu of a threaded or standard quick disconnect coupling. To this end, when the self-aligning interface 197 is used it is possible to have any number of discrete channels in a hose assembly or manifold without the need for a mechanically keyed interface. In addition, when combined with the on-demand electromagnetic coupling or decoupling described herein it may incorporate an electric coil for the creation of high strength residual magnetic fields to resist unintentional decoupling. By relying solely on a magnetic coupling methodology, a fail-safe condition can be realized as the strength of the residual magnetic coupling can be adjusted to decouple at a force determined by the designer to prevent damage to the hose or equipment to which the coupling interface is attached. In other applications, multiple residual magnetic coupling interfaces may be used to selectively couple and/or decouple certain components or specific areas of a singular component to allow for decoupling of the mated surfaces in a controlled, repeatable and predictable manner.

In another example embodiment, the above-described interface may include either (or both) a magnetically actuated valving system, or another means of valving one or more fluid paths—such as electrically, or electromagnetically coupling the fluid paths upon contact of direct connect connections on one or both sides of the interface.

While specific examples are provided for purposes of illustration, the interface described herein may be utilized in other applications not described. The ability to selectively couple and decouple interfaces in an angularly, accurate manner so as to enable specific and discrete electrical power transfer and signal contacts facilitates a simplified means of mounting and/or attachment of many things. As non-limiting examples, other applications may include: theatre sound and lighting components; temporary lighting for mobile applications; and fluid, air, and electrical hose and/or cable couplings.

In addition to the advantages described hereinabove, the self-aligning nature of the indexing magnetic device mount interface provides various advantages as it allows for very reliable contact points, namely, the two sides of the interface accurately, magnetically align in space before contact occurs due to the interaction of the magnetic fields as the coupling faces approach, thereby minimizing friction and sliding of contacts or other surfaces against or on one another as is experienced with mechanically aligned and constrained interfaces. Advantageously, when these components work in concert with one another in a specific application, namely with a UAV, the result is a new and useful ability for the UAV's to automatically dock, join, couple, or otherwise connect with other UAV's, as well as mounts on stationary, as well as mobile platforms. Moreover, as described herein this arrangement allows for automatic charging of electrical systems, as well as data, fuel, and coolant or other material transfers. In addition, this system allows for a wide range of sizes and configurations of devices to couple with the same mount as the need for precise mechanical constraints and or integration componentry is eliminated.

In addition to the foregoing, a non-mechanical device security system may also be implemented using the components described herein, such as may be useful for mobile electronics. With this system, portable electronic devices can be securely mounted, charged, and easily secured or released from their mount without the need for any moving parts such as locks or retention pins. Moreover, the ability to electronically control and modulate the strength and existence of the magnetic security system is desirable to enable simple and secure mounting and dismounting of the devices from their mounts, without the need for keys. The device itself could also tell the mount when to lock and when to release.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., "top" and "bottom") in this description are merely used to identify various elements as are oriented in the Figures. It should be recognized that the orientation of particular components may vary greatly depending on the application in which they are used.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is also important to note that the construction and arrangement of the system, methods, and devices as shown in the various examples of embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, the nature or number of adjustment positions provided between the elements may be varied (e.g. by variations in the number of engagement slots or size of the engagement slots or type of engagement). The order or sequence of any process or method steps may be varied or re-sequenced according to alternative embodiments. Other substitutions, modifications, changes and omissions may be made in the design, operating conditions and arrangement of the various examples of embodiments without departing from the spirit or scope of the present inventions.

It should be noted that the detailed disclosure above provides a specific example of particular embodiments of the system. Various changes can be made which would not depart from the overall scope of the invention. Changes regarding the device used to install or otherwise access software, operating system, access via browser or installed program, embedded functionality of the operating system, distributed server systems, device storage mediums, language, search and suggestion algorithm variations, and other variations are contemplated as within the scope of this invention.

Moreover, some portions of the detailed descriptions herein are presented in terms of procedures, steps, logic blocks, processing, and other symbolic representations of operations on data bits that can be performed on computer memory. These descriptions and representations are the means used by those skilled in the data-processing arts to most effectively convey the substance of their work to others skilled in the art. A procedure, computer-executed step, logic block, process, etc. is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It should be borne in mind; however, that all of these and similar terms are to be associated with the appropriate physical quantities and are merely convenient labels applied to these quantities. Unless specifically stated otherwise as apparent from the discussions herein, it is appreciated that throughout the present invention, discussions utilizing terms, such as "receiving," "sending," "generating," "reading," "invoking," "selecting," and the like, refer to the action and processes of a computer system, or similar electronic computing device, including an embedded system, that manipulates and transforms data represented as physical (electronic) quantities within the computer system.

While this invention has been described in conjunction with the examples of embodiments outlined above, various alternatives, modifications, variations, improvements and/or substantial equivalents, whether known or that are or may be presently foreseen, may become apparent to those having at least ordinary skill in the art. Accordingly, the examples of embodiments of the invention, as set forth above, are intended to be illustrative, not limiting. Various changes may be made without departing from the spirit or scope of the invention. Therefore, the invention is intended to embrace all known or earlier developed alternatives, modifications, variations, improvements and/or substantial equivalents.

The technical effects and technical problems in the specification are exemplary and are not limiting. It should be noted that the embodiments described in the specification may have other technical effects and can solve other technical problems.

The invention claimed is:

1. A magnetic mounting system comprising:
a device having an indexing magnetic attachment feature comprising a first single multipole magnet; and
a magnetic device mount having a mating indexing magnetic attachment feature comprising a second single multipole magnet,
wherein the first single multipole magnet and the second single multipole magnet each comprise a magnet having multiple polarities arranged at predetermined locations in a pattern forming a magnetic lock and key system between the first single multipole magnet and the second single multipole magnet which orients the device relative to the mount at predictable and programmed intervals, which intervals comprise a specific angular, radial, and/or longitudinal alignment of the device relative to the mount without a mechanical interface.

2. The magnetic mounting system of claim 1, wherein the device is a device case having the indexing magnetic attachment feature.

3. The magnetic mounting system of claim 1, wherein the mating indexing magnetic attachment feature is fastenable to a support structure.

4. The magnetic mounting system of claim 3, wherein the mating indexing magnetic attachment feature is coupled to a pivotable ball which is received by a clamp or socket.

5. The magnetic mounting system of claim 1, wherein at least one of the first single multipole magnet and the second single multipole magnet comprises a predetermined size, shape and pattern polarization.

6. The magnetic mounting system of claim 5, wherein at least one of the first single multipole magnet and the second single multipole magnet comprises a radial pattern positioned about a center of said magnet.

7. The magnetic mounting system of claim 6, wherein the mating single multipole magnet comprises a mating polarity pattern.

8. The magnetic mounting system of claim 5, wherein the magnetic device mount has a substantially reduced magnetic coupling strength upon angular misalignment of the magnetic device mount relative to a surface of the indexing magnetic attachment feature of the device.

9. The magnetic mounting system of claim 1, wherein at least one of the first single multipole magnet and the second single multipole magnet comprises more than two magnetic poles.

10. The magnetic mounting system of claim 1, wherein at least one of the first single multipole magnet and the second single multipole magnet is a polymagnet.

* * * * *